United States Patent
Yamanaka

(10) Patent No.: US 11,143,852 B2
(45) Date of Patent: Oct. 12, 2021

(54) ZOOM LENS AND IMAGING APPARATUS

(71) Applicant: TAMRON CO., LTD., Saitama (JP)

(72) Inventor: Hisayuki Yamanaka, Saitama (JP)

(73) Assignee: TAMRON CO., LTD., Saitama (JP)

( * ) Notice: Subject to any disclaimer, the term of this patent is extended or adjusted under 35 U.S.C. 154(b) by 147 days.

(21) Appl. No.: 16/555,273

(22) Filed: Aug. 29, 2019

(65) Prior Publication Data

US 2020/0264413 A1 Aug. 20, 2020

(30) Foreign Application Priority Data

Feb. 19, 2019 (JP) .............................. JP2019-027577

(51) Int. Cl.
| | | |
|---|---|---|
| *G02B 15/14* | (2006.01) | |
| *G02B 15/173* | (2006.01) | |
| *G02B 13/18* | (2006.01) | |
| *G02B 13/00* | (2006.01) | |
| *G02B 15/20* | (2006.01) | |
| *G02B 27/00* | (2006.01) | |
| *G02B 13/06* | (2006.01) | |
| *H04N 5/232* | (2006.01) | |
| *H04N 5/335* | (2011.01) | |
| *G02B 7/10* | (2021.01) | |
| *G02B 5/00* | (2006.01) | |

(52) U.S. Cl.
CPC ............. *G02B 15/173* (2013.01); *G02B 7/10* (2013.01); *G02B 13/009* (2013.01); *G02B 13/06* (2013.01); *G02B 13/18* (2013.01); *G02B 15/20* (2013.01); *G02B 27/0025* (2013.01); *H04N 5/23296* (2013.01); *H04N 5/335* (2013.01); *G02B 5/005* (2013.01)

(58) Field of Classification Search
CPC .. G02B 27/0025; G02B 15/173; G02B 15/20; G02B 13/009; G02B 13/18; G02B 5/005; G02B 13/06; G02B 7/10; H04N 5/23296; H04N 5/335
USPC ........ 359/683–692, 715–717, 740, 754–758, 359/763–766, 771–775
See application file for complete search history.

(56) References Cited

U.S. PATENT DOCUMENTS

| | | |
|---|---|---|
| 2014/0347525 A1 | 11/2014 | Obikane |
| 2016/0048007 A1* | 2/2016 | Takada .................. G02B 15/173 359/684 |

FOREIGN PATENT DOCUMENTS

| | | |
|---|---|---|
| JP | 2014-228807 A | 12/2014 |
| JP | 2017-040875 A | 2/2017 |
| JP | 2018-013684 A | 1/2018 |

* cited by examiner

*Primary Examiner* — Evelyn A Lester
(74) *Attorney, Agent, or Firm* — Paratus Law Group, PLLC

(57) ABSTRACT

To attain the above-described objective, a zoom lens according to the present invention includes sequentially from an object side, a front group which includes at least three lens groups and has positive refractive power as a whole, and a lens group disposed on an image side of the front group, a magnification is changed by a change of a distance on an optical axis between adjacent lens groups, the lens group includes sequentially from an image side, a lens component, a lens component, and a lens component, the lens group is moved to an object side at a time of changing a magnification from a wide-angle end to a telephoto end, focusing is obtained by movement of a part of lens groups in the front group along an optical axis, and a predetermined condition expression is satisfied.

13 Claims, 36 Drawing Sheets

ZOOM LENS AND IMAGING APPARATUS

CROSS-REFERENCE TO RELATED APPLICATIONS

This application is based on and claims the benefit of priority from Japanese Patent Application No. 2019-027577, filed on Feb. 19, 2019, the entire contents of which are incorporated herein by reference.

BACKGROUND OF THE INVENTION

Technical Field

The present invention relates to a zoom lens and an imaging apparatus, and particularly to a zoom lens and an imaging apparatus which are suitable for an imaging apparatus such as a digital still camera or a digital video camera in which a solid-state image sensor (such as a CCD or a CMOS) is used.

Related Art

With regard to a conventional zoom lens or the like used for a single-lens reflex camera, an optical element related to an optical finder such as a reflex mirror is disposed in a camera body, and so, there is a need to secure a long flange-focal length regardless of a focal length. Hence, provided is a lens design in which a lens group having positive refractive power is disposed as a rear lens group which is disposed on an image side, out of lens groups forming a zoom lens, so that a back focus can be easily secured, to secure a required flange-focal length. However, in recent years, a mirrorless camera, a digital still camera, or the like (which will be hereinafter referred to as a "mirrorless camera or the like") which performs imaging using a live-view image displayed on a liquid-crystal screen provided in a back surface or the like of a body of an imaging apparatus, is increasingly popular. In an imaging apparatus not including an optical finder, there is no need to dispose a reflex mirror or the like in a camera body. For such an imaging apparatus which does not require a long flange-focal length, a zoom lens having a short back focus is being sought.

Also, conventionally, a condenser such as an on-chip micro-lens for efficiently receiving incident light is provided in each pixel in an imaging plane of an image sensor. An acceptance angle of an on-chip micro-lens or the like is limited to a predetermined range, and conventionally, in order to efficiently receive incident light with an on-chip micro-lens or the like, a diameter of an exit pupil of an imaging lens is made larger than a certain diameter and a tilt angle of incident light with respect to an optical axis is reduced so that incident luminous flux which is substantially parallel to an optical axis is incident upon an imaging plane. In order to ensure such a telecentric property as described above, conventionally, a lens component having positive refractive power is disposed in an image-side portion of a zoom lens.

However, in recent years, an aperture ratio of an image sensor is improved, a range of an acceptance angle of an on-chip micro-lens or the like is increased, and also an optical performance of an on-chip micro-lens or the like is improved. Accordingly, constraints on a zoom lens regarding a position and a size of an exit pupil are eased, and even though a zoom lens is configured in such a manner that a lens component having negative refractive power is disposed in an image-side portion of the zoom lens and light is obliquely incident upon an imaging plane, peripheral darkening (shading) which is likely to occur due to mismatch or the like between an on-chip micro-lens and an exit pupil of a zoom lens is less conspicuous.

In view of this, in recent years, a lens component having negative refractive power is disposed in an image-side portion of a zoom lens in an effort to miniaturize a zoom lens (refer to JP 2014-228807 A, JP 2017-40875 A, and JP 2018-13684 A, for example).

A zoom lens described in JP 2014-228807 A is provided with refractive-power arrangement of positive, negative, positive, negative, negative which are arranged sequentially in the stated order from an object side, and a negative lens group disposed closer to an image than an optical diaphragm, out of all of lens groups, is used as a focusing group in an effort to miniaturize a whole of a zoom-lens unit.

However, in each of zoom lenses according to first, second, fourth, and fifth embodiments described in JP 2014-228807 A, though negative refractive power is arranged in a rearmost lens group in order to reduce a total optical length, a lens component having positive refractive power is disposed in a position closest to an image in the rearmost lens group, which makes it difficult to reduce a diameter of the rearmost lens group. For this reason, in a case where a zoom lens used for an imaging apparatus having a short flange-focal length is provided and it is required to reduce a total optical length, an increase in a diameter of a rearmost lens group becomes pronounced and reduction of a size along a diameter is difficult.

Also, with regard to each of zoom lenses according to third, sixth, seventh, eighth and ninth embodiments described in JP 2014-228807 A, while a lens component having negative refractive power is disposed in a position closest to an image in a rearmost lens group, the rearmost lens group is fixed to an image plane in zooming from a wide-angle end to a telephoto end. Thus, an effective luminous-flux diameter of the rearmost lens group is large at a telephoto end, so that reduction of a diameter of the rearmost lens group is difficult also in this case. Further, in each of the zoom lenses according to the sixth, seventh, eighth, and ninth embodiments described in JP 2014-228807 A, a half angle of view at a wide-angle end is as small as approximately 11°, and a sufficiently wide angle of view is not achieved at a wide-angle end. On the other hand, in the zoom lens according to the third embodiment described in JP 2014-228807 A, though a half angle of view at a wide-angle end is as wide as approximately 38.8°, reduction of a total optical length is not achieved.

A zoom lens described in JP 2017-40875 A is provided with refractive-power arrangement of positive, positive, negative, and positive which are arranged sequentially in the stated order from an object side, and satisfies a predetermined condition expression in an effort to miniaturize a whole of a zoom-lens unit. Also, the foregoing zoom lens has a small F number at a telephoto end, so that a bright zoom lens is implemented.

Nonetheless, in each of zoom lens according to first, second, third, and fourth embodiments described in JP 2017-40875 A, though a lens component having negative refractive power is disposed in a position closest to an image in a rearmost lens group, the rearmost lens group is fixed to an image plane (the first and second embodiments), or is moved to an image side (the third and fourth embodiments) in zooming from a wide-angle end to a telephoto end, so that reduction of a total optical length at a wide-angle end is not achieved. A zoom lens in which a total optical length varies from a wide-angle end to a telephoto end is generally configured so that a telescopic structure in which an inner tube can be housed in a barrel as an outer tube is formed and a length of a barrel increases in zooming from a wide-angle end to a telephoto end. For this reason, as a total optical length at a wide-angle end becomes large, a total length measured when an inner tube is housed in an outer tube increases. Also, in a zoom lens according to a fifth embodiment described in JP 2017-40875 A, a rearmost lens group includes sequentially from an object side, a convex lens and a concave lens, and the rearmost lens group is moved to an object side in zooming from a wide-angle end to a telephoto end, in an effort to suppress an increase in a diameter of the rearmost lens group. However, refractive power of the convex lens forming the rearmost lens group is weak and a distance on an optical axis between the convex lens and the concave lens is large, so that reduction of a diameter of the rearmost lens group is insufficient.

A zoom lens described in JP 2018-13684 A is provided with refractive-power arrangement of positive, negative, positive, positive, and negative which are arranged sequentially in the stated order from an object side, and a reflecting member is provided in each of a first lens group and a lens group disposed closest to an image, so that a thickness of an imaging apparatus is reduced, in an effort to miniaturize a whole of a zoom-lens unit and enhance a performance.

However, in each of zoom lenses described in first, second, and third embodiments of JP 2018-13684 A, a rearmost lens group includes sequentially from an object side, at least a convex lens and a concave lens, and some consideration for suppressing an increase in a diameter of the rearmost lens group is given. Nonetheless, the zoom lens described in JP 2018-13684 A obtains focusing by moving the rearmost lens group. Accordingly, it is difficult to reduce a weight of a focusing lens group, and a size of an actuator or the like for autofocus (AF) drive is increased, so that miniaturization of a whole of a zoom-lens unit is difficult. Also, a back focus (BF) cannot be regarded as being sufficiently short with respect to the largest image height in an imaging plane of an image sensor. Further, a first lens group and the rearmost lens group are fixed to an image plane in zooming, and thus, a total optical length does not vary from a wide-angle end to a telephoto end, so that a total optical length is required to be reduced.

An objective of the present invention is set in view of the above-described problems, and is to provide a zoom lens which is suitable for an imaging apparatus having a short flange-focal length, is compact as a whole, allows a diameter of a rearmost lens group to be easily reduced, and achieves a high performance, and an imaging apparatus including the foregoing zoom lens.

SUMMARY OF THE INVENTION

In order to attain the above-described objective, a zoom lens according to the present invention includes: a front group that has positive refractive power as a whole; and a lens group GB disposed on an image side of the front group, wherein the front group and the lens group are arranged sequentially in a stated order from an object side, a magnification is changed by a change of a distance on an optical axis between adjacent lens groups, the front group includes at least three lens groups, the lens group GB includes sequentially from the image side, a negative lens component Nb, a negative lens component Nf, and a positive lens component P, an object-side surface of the negative lens component Nb is a concave surface, the lens group GB is moved to the object side in zooming from a wide-angle end to a telephoto end, focusing is obtained by movement of a part of the lens groups included in the front group, along the optical axis, and a following condition expression is satisfied:

$$-0.7 \leq (RNf+RNb)/(RNf-RNb) \leq 2.0 \quad (1)$$

where
RNf represents a radius of curvature of a surface located closest to an image in the negative lens component Nf, and
RNb represents a radius of curvature of a surface located closest to an object in the negative lens component Nb.

Also, to attain the above-described objective, an imaging apparatus according to the present invention includes: the above-described zoom lens; and an image sensor configured to convert an optical image that is formed on an image side of the zoom lens by the zoom lens, into an electrical signal.

According to the present invention, it is possible to provide a zoom lens which is suitable for a digital still camera or the like which has a short flange-focal length, is compact as a whole, allows a diameter of a rearmost lens group to be easily reduced, and achieves a high performance, and an imaging apparatus including the foregoing zoom lens.

DESCRIPTION OF THE EMBODIMENTS

Figure 1:
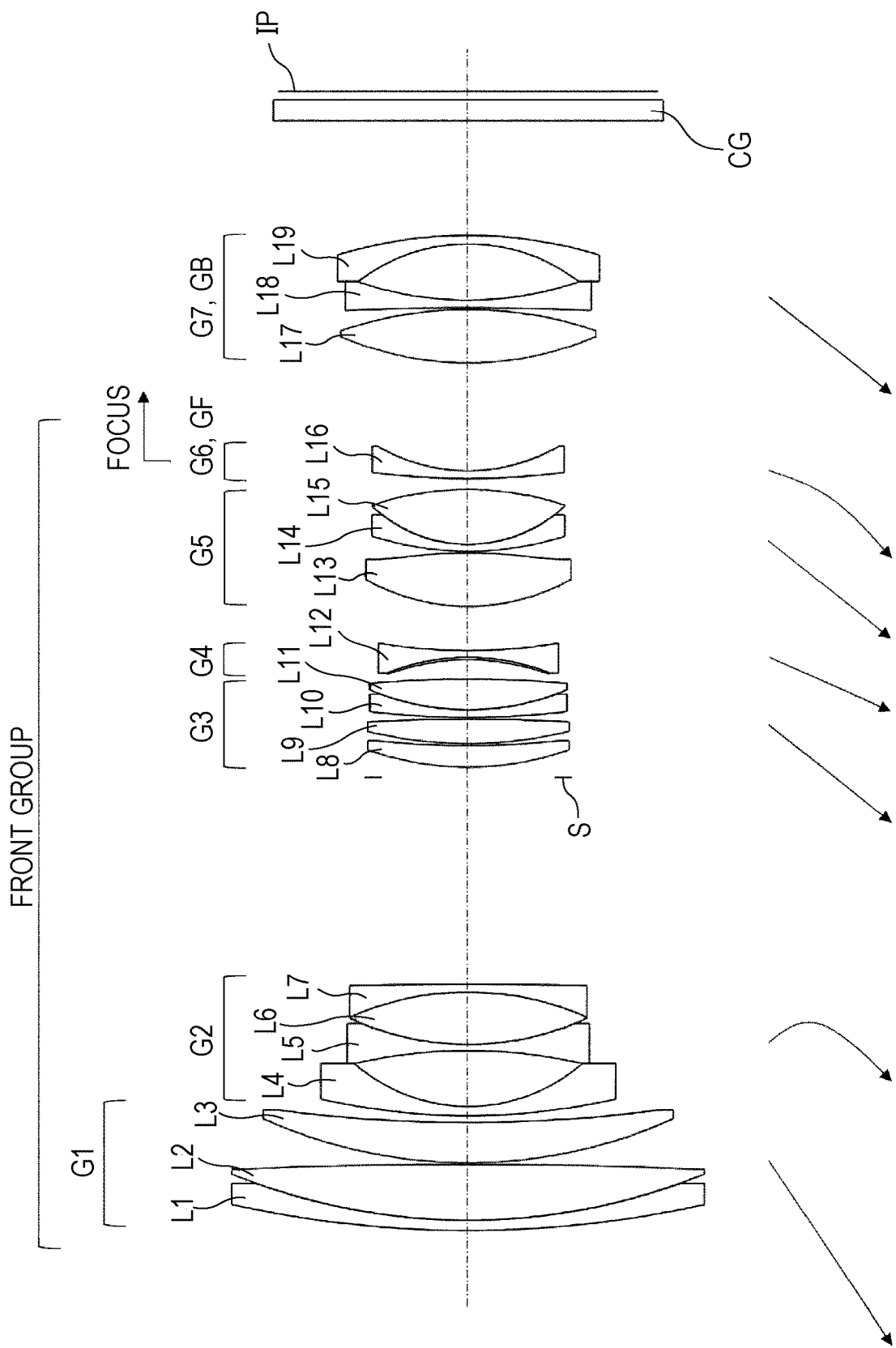
FIG. 1 shows a lens section at a time when a zoom lens according to a first embodiment of the present invention is focused at infinity while being at a wide-angle end.

Hereinafter, embodiments of a zoom lens and an imaging apparatus according to the present invention will be described. It is noted that a zoom lens and an imaging apparatus described below are mere embodiments of the zoom lens and the imaging apparatus according to the present invention, and the zoom lens and the imaging apparatus according to the present invention are not limited to the following embodiments.

1. Zoom Lens 1-1. Optical Configuration of Zoom Lens

A zoom lens according to the present embodiment substantially includes sequentially from an object side, a front group which has positive refractive power as a whole and a lens group GB disposed on an image side of the front group. Here, terms "substantially includes" mean to include at least the above-described front group and lens group GB as optical elements substantially forming the zoom lens, that is, the terms mean that it is permissible to further include the other lens groups, optical elements other than a lens, such as a diaphragm and a cover glass, and the like. Moreover, it is supposed that each lens group includes at least one lens.

Below, an optical configuration of lens groups forming the zoom lens according to the present invention will be described in detail.

(1) Front Group

With regard to a front group, a concrete group configuration is not specifically limited so long as a front group has positive refractive power as a whole and includes at least three lens groups. The front group is formed of at least three lens groups and a distance on an optical axis between adjacent lens groups is changed in zooming, so that fluctuation in aberration can be easily suppressed by relative movement of respective lens groups at a time of changing a magnification. Thus, flexibility concerning a position of each lens group at a time of changing a magnification and an optical design is increased, so that a zoom lens having a high image-forming performance can be attained.

It is preferable that the front group includes at least one or more lens groups each having positive refractive power and at least one or more lens groups each having negative refractive power. Such configuration reduces a bias in loads on respective lens groups of the front group due to a change in magnification, so that aberration can be excellently corrected with a small number of lenses, which makes it possible to implement a compact zoom lens having a high magnification ratio. Also, it is preferable that the front group includes at least four lens groups. To form the front group of four or more lens groups further increases flexibility concerning a position of each lens group at a time of changing a magnification and an optical design, and such increased flexibility is preferable from viewpoints of a higher magnification ratio and a higher performance.

It is preferable that the front group includes a negative lens group GF in a position closest to an image. To dispose the negative lens group GF in a position closest to an image in the front group makes it easy to provide the zoom lens with refractive-power arrangement having a strong telephoto tendency, so that a total length can be easily reduced. Here, refractive-power arrangement having a telephoto tendency means that a telephoto ratio (a ratio of a total optical length to a focal length) of the zoom lens is smaller than one, and a strong telephoto tendency means that a telephoto ratio has a smaller value.

Also, a lens group which is disposed in a position closest to an object in the front group may have either positive refractive power or negative refractive power. In a case where a lens group which is disposed in a position closest to an object in the front group has positive refractive power, a zoom lens is provided as a positive-group preceding type and a high magnification ratio can be easily achieved, so that a zoom lens which has a strong telephoto tendency and has a short total optical length at a telephoto end can be easily implemented. On the other hand, in a case where a lens group which is disposed in a position closest to an object in the front group has negative refractive power, a zoom lens is provided as a negative-group preceding type, so that a zoom lens having a wide angle of view at a wide-angle end can be attained.

(2) Lens Group GB

The lens group GB is a lens group which is disposed on an image side of the front group, and is disposed in a position substantially closest to an image in the zoom lens. The lens group GB may have either positive refractive power or negative refractive power as a whole. In a case where the lens group GB has positive refractive power as a whole, a bright lens which has a small F number can be easily implemented. Also, in this case, it is easy to achieve a wider angle, and a zoom lens having a wide angle of view at a wide-angle end can be easily implemented.

On the other hand, in a case where the lens group GB has negative refractive power as a whole, it is easy to provide the zoom lens with refractive-power arrangement which has a strong telephoto tendency, so that a total length can be easily reduced. Also in this case, it is advantageous in that a diameter of a lens group (including the lens group GB) which is disposed on an image side in the zoom lens can be easily reduced.

The lens group GB includes sequentially from an image side, a negative lens component Nb, a negative lens component Nf, and a positive lens component P. So long as the lens group GB includes those three lens components, a lens configuration thereof is not specifically limited in the other respects. However, a lens component referred to herein means one single lens or a lens unit such as a cemented lens in which a plurality of single lenses are integrated with no air gap being interposed. More specifically, it is supposed that in a lens component, even in a case where a plurality of optical surfaces are included, only a surface closest to an object and a surface closest to an image are in contact with air and the other surfaces are not in contact with air. Also, in the present specification, a single lens may be either a spherical lens or an aspherical lens. Also, an aspherical lens includes also a so-called compound aspherical lens in which an aspherical film is stuck to a surface.

The lens group GB may include one or more lens components on an object side of the positive lens component P. By configuring the lens group GB so as to include sequentially from an image side, at least the negative lens component Nb, the negative lens component Nf, and the positive lens component P, it is possible to dispose an exit pupil of the zoom lens in a position closer to an image side, which allows reduction of a back focus. Accordingly, a total optical length of the zoom lens can be easily reduced, and a diameter of the lens group GB can be easily reduced.

Though a shape of a lens of each of the negative lens component Nb, the negative lens component Nf, and the positive lens component P is not specifically limited, it is preferable that each lens component has the following shape.

It is preferable that an object-side surface of the negative lens component Nb is a concave surface. By forming an object-side surface of the negative lens component Nb so as to be a concave surface, it is possible to excellently correct field curvature and distortion aberration occurring in the positive lens component P in a direction in which they are undercorrected. Also, it is more preferable that the negative lens component Nb has a negative meniscus shape which is convex toward an image side. If an image-side surface of the negative lens component Nb is a concave surface, in other words, the negative lens component Nb has a double concave shape, distortion aberration in a direction in which it is overcorrected becomes so large that it is difficult to excellently correct such aberration.

It is preferable that the positive lens component P has a double convex shape. To form the positive lens component P so as to have a double convex shape makes it easy to reduce a back focus, and allows an obliquely-incident ray at a wide-angle end to be efficiently refracted by the positive lens component P, so that a diameter of the lens group GB can be reduced.

Also, it is preferable that an air lens formed by an image-side surface of the positive lens component P and an object-side surface of the negative lens component Nf has a concave shape. Particularly, it is preferable that the air lens has a double concave shape, or a negative meniscus shape which is concave toward an object side. By forming the air lens so as to have a concave shape, in other words, by causing the air lens to act as a convex lens, it is possible to excellently correct spherical aberration, field curvature, and distortion aberration in a well-balanced manner. On the other hand, if the air lens has a convex shape, in other words, if the air lens acts as a concave lens, spherical aberration, field curvature, and distortion aberration which occur in the lens group GB are too excessive in a direction in which they are overcorrected, and it is difficult to excellently correct them.

1-2. Operation (1) Zooming

In the zoom lens, a magnification is changed by a change of a distance on an optical axis between adjacent lens groups. More specifically, a magnification is changed by a change of a distance on an optical axis between every adjacent lens groups included in the front group, and of a distance on an optical axis between a lens group which is disposed closest to an image, out of lens groups included in the front group, and the lens group GB.

In zooming, what is required of lens groups included in the front group is only a change in relative distances on an optical axis, and so, all of the respective lens groups may be moved along an optical axis, or a part of the lens groups may be fixed along an optical axis.

As described above, though it is not especially required that each of lens groups should, or should not, be moved, it is preferable that a lens group located closest to an object in the front group is moved along an optical axis in zooming. By movement of a lens group located closest to an object in the front group at a time of changing a magnification, an undue load is unlikely to be imposed on the respective lens groups due to a change in a magnification, so that a zoom lens which has a high image-forming performance while achieving a high magnification ratio can be attained.

The lens group GB is one lens group. Thus, respective lens components forming the lens group GB are moved in the same direction by the same amount in zooming, and a distance between every adjacent lens components forming the lens group GB is not changed in zooming.

In zooming from a wide-angle end to a telephoto end, it is preferable that the lens group GB is moved to an object side. By movement of the lens group GB to an object side, it becomes easy to shorten a back focus of the zoom lens at a wide-angle end, so that a total optical length of the zoom lens at a wide-angle end can be reduced. Also, it becomes easy to reduce an effective luminous-flux diameter of the lens group GB at a telephoto end, so that a diameter of the lens group GB can be reduced in a zoom-lens unit as a whole.

(2) Focusing

In the zoom lens, focusing is obtained by movement of a part of lens groups forming the front group along an optical axis. At that time, a lens group formed of two or less lens components, out of lens groups forming the front group, is selected as a focusing group, so that a focusing group which is more compact and more light-weight as compared to a case where the lens group GB is selected as a focusing group, can be formed, which makes it easy to miniaturize a whole of the zoom-lens unit while achieving quick focusing.

On the other hand, if the lens group GB is selected as a focusing group, at least three lens components should be moved along an optical axis in focusing, which makes it difficult to reduce a size and a weight of a focusing group and to obtain quick focusing. Also, it is not preferable that a focusing group is large and heavy because an actuator (AF actuator) for driving a focusing group at a time of autofocusing (AF) becomes large and also a whole of a zoom-lens unit becomes large.

In an effort to reduce a size and a weight of a focusing group, it is preferable that a lens group other than a lens group disposed closest to an object, out of lens groups forming the front group, is selected as a focusing group. A lens group disposed closest to an object in the front group generally has a large diameter, and is large and heavy, and thus, such lens group is not preferable in the above-described respect.

In an effort to reduce a size and a weight of a focusing group, it is preferable that the negative lens group GF is disposed in a position closest to an image in the front group, and the negative lens group GF is selected as a focusing group and is moved to an image side along an optical axis in focusing on a close region from infinity. In a case where a lens group having negative refractive power, out of all lens groups forming the zoom lens, is disposed in a position closest to an image in the front group, it is easy to reduce a size and a weight of a focusing group because a diameter of the negative lens group GF can be easily reduced.

In this regard, in a case where a contrast AF method is employed, in focusing, a focusing group is moved at a high speed and a peak position of contrast of a subject is detected, so that a position of the subject is detected. This operation is referred to as wobbling. In a situation where imaging is performed with an image of a subject being displayed on a liquid-crystal display or the like provided in an imaging apparatus, an angle of view of a displayed image fluctuates greatly if an angle of view in wobbling fluctuates greatly. The negative lens group GF is a lens group which is located closest to an image in the zoom lens. Hence, in a case where a contrast AF method is employed, fluctuation of an angle of view due to wobbling during AF drive can be lessened, so that also fluctuation of an angle of view of a displayed image can be lessened. Also in this respect, it is preferable that the negative lens group GF is selected as a focusing group.

1-3. Condition Expression

It is preferable that the zoom lens employs the above-described configuration and satisfies one or more of condition expressions described as follows.

1-3-1. Condition Expression (1)

$$-0.7 \leq (RNf+RNb)/(RNf-RNb) \leq 2.0 \quad (1)$$

where

RNf represents a radius of curvature of a surface closest to an image in the negative lens component Nf, and RNb represents a radius of curvature of a surface closest to an object in the negative lens component Nb.

The above-described condition expression (1) defines a shape of an air lens formed by a surface closest to an image in the negative lens component Nf and a surface closest to an object in the negative lens component Nb. By satisfying the condition expression (1), it is possible to excellently correct field curvature in all zoom areas and to attain a zoom lens having a high image-forming performance. Additionally, in a case where each lens component is formed of a single lens, a surface closest to an image means a surface closest to an image in a single lens, and a surface closest to an object means a surface closest to an object in a single lens. In a case where each lens component is formed of a cemented lens, a surface closest to an image means a surface closest to an image in a lens which is disposed closest to an image, out of lenses forming the cemented lens, and a surface closest to an object means a surface closest to an object in a lens which is disposed closest to an object, out of lenses forming the cemented lens.

In contrast thereto, if a numerical value in the condition expression (1) is smaller than a lower limit, divergence of a surface closest to an object in the negative lens component Nb is weaker than that of a surface closest to an image in the negative lens component Nf, which makes it difficult to excellently correct field curvature which tends toward undercorrection. On the other hand, if a numerical value in the condition expression (1) exceeds an upper limit, divergence of an object-side surface in the negative lens component Nb is too strong as compared to that of a surface closest to an image in the negative lens component Nf, which makes it difficult to excellently correct field curvature which tends toward overcorrection.

To produce the above-described effect, it is more preferable that an upper limit in the condition expression (1) is 1.8, it is much more preferable that the upper limit is 1.6, and it is still much more preferable that the upper limit is 1.4. Also, it is more preferable that a lower limit in the condition expression (1) is −0.6, it is much more preferable that the lower limit is −0.5, and it is still much more preferable that the lower limit is −0.4.

1-3-2. Condition Expression (2)

It is preferable that the zoom lens includes the negative lens group GF in a position closest to an image in the front group, and satisfies the following condition expression:

$$1.1 \leq \beta FBt/\beta FBw \leq 2.5 \quad (2)$$

where $\beta FBt$ represents a synthetic lateral magnification of the lens group GF and the lens group GB at a telephoto end, and $\beta FBw$ represents a synthetic lateral magnification of the lens group GF and the lens group GB at a wide-angle end.

The condition expression (2) defines a ratio between a synthetic lateral magnification at a wide-angle end and a synthetic lateral magnification at a telephoto end, the synthetic lateral magnification being provided by the lens group GF disposed closest to an image in the zoom lens and the lens group GB disposed on an image side of the lens group GF. By satisfying the condition expression (2), it is possible to reduce a total optical length of the zoom lens at a telephoto end while maintaining a high image-forming performance in all zoom areas.

In contrast thereto, if a numerical value in the condition expression (2) is smaller than a lower limit, refractive-power arrangement having a weak telephoto tendency is provided, so that it is difficult to reduce a total optical length of the zoom lens at a telephoto end, as compared to a focal length. On the other hand, if a numerical value in the condition expression (2) exceeds an upper limit, a telephoto tendency becomes too strong, so that an amount of aberration being caused is increased. Then, since a considerable number of lenses are necessary in order to correct such aberration, it is difficult to implement a zoom lens having a high image-forming performance with a small number of lenses.

To produce the above-described effect, it is more preferable that an upper limit in the condition expression (2) is 2.3, it is much more preferable that the upper limit is 2.1, and it is still much more preferable that the upper limit is 2.0. Also, it is more preferable that a lower limit in the condition expression (2) is 1.2, and it is much more preferable that the lower limit is 1.25.

1-3-3. Condition Expression (3)

It is preferable that the zoom lens satisfies the following condition expression:

$$0.3 \leq BFw/Y \leq 1.5 \quad (3)$$

where

BFw represents a back focus of the zoom lens at a wide-angle end, and

Y represents the largest image height of the zoom lens.

The condition expression (3) defines a ratio between a back focus of the zoom lens at a wide-angle end and the largest image height of the zoom lens. By satisfying the condition expression (3), it is possible to implement the zoom lens which is compact, has a short back focus at a wide-angle end, and includes an exit pupil having a small diameter.

In contrast thereto, if a numerical value in the condition expression (3) is smaller than a lower limit, a back focus of the zoom lens at a wide-angle end is too short, and a tilt angle of light incident upon an imaging plane with respect to an optical axis is too large. In order to reduce a tilt angle of light incident upon an imaging plane with respect to an optical axis, it is necessary to increase a diameter of an exit pupil. This makes it difficult to reduce a diameter of the lens group GB. On the other hand, if a numerical value in the condition expression (3) exceeds an upper limit, a back focus of the zoom lens at a wide-angle end is too long, and it is difficult to reduce a total optical length of the zoom lens at a wide-angle end.

To produce the above-described effect, it is more preferable that an upper limit in the condition expression (3) is 1.3, it is much more preferable that the upper limit is 1.2, and it is still much more preferable that the upper limit is 1.1. Also, it is more preferable that a lower limit in the condition expression (3) is 0.4, and it is much more preferable that the lower limit is 0.5.

1-3-4. Condition Expression (4)

It is preferable that the zoom lens satisfies the following condition expression:

$$0.5 \leq fP/Y \leq 2.7 \quad (4)$$

where fP represents a focal length of the positive lens component P, and

Y represents the largest image height of the zoom lens.

The condition expression (4) defines a ratio between a focal length of the positive lens component P and the largest image height of the zoom lens. By satisfying the condition expression (4), it is possible to reduce a diameter of the lens group GB while implementing a zoom lens in which refractive power of the positive lens component P is within an appropriate range and a high image-forming performance is fulfilled with a small number of lenses.

In contrast thereto, if a numerical value in the condition expression (4) is smaller than a lower limit, refractive power of the positive lens component P is too strong, and it is difficult to excellently correct aberration with a small number of lenses. Especially in this case, it is difficult to excellently correct field curvature and distortion aberration at a wide-angle end and it is difficult to excellently correct spherical aberration at a telephoto end. On the other hand, if a numerical value in the condition expression (4) exceeds an upper limit, refractive power of the positive lens component P is weak and a height of an obliquely-incident luminous flux which passes through the lens group GB, from an optical axis, is increased, so that it is difficult to reduce a diameter of the lens group GB.

To produce the above-described effect, it is more preferable that an upper limit in the condition expression (4) is 2.6, it is much more preferable that the upper limit is 2.3, it is still much more preferable that the upper limit is 2.1, and it is more preferable by far that the upper limit is 1.9. Also, it is more preferable that a lower limit in the condition expression (4) is 0.6, it is much more preferable that the lower limit is 0.7, and it is still much more preferable that the lower limit is 0.8.

1-3-5. Condition Expression (5)

It is preferable that the zoom lens satisfies the following condition expression:

$$0.4 \leq |fN|/Y \leq 2.7 \quad (5)$$

where fN represents a synthetic focal length of the negative lens component Nf and the negative lens component Nb, and Y represents the largest image height of the zoom lens.

The condition expression (5) defines a ratio between a synthetic focal length of the negative lens component Nf and the negative lens component Nb which are disposed adjacently to each other, and the largest image height of the zoom lens. By satisfying the condition expression (5), it is possible to dispose an exit pupil in an appropriate position in the zoom lens, and at the same time, attain an excellent image-plane property.

In contrast thereto, if a numerical value in the condition expression (5) is smaller than a lower limit, divergence provided by the negative lens component Nf and the negative lens component Nb is too strong, so that field curvature tends toward overcorrection. Then, it is difficult to excellently correct such field curvature. On the other hand, if a numerical value in the condition expression (5) exceeds an upper limit, an exit pupil cannot be disposed in a position closer to an image side, which makes it difficult to reduce a diameter of the lens group GB.

To produce the above-described effect, it is more preferable that an upper limit in the condition expression (5) is 2.4, it is much more preferable that the upper limit is 2.2, and it is still much more preferable that the upper limit is 2.0. Also, it is more preferable that a lower limit in the condition expression (5) is 0.5, it is much more preferable that the lower limit is 0.6, and it is still much more preferable that the lower limit is 0.7.

1-3-6. Condition Expression (6)

It is preferable that the zoom lens satisfies the following condition expression:

$$0.2 \leq RP/fw \leq 2.5 \quad (6)$$

where

RP represents a radius of curvature of an object-side surface of the positive lens component P, and fw represents a focal length of the zoom lens at a wide-angle end.

The condition expression (6) defines a ratio between a radius of curvature of an object-side surface of the positive lens component P and a focal length of the zoom lens at a wide-angle end. By satisfying the condition expression (6), it is possible to excellently correct spherical aberration and field curvature in a well-balanced manner.

In contrast thereto, if a numerical value in the condition expression (6) is smaller than a lower limit, refraction of an obliquely-incident luminous flux is stronger than that of an on-axis luminous flux, so that field curvature tends toward undercorrection to a great extent and a balance between field curvature and spherical aberration cannot be given. On the other hand, if a numerical value in the condition expression (6) exceeds an upper limit, field curvature tends toward undercorrection to a great extent, so that a balance between field curvature and spherical aberration cannot be given.

To produce the above-described effect, it is more preferable that an upper limit in the condition expression (6) is 2.3, it is much more preferable that the upper limit is 2.1, it is still much more preferable that the upper limit is 1.9. Also, it is more preferable that a lower limit in the condition expression (6) is 0.3, it is much more preferable that the lower limit is 0.4, and it is still much more preferable that the lower limit is 0.45.

1-3-7. Condition Expression (7)

It is preferable that the zoom lens satisfies the following condition expression:

$$0.2 \leq fNf/fNb \leq 1.8 \tag{7}$$

where
fNf represents a focal length of the negative lens component Nf, and
fNb represents a focal length of the negative lens component Nb.

The condition expression (7) defines a ratio between a focal length of the negative lens component Nf and a focal length of the negative lens component Nb. By satisfying the condition expression (7), it becomes easy to reduce sensitivity to decentering of each lens component forming the lens group GB and degradation of an optical performance due to an error in decentering during manufacture can be suppressed. In other words, variation caused during manufacture can be reduced and yield can be improved.

In contrast thereto, if a numerical value in the condition expression (7) is smaller than a lower limit, refractive power of the negative lens component Nf is too strong and sensitivity to decentering of the negative lens component Nf and the positive lens component P is increased, so that it becomes difficult to suppress degradation of an optical performance due to an error in decentering during manufacture. On the other hand, if a numerical value in the condition expression (7) exceeds an upper limit, refractive power of the negative lens component Nb is too strong and sensitivity to decentering of the negative lens component Nb and the positive lens component P is increased, so that it becomes difficult to suppress degradation of an optical performance due to an error in decentering during manufacture also in this case.

To produce the above-described effect, it is more preferable that an upper limit in the condition expression (7) is 1.7, it is much more preferable that the upper limit is 1.6, it is still much more preferable that the upper limit is 1.5. Also, it is more preferable that a lower limit in the condition expression (7) is 0.3, and it is much more preferable that the lower limit is 0.4.

1-3-8. Condition Expression (8)

It is preferable that the zoom lens satisfies the following condition expression:

$$20 \leq \nu P \leq 45 \tag{8}$$

where
νP represents an Abbe number of a positive lens for a d line, the positive lens being included in the positive lens component P and having the smallest Abbe number.

The condition expression (8) defines an Abbe number of a positive lens for a d line, the positive lens being included in the positive lens component P and having the smallest Abbe number. Here, in a case where the positive lens component P is formed of a positive lens, νP represents an Abbe number of the positive lens for a d line. In a case where the positive lens component P is formed of a cemented lens including positive lenses, νP represents an Abbe number of a certain one of the positive lenses for a d line, the certain positive lens having the smallest Abbe number for a d line, out of the positive lenses included in the cemented lens. By satisfying the condition expression (8), it is possible to correct axial color chromatic aberration and lateral chromatic aberration in all zoom areas in a well-balanced manner.

In contrast thereto, if a numerical value in the condition expression (8) is smaller than a lower limit, a difference between lateral chromatic aberration of an F line and lateral chromatic aberration of a C line at a wide-angle end becomes large and it becomes difficult to correct such aberration. On the other hand, if a numerical value in the condition expression (8) exceeds an upper limit, a difference between axial chromatic aberration of an F line and axial chromatic aberration of a C line becomes large, especially at a telephoto end, so that it becomes difficult to correct such aberration.

To produce the above-described effect, it is more preferable that an upper limit in the condition expression (8) is 43, it is much more preferable that the upper limit is 40, and it is still much more preferable that the upper limit is 38. Also, it is more preferable that a lower limit in the condition expression (8) is 23, and it is much more preferable that the lower limit is 25.

2. Imaging Apparatus

Next, an imaging apparatus according to the present invention will be described. The imaging apparatus according to the present invention includes the above-described zoom lens according to the present invention, and an image sensor which coverts an optical image which is formed on an image side of the zoom lens by the zoom lens, into an electrical signal.

It is noted that there is no specific limitation to an image sensor or the like, and a solid-state image sensor or the like such as a charge-coupled-device (CCD) sensor or a complementary-metal-oxide-semiconductor (CMOS) sensor can be used. The imaging apparatus according to the present invention is suitable as an imaging apparatus such as a digital camera or a video camera, which uses the foregoing solid-state image sensor. Also, the imaging apparatus may be a lens-fixed imaging apparatus in which a lens is fixed to a casing, or may be a lens-interchangeable imaging apparatus such as a mirrorless camera, of course.

It is preferable that the imaging apparatus includes an image processing unit which electrically processes captured image data which is captured by an image sensor and changes a shape of the captured image data, an image correction data storage in which image correction data used for processing the captured image data in the image processing unit, an image correction program, and the like are stored, and the like. In a case where a zoom lens is miniaturized, deformation (distortion) of a shape of a captured image formed on an image-forming plane is likely to occur. At that time, it is preferable that deformation correction data for correcting deformation of a shape of a captured image is previously stored in the image correction data storage and deformation of a shape of a captured image is corrected using the deformation correction data stored in the image correction data storage in the image processing unit. With the above-described imaging apparatus, a zoom lens can be further miniaturized, a beautiful captured image can be attained, and the imaging apparatus can be miniaturized as a whole.

Further, in the imaging apparatus according to the present invention, it is preferable that lateral-chromatic-aberration correction data is previously stored in the above-described image correction data storage and lateral chromatic aberration of a captured image is corrected using the lateral-chromatic-aberration correction data stored in the image correction data storage in the above-described image processing unit. The image processing unit corrects lateral chromatic aberration, in other words, a chromatic difference of magnification, so that the number of lenses forming an optical system can be reduced. Accordingly, with the above-described imaging apparatus, a zoom lens can be further miniaturized, a beautiful captured image can be attained, and the imaging apparatus can be miniaturized as a whole.

Next, the present invention will be more specifically described while showing embodiments. However, the present invention is not limited to the following embodiments. A zoom lens in each of embodiments cited below is a zoom lens (a variable-magnification optical system) used in the above-described imaging apparatus (optical apparatus), and particularly, can be suitably applied to an imaging apparatus to which a lens-interchangeable system is applied. Also, in each lens section, one's left side is an object side and one's right side is an image side when one faces the drawing.

First Embodiment (1) Optical Configuration of Zoom Lens

FIG. 1 is a lens section showing a lens configuration of a zoom lens according to a first embodiment of the present invention at a time when the zoom lens is focused at infinity while being at a wide-angle end. It is noted that a reference sign "IP" shown in the drawing denotes an image plane, and more specifically denotes a plane where an image is captured in a solid-state image sensor such as a CCD sensor or a CMOS sensor, or a film surface or the like of a silver-salt film. Also, on an object side of the image plane IP, a plane parallel plate such as a cover glass "CG" which does not have substantial refractive power is provided. The foregoing points hold true for each lens section referred to in the other embodiments, and thus, description therefor will be omitted there.

The zoom lens in the first embodiment includes sequentially from an object side, a front group having positive refractive power as a whole, and a lens group GB. The front group includes sequentially from an object side, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power. The sixth lens group G6 corresponds to a lens group GF. The lens group GB includes a seventh lens group G7 having negative refractive power. An aperture stop S is disposed adjacently to the third lens group G3 on an object side of the third lens group G3.

Below, a configuration of each lens group will be described. The first lens group G1 includes sequentially from an object side, a cemented lens formed of a negative meniscus lens L1 having a surface which is convex toward an object side and a double convex lens L2, which are cemented together, and a positive meniscus lens L3 having a surface which is convex toward an object side.

The second lens group G2 includes sequentially from an object side, a negative meniscus lens L4 having a surface which is convex toward an object side, and a cemented lens formed of three lenses cemented together, of a double concave lens L5, a double convex lens L6, and a negative meniscus lens L7 having a surface which is convex toward an image side. The negative meniscus lens L4 is a glass-molding-type aspherical lens in which an object-side surface has an aspherical shape.

The third lens group G3 includes sequentially from an object side, a positive meniscus lens L8 having a surface which is convex toward an object side, a double convex lens L9, and a cemented lens formed of a negative meniscus lens L10 having a surface which is convex toward an object side and a double convex lens L11, which are cemented together.

The fourth lens group G4 includes a double concave lens L12. The double concave lens L12 is a composite-resin-type aspherical lens in which a composite resin film molded in an aspherical shape is stuck to an object-side surface.

The fifth lens group G5 includes sequentially from an object side, a double convex lens L13, and a cemented lens formed of a negative meniscus lens L14 having a surface which is convex toward an object side and a double convex lens L15, which are cemented together. The double convex lens L13 is a glass-molding-type aspherical lens in which both surfaces have an aspherical shape.

The sixth lens group G6 includes a negative meniscus lens L16 having a surface which is convex toward an object side. The negative meniscus lens L16 is a glass-molding-type aspherical lens in which both surfaces have an aspherical shape.

The seventh lens group G7 includes sequentially from an object side, a double convex lens L17, a double concave lens L18, and a negative meniscus lens L19 having a surface which is convex toward an image side. Here, the double convex lens L17 corresponds to the positive lens component P, the double concave lens L18 corresponds to the negative lens component Nf, and the negative meniscus lens L19 corresponds to the negative lens component Nb.

In zooming from a wide-angle end to a telephoto end, the first lens group G1 is moved to an object side, the second lens group G2 is moved to an image side first, and then is moved to an object side, the third lens group G3 is moved to an object side, the fourth lens group G4 is moved to an object side, the fifth lens group G5 is moved to an object side, the sixth lens group G6 is moved to an object side, and the seventh lens group G7 is moved to an object side. In zooming, the third lens group G3, the fifth lens group G5, and the seventh lens group G7 are moved along the same track.

Focusing on an object in a close region from an object at infinity is obtained by movement of the sixth lens group G6 to an image side along an optical axis.

(2) Numerical-Value Example

Next, a numerical-value example in which specific numerical values of the zoom lens are applied will be described. Table 1 shows surface data of the zoom lens according to the first embodiment of the present invention (data of the 36th and 37th surfaces in Table 1 are surface data of the cover glass CG). In Table 1, a "surface number" indicates a number assigned to a lens surface, the number being counted from a lens surface on an object side, "r"

indicates a radius of curvature of a lens surface, "d" indicates a distance on an optical axis from a lens surface to an adjacent lens surface, "nd" indicates a refractive index for a d line (with a wavelength λ of 587.56 nm), and "vd" indicates an Abbe number for a d line. Also, "*" shown on a right side of a surface number indicates that its corresponding lens surface is aspherical, and "S" indicates an aperture stop. Further, "d(5)", "d(11)", or the like shown in a section of a distance on an optical axis from a lens surface to an adjacent lens surface means that a distance on an optical axis from the lens surface to its adjacent lens surface is a variable distance which varies with a change in a magnification. It is noted that all of units of lengths in each table are "mm", and "∞" in a section of a radius of curvature means a plane.

Table 2 is a specifications table of the zoom lens. In the specifications table, a focal length "f", an F number "Fno.", a half angle of view "ω", and the largest image height "Y" of the zoom lens at a time when it is focused at infinity are shown. Additionally, Table 2 shows sequentially from the left side, the foregoing values at a wide-angle end, the foregoing values in an intermediate-focal-length position, and the foregoing values at a telephoto end. It is noted that all of units of lengths in the table are "mm", and all of units of angles of view in the table are "°".

Table 3 shows variable distances on an optical axis in the zoom lens in cases where the zoom lens is focused at infinity (∞) and where the zoom lens is focused on an object in a close region (photographing distances are 300 mm at a wide-angle end, 500 mm in an intermediate-focal-length position, and 800 mm at a telephoto end, which are shown sequentially from the left side). In Table 3, variable distances in cases where the zoom lens is focused at infinity (∞) and where the zoom lens is focused on an object in a close region are shown, and the respective variable distances at a wide-angle end, in an intermediate-focal-length position, and at a telephoto end are shown sequentially from the left side.

Table 4 shows respective focal lengths of lens groups forming the zoom lens.

Table 5 shows respective aspherical coefficients of aspherical surfaces. The aspherical coefficients shown in the table are values provided in a case where respective aspherical shapes are defined by the following expression.

$$X=(H^2/r)/[1+\{1-(1+k)\cdot(H/r)^2\}^{1/2}]+A4\cdot H^4+A6\cdot H^6+A8\cdot H^8+A10\cdot H^{10}+A12\cdot H^{12}$$

It is noted that in the foregoing expression, "X" represents an amount of displacement from a reference surface along an optical axis, "r" represents a paraxial radius of curvature, "H" represents a height measured in a direction perpendicular to an optical axis, from an optical axis, "k" represents a conic constant (conic coefficient), and "An" represents an n-order aspherical coefficient. Also, in Table 5, "E-n" indicates "×10$^{-n}$".

Also, values in the condition expressions (1) to (8) and values used for calculation of the condition expressions (1) to (8) are shown in Table 46.

The above-described particulars regarding each table hold true in each table shown in the other embodiments, and thus, description therefor will be omitted there.

TABLE 1

| SURFACE NUMBER | r | d | nd | vd |
|---|---|---|---|---|
| SURFACE OF OBJECT | ∞ | d(0) | | |
| 1 | 126.8033 | 1.2000 | 1.85478 | 24.80 |
| 2 | 73.1163 | 6.5498 | 1.49700 | 81.61 |
| 3 | −619.9628 | 0.2000 | | |
| 4 | 57.8673 | 4.7502 | 1.59349 | 67.00 |
| 5 | 168.1327 | d(5) | | |
| 6 | 73.0270 | 1.1000 | 1.87070 | 40.73 |
| 7 | 20.1788 | 6.5245 | | |
| 8 | −59.9309 | 0.8000 | 1.87070 | 40.73 |
| 9 | 32.6271 | 6.1879 | 1.84666 | 23.78 |
| 10 | −33.8219 | 0.9000 | 1.80420 | 46.50 |
| 11 | −633.2189 | d(11) | | |
| 12S | ∞ | 1.2000 | | |
| 13 | 34.8967 | 2.5748 | 1.85478 | 24.80 |
| 14 | 105.2664 | 0.2143 | | |
| 15 | 48.7916 | 2.8950 | 1.72916 | 54.67 |
| 16 | −207.3456 | 0.2000 | | |
| 17 | 101.3163 | 0.9000 | 1.80809 | 22.76 |
| 18 | 29.9068 | 3.5853 | 1.49700 | 81.61 |
| 19 | −132.7415 | d(19) | | |
| 20* | −23.7077 | 0.2468 | 1.51460 | 49.96 |
| 21 | −25.7724 | 0.8000 | 1.85150 | 40.78 |
| 22 | 66.2251 | d(22) | | |
| 23* | 23.0080 | 6.3068 | 1.69350 | 53.18 |
| 24* | −48.1474 | 0.2000 | | |
| 25 | 37.0746 | 0.8000 | 1.91082 | 35.25 |
| 26 | 16.3655 | 6.4374 | 1.49700 | 81.61 |
| 27 | −35.1960 | d(27) | | |
| 28* | 79.0659 | 0.9000 | 1.59201 | 67.02 |
| 29* | 19.9423 | d(29) | | |
| 30 | 36.6023 | 6.3766 | 1.67270 | 32.10 |
| 31 | −45.2833 | 0.2000 | | |
| 32 | −303.8734 | 0.9000 | 1.85150 | 48.78 |
| 33 | 40.0745 | 6.5841 | | |
| 34 | −21.0548 | 1.0000 | 1.72916 | 54.88 |
| 35 | −52.1735 | d(35) | | |
| 36 | ∞ | 2.5000 | 1.51680 | 64.20 |
| 37 | ∞ | 1.0000 | | |
| IMAGE PLANE | ∞ | | | |

TABLE 2

| | WIDE-ANGLE END | INTERMEDIATE | TELEPHOTO END |
|---|---|---|---|
| f | 28.7936 | 75.0289 | 193.9307 |
| FNo. | 2.8965 | 4.1889 | 5.7781 |
| ω | 37.6195 | 15.3512 | 6.1472 |
| Y | 21.6330 | 21.6330 | 21.6330 |

TABLE 3

| | WIDE-ANGLE END | INTERMEDIATE | TELEPHOTO END | WIDE-ANGLE END | INTERMEDIATE | TELEPHOTO END |
|---|---|---|---|---|---|---|
| d(0) | ∞ | ∞ | ∞ | 165.7499 | 340.7231 | 610.7498 |
| d(5) | 0.8000 | 24.6717 | 48.0431 | 0.8000 | 24.6717 | 48.0431 |
| d(11) | 24.4154 | 10.1212 | 2.1272 | 24.4154 | 10.1212 | 2.1272 |
| d(19) | 2.2954 | 4.0353 | 6.4036 | 2.2954 | 4.0353 | 6.4036 |
| d(22) | 5.2082 | 3.4678 | 1.1000 | 5.2082 | 3.4678 | 1.1000 |
| d(27) | 1.3034 | 2.3598 | 1.4441 | 2.8006 | 5.0953 | 8.0146 |

TABLE 3-continued

| | WIDE-ANGLE END | INTERMEDIATE | TELEPHOTO END | WIDE-ANGLE END | INTERMEDIATE | TELEPHOTO END |
|---|---|---|---|---|---|---|
| d(29) | 12.6942 | 11.6380 | 12.5536 | 11.1970 | 8.9024 | 5.9831 |
| d(35) | 13.4999 | 28.9498 | 43.5451 | 13.4999 | 28.9498 | 43.5451 |

TABLE 4

| | |
|---|---|
| G1 | 106.0065 |
| G2 | −21.9002 |
| G3 | 28.3494 |
| G4 | −20.7806 |
| G5 | 19.0830 |
| G6 | −45.3040 |
| G7 | −144.1356 |

TABLE 5

| SURFACE NUMBER | k | A4 | A6 | A8 | A10 | A12 |
|---|---|---|---|---|---|---|
| 6 | 0.0000 | −9.86089E−07 | −9.19169E−10 | −2.48794E−12 | 1.49982E−15 | 0.00000E+00 |
| 20 | −0.1591 | 3.73272E−05 | −9.02045E−08 | 9.87967E−10 | −7.53595E−12 | 2.38762E−14 |
| 23 | 0.3924 | −2.16911E−05 | 8.68108E−09 | 1.11227E−09 | −1.16883E−11 | 4.79637E−14 |
| 24 | 0.0000 | 3.27128E−05 | −1.04498E−07 | 2.33175E−09 | −2.01761E−11 | 7.62655E−14 |
| 28 | 0.0000 | −2.55954E−05 | 3.56502E−07 | −1.70180E−09 | −6.24255E−12 | 6.45296E−14 |
| 29 | 0.0000 | −3.14993E−05 | 4.15457E−07 | −2.60403E−09 | −9.27673E−13 | 5.04098E−14 |

Figure 2:
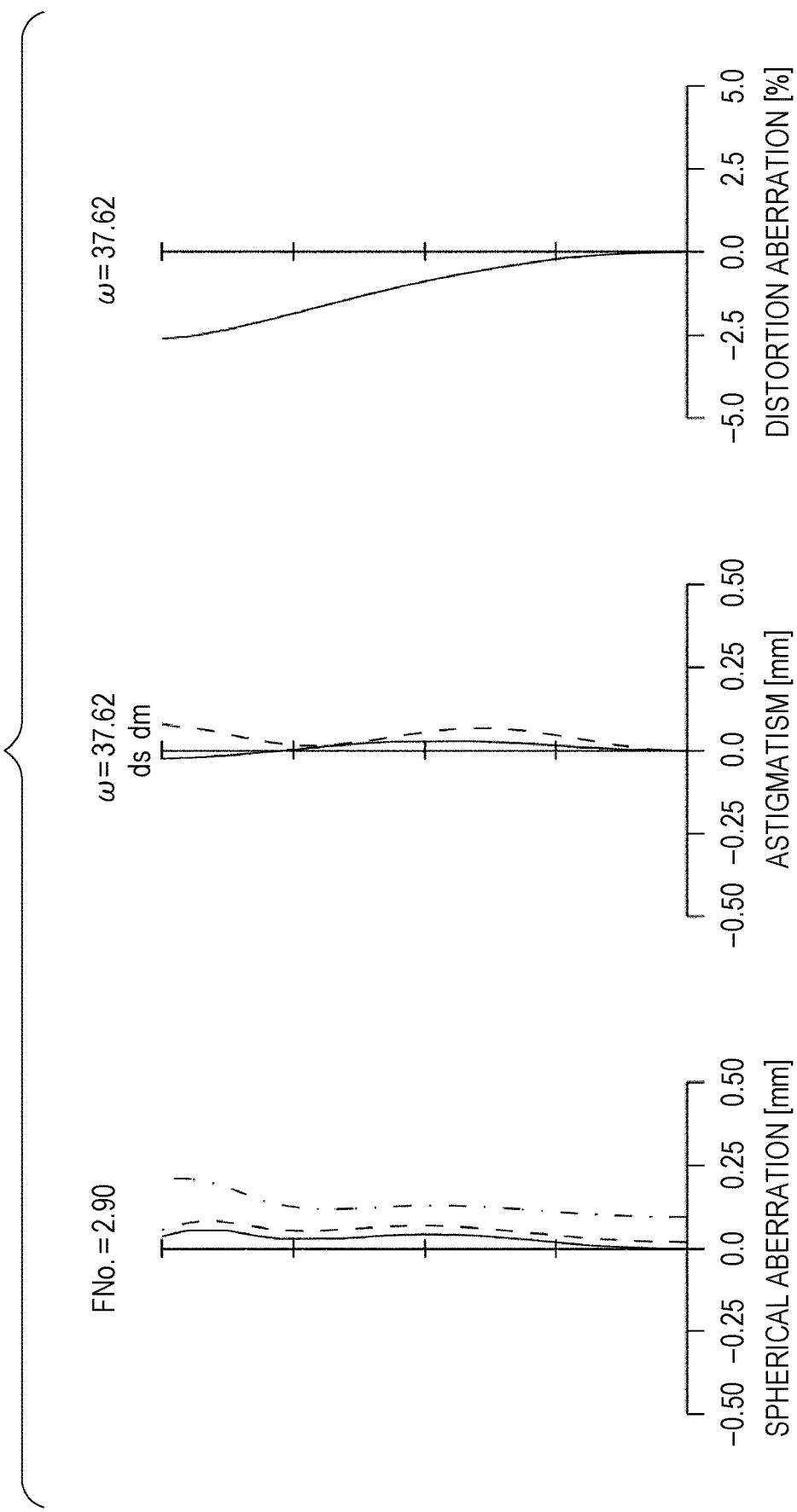
FIG. 2 is a diagram of aberration in the zoom lens according to the first embodiment at a wide-angle end.
Figure 3:
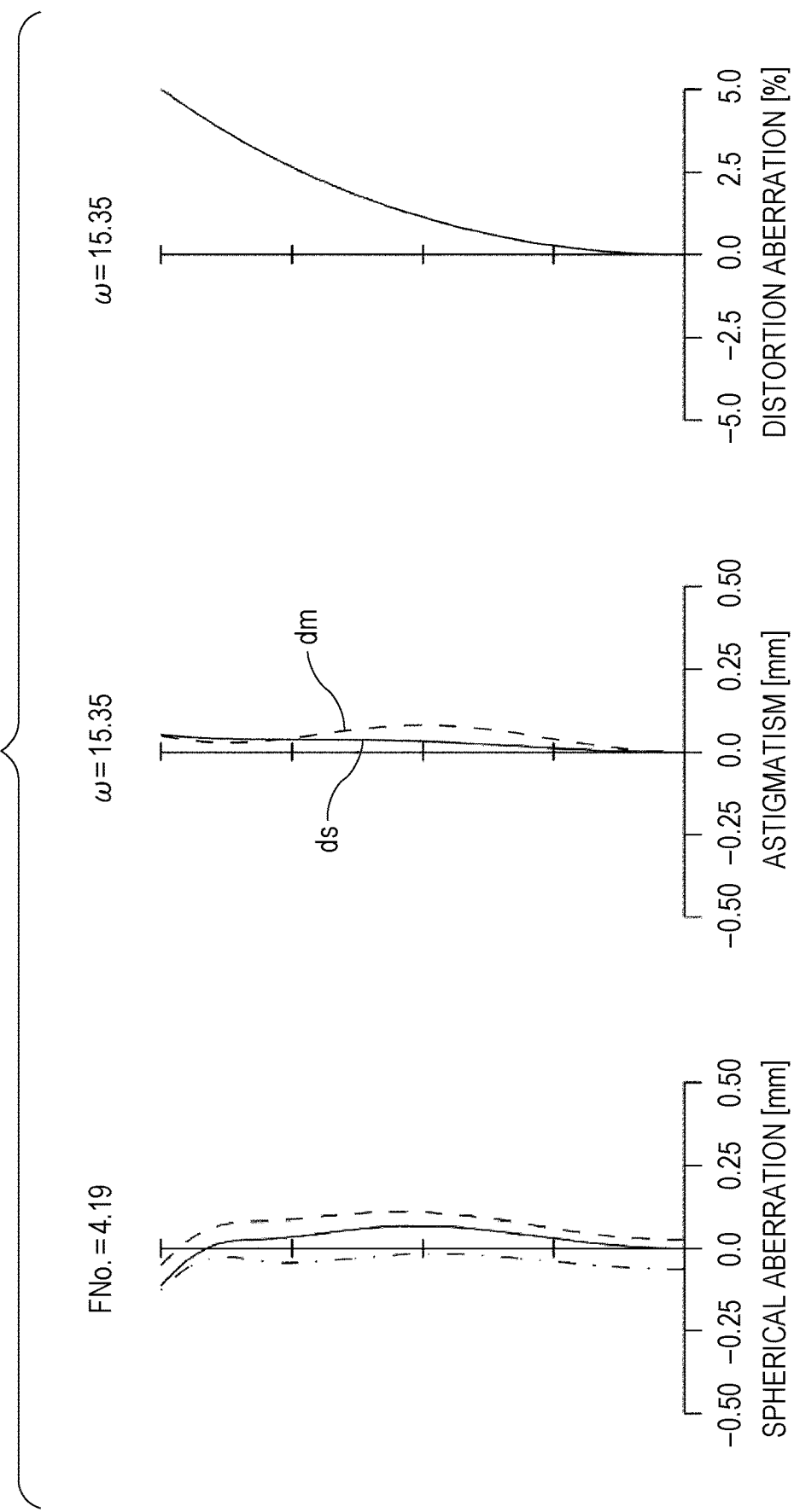
FIG. 3 is a diagram of aberration in the zoom lens according to the first embodiment in an intermediate-focal-length position.
Figure 4:
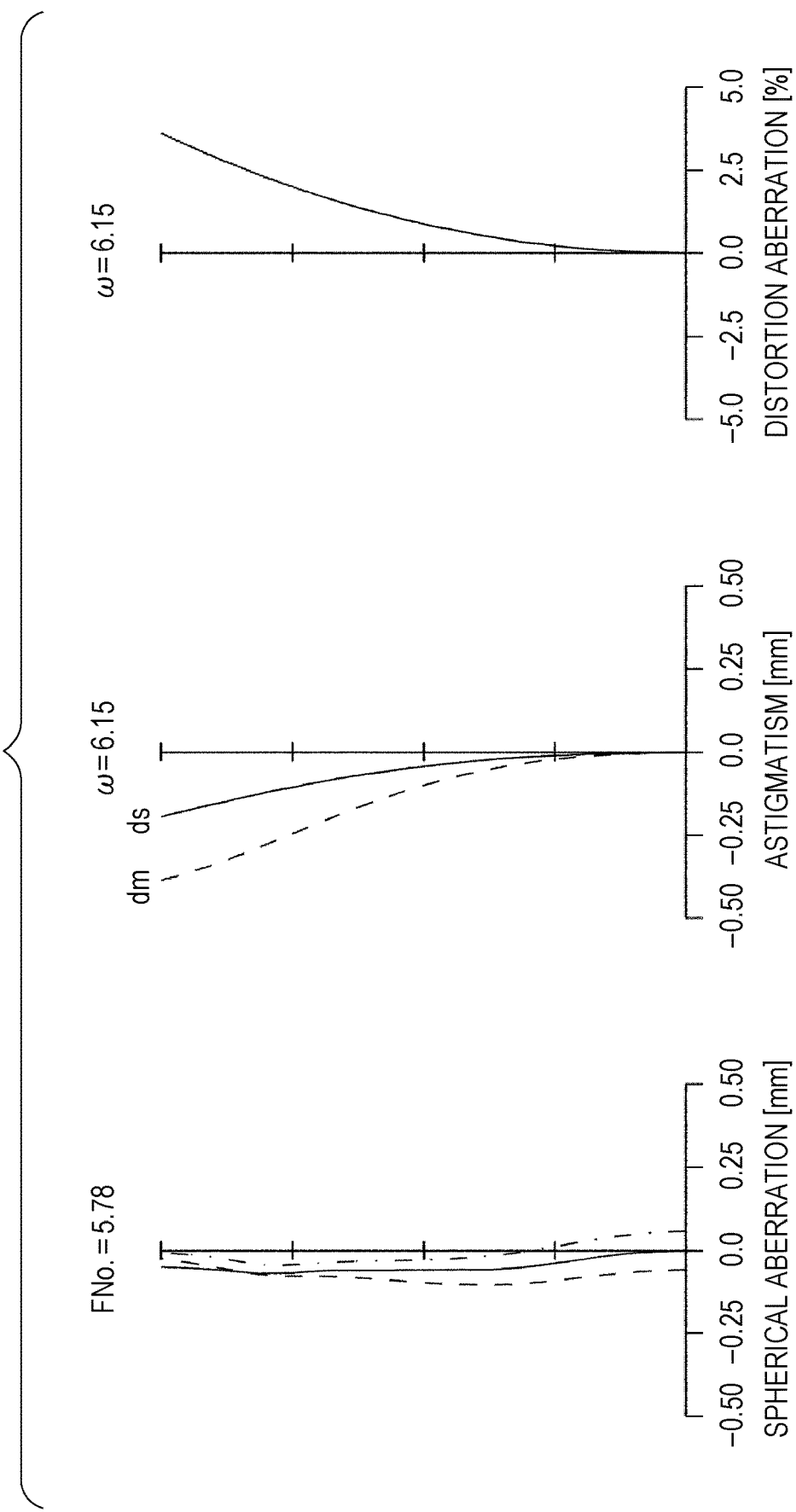
FIG. 4 is a diagram of aberration in the zoom lens according to the first embodiment at a telephoto end.

Also, in FIGS. 2 to 4, diagrams of longitudinal aberration in cases where the zoom lens in the first embodiment is focused at infinity while being at a wide-angle end, in an intermediate-focal-length position, and at a telephoto end, respectively, are provided. Diagrams of longitudinal aberration provided in each drawing are diagrams of spherical aberration (mm), astigmatism (mm), and distortion aberration (%) from the left side when one faces the drawing. In a diagram showing spherical aberration, a ratio to a maximum aperture is plotted in a vertical axis while a defocus is plotted in a horizontal axis. A solid line indicates aspherical aberration in a d line (with a wavelength λ of 587.56 nm), a broken line indicates aspherical aberration in a C line (with a wavelength λ of 656.28 nm), a dash-dot line indicates aspherical aberration in a g line (with a wavelength λ of 435.84 nm). In a diagram showing astigmatism, a half angle of view is plotted in a vertical axis while a defocus is plotted in a horizontal axis. A solid line indicates a sagittal image plane (ds) for a d line, and a broken line indicates a meridional image plane (dm) for a d line. In a diagram showing distortion aberration, a half angle of view is plotted in a vertical axis, and % is plotted in a horizontal axis, to represent distortion aberration. Those particulars regarding diagrams of longitudinal aberration hold true in diagrams of longitudinal aberration shown in the other embodiments, and thus, description therefor will be omitted there.

Second Embodiment (1) Optical Configuration of Zoom Lens

Figure 5:
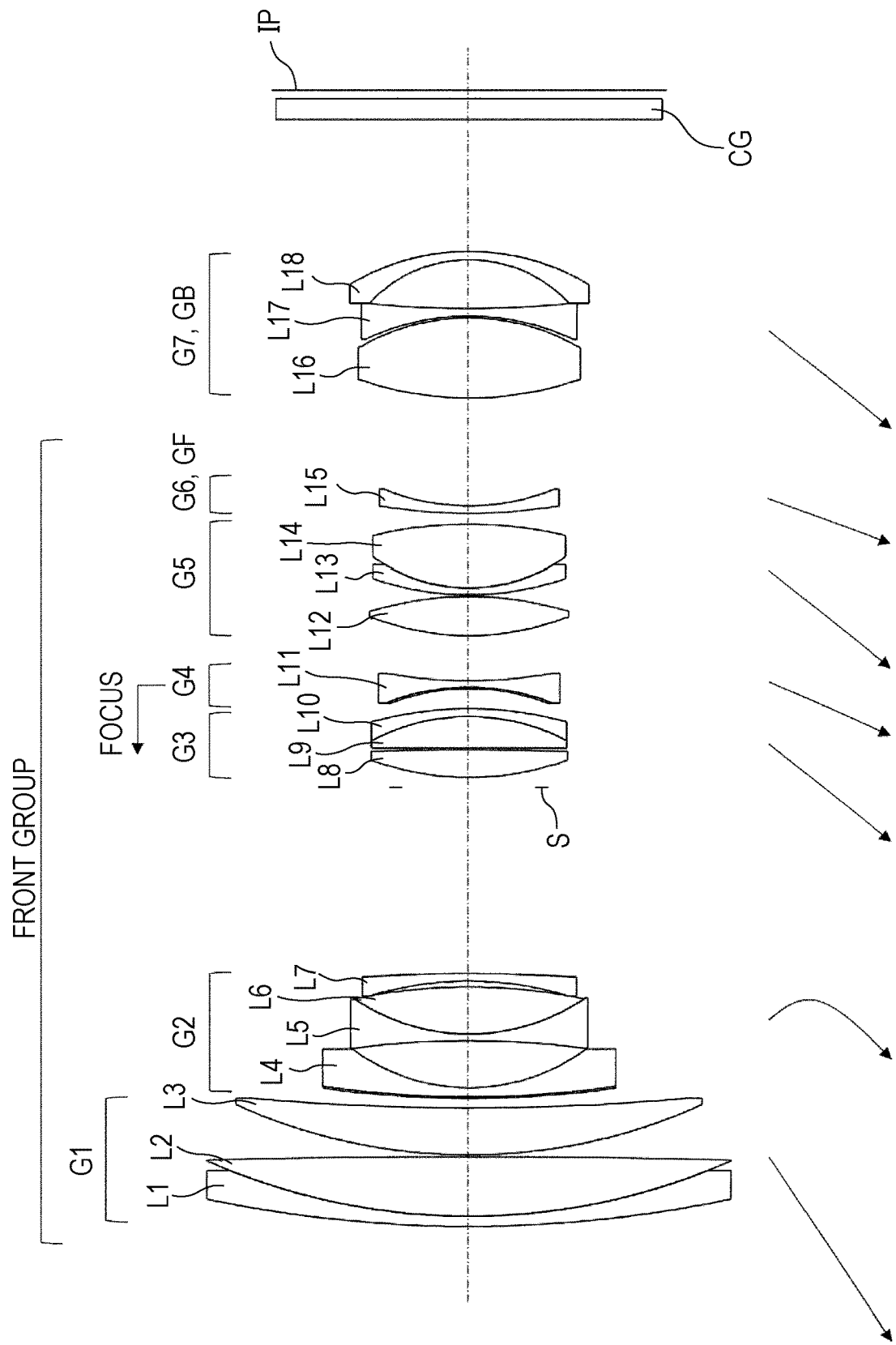
FIG. 5 shows a lens section at a time when a zoom lens according to a second embodiment of the present invention is focused at infinity while being at a wide-angle end.
Figure 6:
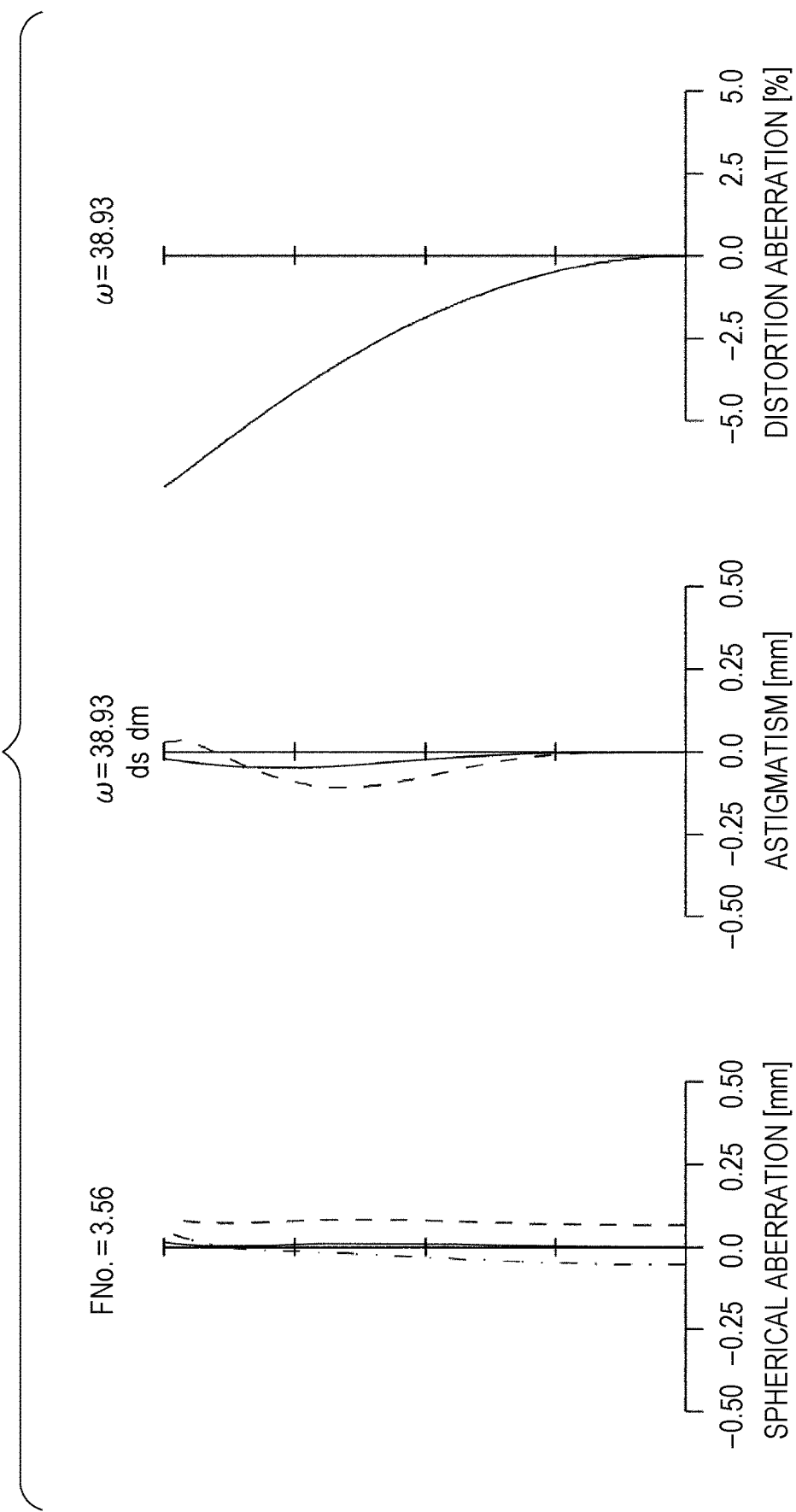
FIG. 6 is a diagram of aberration in the zoom lens according to the second embodiment at a wide-angle end.
Figure 7:
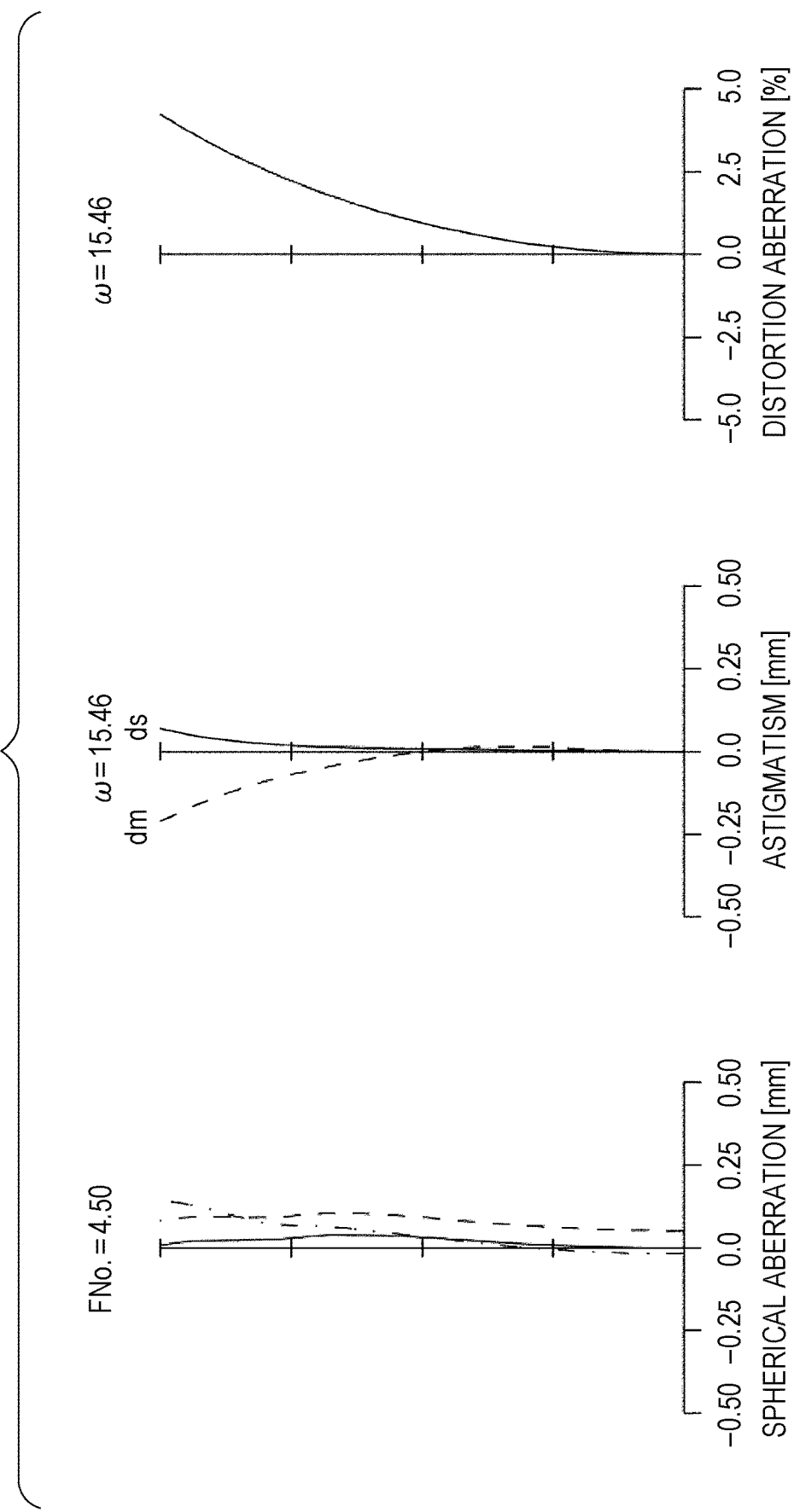
FIG. 7 is a diagram of aberration in the zoom lens according to the second embodiment in an intermediate-focal-length position.
Figure 8:
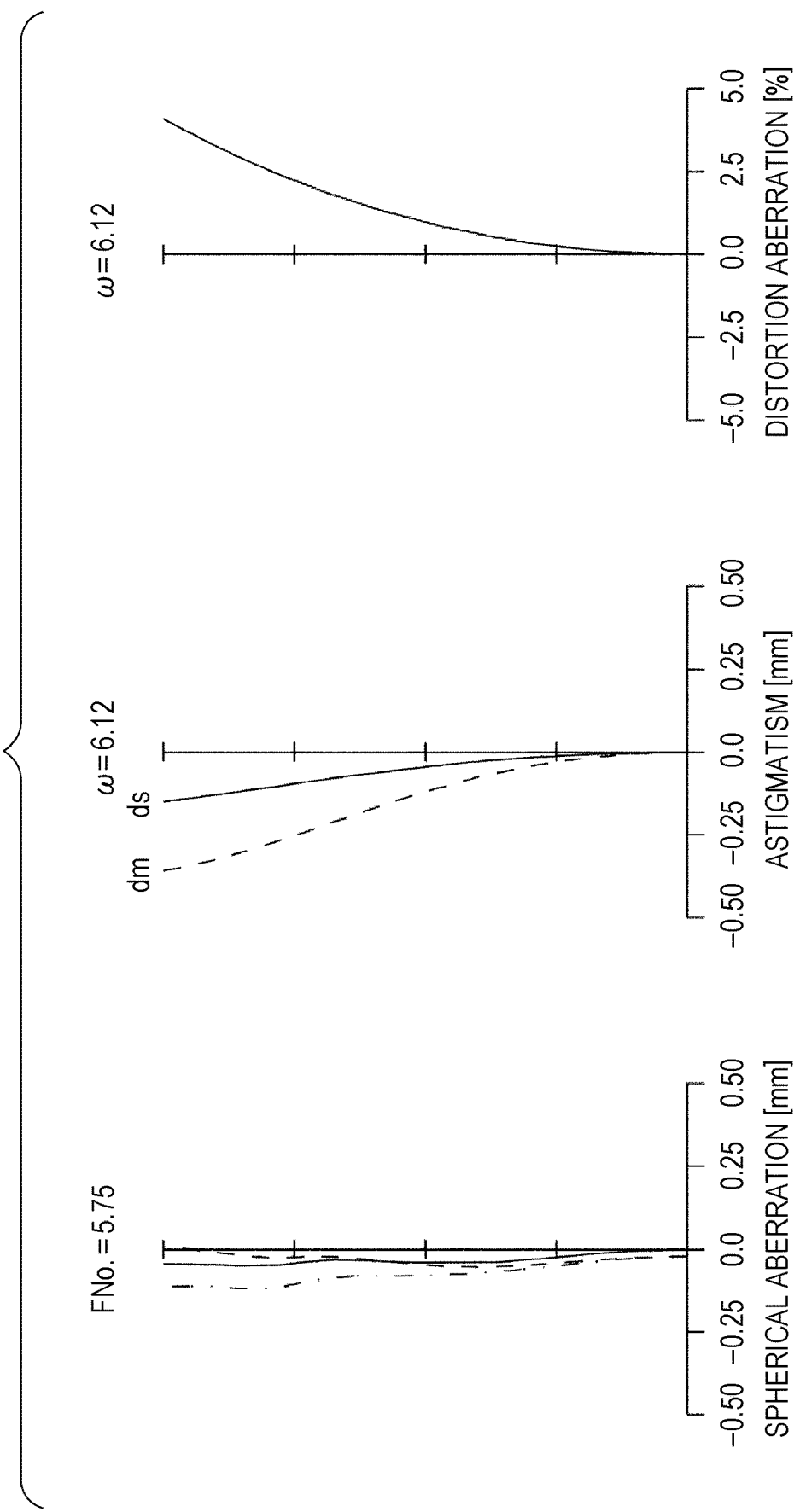
FIG. 8 is a diagram of aberration in the zoom lens according to the second embodiment at a telephoto end.

FIG. 5 is a lens section showing a lens configuration of a zoom lens according to a second embodiment of the present invention at a time when the zoom lens is focused at infinity while being at a wide-angle end. The zoom lens includes sequentially from an object side, a front group having positive refractive power as a whole, and a lens group GB. The front group includes sequentially from an object side, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power. The sixth lens group G6 corresponds to a lens group GF. The lens group GB includes a seventh lens group G7 having negative refractive power. An aperture stop S is disposed adjacently to the third lens group G3 on an object side of the third lens group G3.

Below, a configuration of each lens group will be described. The first lens group G1 includes sequentially from an object side, a cemented lens formed of a negative meniscus lens L1 having a surface which is convex toward an object side and a double convex lens L2, which are cemented together, and a positive meniscus lens L3 having a surface which is convex toward an object side.

The second lens group G2 includes sequentially from an object side, a negative meniscus lens L4 having a surface which is convex toward an object side, and a cemented lens formed of a double concave lens L5 and a double convex lens L6 which are cemented together, and a negative meniscus lens L7 having a surface which is convex toward an image side. The negative meniscus lens L4 is a composite-resin-type aspherical lens in which a composite resin film molded in an aspherical shape is stuck to an object-side surface.

The third lens group G3 includes sequentially from an object side, a double convex lens L8 and a cemented lens formed of a double convex lens L9 and a negative meniscus lens L10 having a surface which is convex toward an image side.

The fourth lens group G4 includes a double concave lens L11. The double concave lens L11 is a composite-resin-type aspherical lens in which a composite resin film molded in an aspherical shape is stuck to an object-side surface.

The fifth lens group G5 includes sequentially from an object side, a double convex lens L12, and a cemented lens formed of a negative meniscus lens L13 having a surface which is convex toward an object side and a double convex lens L14, which are cemented together. The double convex lens L12 is a glass-molding-type aspherical lens in which both surfaces have an aspherical shape.

The sixth lens group G6 includes a negative meniscus lens L15 having a surface which is convex toward an object side. The negative meniscus lens L15 is a glass-molding-type aspherical lens in which both surfaces have an aspherical shape.

The seventh lens group G7 includes sequentially from an object side, a double convex lens L16, a double concave lens L17, and a negative meniscus lens L18 having a surface which is convex toward an image side. Here, the double convex lens L16 corresponds to the positive lens component P, the double concave lens L17 corresponds to the negative lens component Nf, and the negative meniscus lens L18 corresponds to the negative lens component Nb.

In zooming from a wide-angle end to a telephoto end, the first lens group G1 is moved to an object side, the second lens group G2 is moved to an image side first, and then is moved to an object side, the third lens group G3 is moved to an object side, the fourth lens group G4 is moved to an object side, the fifth lens group G5 is moved to an object side, the sixth lens group G6 is moved to an object side, and the seventh lens group G7 is moved to an object side. In zooming, the third lens group G3, the fifth lens group G5, and the seventh lens group G7 are moved along the same track.

Focusing on an object in a close region from an object at infinity is obtained by movement of the fourth lens group G4 to an object side along an optical axis.

(2) Numerical-Value Example

Next, a numerical-value example in which specific numerical values of the zoom lens are applied will be described. Table 6 shows surface data of the zoom lens. Table 7 shows specifications of the zoom lens. Table 8 shows variable distances on an optical axis in the zoom lens in cases where the zoom lens is focused at infinity and where the zoom lens is focused on an object in a close region (photographing distances are 500 mm at a wide-angle end, 500 mm in an intermediate-focal-length position, and 800 mm at a telephoto end, which are shown sequentially from the left side). Table 9 shows respective focal lengths of lens groups forming the zoom lens. Table 10 shows respective aspherical coefficients of aspherical surfaces. It is noted that each aspherical coefficient not shown in Table 10 is 0.00. Also, values in the condition expressions (1) to (8) and values used for calculation of the condition expressions (1) to (8) are shown in Table 46.

Further, in FIGS. 5 to 8, diagrams of longitudinal aberration in cases where the zoom lens in the second embodiment is focused at infinity while being at a wide-angle end, in an intermediate-focal-length position, and at a telephoto end, respectively, are provided.

TABLE 6

| SURFACE NUMBER | r | d | nd | vd |
|---|---|---|---|---|
| SURFACE OF OBJECT | ∞ | d(0) | | |
| 1 | 149.3109 | 1.2000 | 1.85478 | 24.80 |
| 2 | 76.0948 | 7.1171 | 1.49700 | 81.61 |
| 3 | −1072.3665 | 0.2000 | | |
| 4 | 66.0148 | 5.5600 | 1.59349 | 67.00 |
| 5 | 283.4193 | d(5) | | |
| 6* | 131.1407 | 0.1500 | 1.51460 | 49.96 |
| 7 | 117.0450 | 1.1000 | 1.90366 | 31.31 |
| 8 | 22.8085 | 5.5879 | | |
| 9 | −107.5361 | 0.8000 | 1.83481 | 42.72 |
| 10 | 24.0970 | 5.5879 | 1.84666 | 23.78 |
| 11 | −64.4752 | 0.6867 | | |
| 12 | −39.5818 | 0.9000 | 1.80420 | 46.50 |
| 13 | −185.3667 | d(13) | | |
| 14S | ∞ | 1.2000 | | |
| 15 | 33.8846 | 3.2667 | 1.80000 | 29.84 |
| 16 | −332.6257 | 0.2000 | | |
| 17 | 5000.0000 | 3.7611 | 1.57501 | 41.50 |
| 18 | −24.4679 | 0.9000 | 1.83400 | 37.21 |
| 19 | −43.8545 | d(19) | | |
| 20* | −22.9591 | 0.1500 | 1.51460 | 49.96 |
| 21 | −26.0428 | 0.8000 | 1.87070 | 40.73 |
| 22 | 53.6491 | d(22) | | |
| 23* | 28.6779 | 4.6565 | 1.69350 | 53.18 |
| 24* | −36.5598 | 0.2000 | | |
| 25 | 34.5392 | 0.8000 | 1.92119 | 23.96 |
| 26 | 19.3565 | 7.5164 | 1.49700 | 81.61 |
| 27 | −48.5874 | d(27) | | |
| 28* | 57.6247 | 0.9000 | 1.68893 | 31.16 |
| 29* | 25.8168 | d(29) | | |
| 30 | 40.1744 | 9.5000 | 1.64769 | 33.79 |
| 31 | −25.7354 | 0.2000 | | |
| 32 | −28.7174 | 0.9000 | 1.87070 | 40.73 |
| 33 | 120.1990 | 5.7951 | | |
| 34 | −16.0000 | 1.0000 | 1.72916 | 54.67 |
| 35 | −26.9906 | d(35) | | |
| 36 | ∞ | 2.5000 | 1.51680 | 64.20 |
| 37 | ∞ | 1.0000 | | |
| IMAGE PLANE | ∞ | | | |

TABLE 7

| | WIDE-ANGLE END | INTERMEDIATE | TELEPHOTO END |
|---|---|---|---|
| f | 28.8088 | 74.9934 | 193.9843 |
| FNo. | 3.5613 | 4.4997 | 5.7497 |
| ω | 38.9265 | 15.4642 | 6.1181 |
| Y | 21.6330 | 21.6330 | 21.6330 |

TABLE 8

| | WIDE-ANGLE END | INTERMEDIATE | TELEPHOTO END | WIDE-ANGLE END | INTERMEDIATE | TELEPHOTO END |
|---|---|---|---|---|---|---|
| d(0) | ∞ | ∞ | ∞ | 365.0001 | 336.8530 | 605.0002 |
| d(5) | 1.1522 | 30.8984 | 55.1293 | 1.1522 | 30.8984 | 55.1293 |
| d(13) | 22.1323 | 7.0681 | 1.6849 | 22.1323 | 7.0681 | 1.6849 |
| d(19) | 2.4416 | 3.6056 | 7.1001 | 1.4943 | 1.8713 | 4.1187 |
| d(22) | 5.3399 | 4.1757 | 0.6812 | 6.2872 | 5.9101 | 3.6627 |
| d(27) | 1.2932 | 4.9795 | 8.9510 | 1.2932 | 4.9795 | 8.9510 |
| d(29) | 12.8482 | 9.1620 | 5.1904 | 12.8482 | 9.1620 | 5.1904 |
| d(35) | 15.6570 | 29.1223 | 42.1273 | 15.6570 | 29.1223 | 42.1273 |

TABLE 9

| | |
|---|---|
| G1 | 118.8991 |
| G2 | -22.4091 |
| G3 | 29.9675 |
| G4 | -18.9990 |
| G5 | 18.6329 |
| G6 | -68.6819 |
| G7 | -97.2914 |

TABLE 10

| SURFACE NUMBER | k | A4 | A6 | A8 | A10 | A12 |
|---|---|---|---|---|---|---|
| 6 | 0.0000 | 8.87003E-07 | 2.06774E-09 | -1.18068E-11 | 2.04323E-14 | 0.00000E+00 |
| 20 | 1.7375 | 4.27377E-05 | 5.59066E-08 | 5.40110E-10 | -1.90435E-12 | 1.76795E-14 |
| 23 | 0.3977 | -1.92166E-05 | -8.94668E-08 | 5.51734E-10 | -5.49188E-12 | 1.83133E-14 |
| 24 | 0.0000 | 9.06050E-06 | -2.84346E-08 | 5.73029E-10 | -4.90970E-12 | 1.56700E-14 |
| 28 | 0.0000 | -2.00094E-05 | 1.97916E-07 | -1.34790E-09 | 2.09962E-12 | 2.13721E-14 |
| 29 | 0.0000 | -1.78331E-05 | 2.09037E-07 | -1.29736E-09 | 5.07192E-13 | 3.57901E-14 |

Third Embodiment (1) Optical Configuration of Zoom Lens

Figure 9:
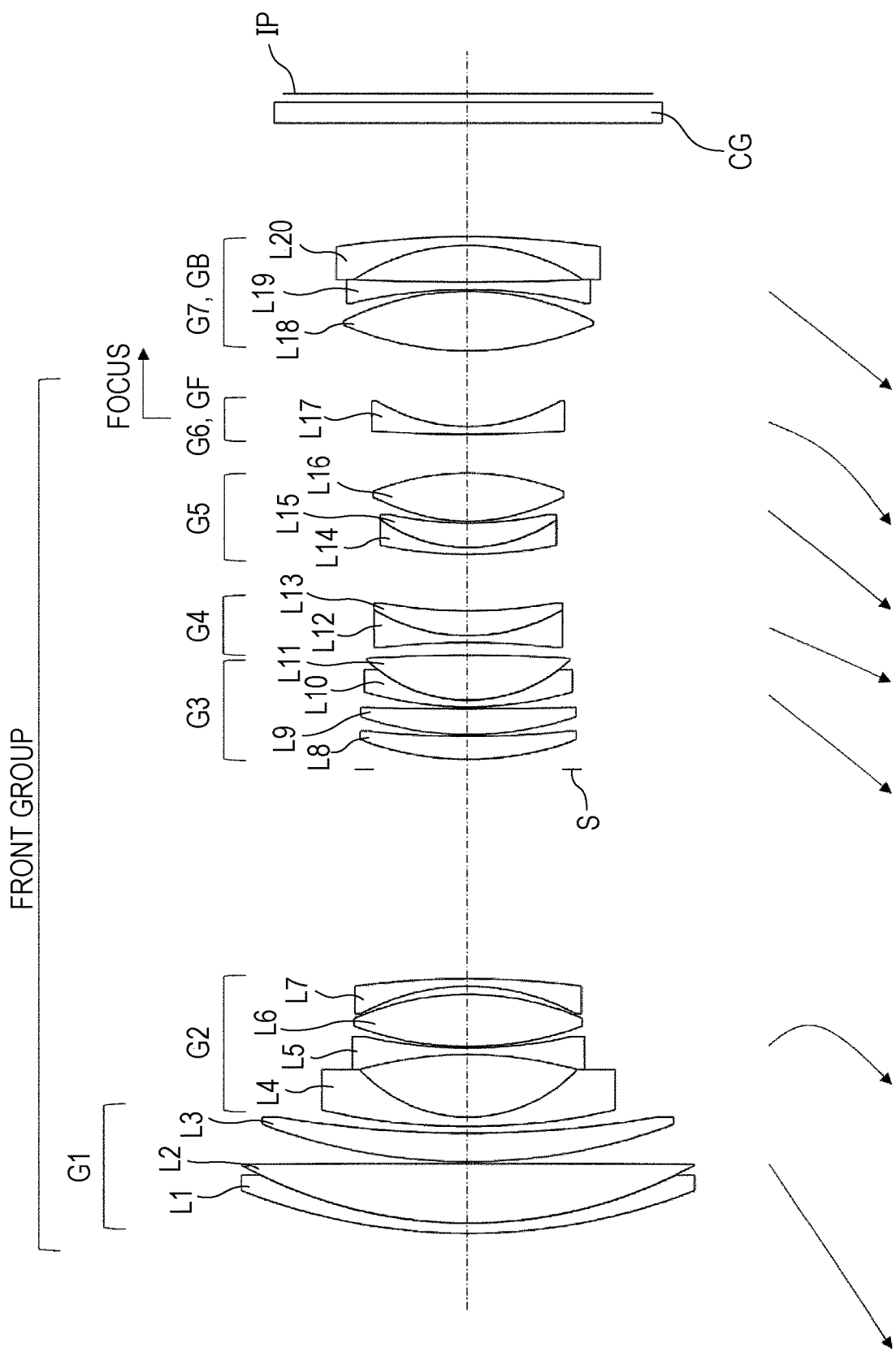
FIG. 9 shows a lens section at a time when a zoom lens according to a third embodiment of the present invention is focused at infinity while being at a wide-angle end.

FIG. 9 is a lens section showing a lens configuration of a zoom lens according to a third embodiment of the present invention at a time when the zoom lens is focused at infinity while being at a wide-angle end. The zoom lens includes sequentially from an object side, a front group having positive refractive power as a whole, and a lens group GB. The front group includes sequentially from an object side, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power. The sixth lens group G6 corresponds to a lens group GF. The lens group GB includes a seventh lens group G7 having negative refractive power. An aperture stop S is disposed adjacently to the third lens group G3 on an object side of the third lens group G3.

Below, a configuration of each lens group will be described. The first lens group G1 includes sequentially from an object side, a cemented lens formed of a negative meniscus lens L1 having a surface which is convex toward an object side and a double convex lens L2, which are cemented together, and a positive meniscus lens L3 having a surface which is convex toward an object side.

The second lens group G2 includes sequentially from an object side, a negative meniscus lens L4 having a surface which is convex toward an object side, a double concave lens L5, a double convex lens L6, and a negative meniscus lens L7 having a surface which is convex toward an image side. The negative meniscus lens L4 is a glass-molding-type aspherical lens in which an object-side surface has an aspherical shape.

The third lens group G3 includes sequentially from an object side, a positive meniscus lens L8 having a surface which is convex toward an object side, a positive meniscus lens L9 having a surface which is convex toward an object side, and a cemented lens formed of a negative meniscus lens L10 having a surface which is convex toward an object side and a double convex lens L11, which are cemented together. The positive meniscus lens L8 is a glass-molding-type aspherical lens in which both surfaces have an aspherical shape.

The fourth lens group G4 includes a cemented lens formed of a double concave lens L12 and a positive meniscus lens L13 having a surface which is convex toward an object side, which are cemented together and are arranged in the stated order from an object side.

The fifth lens group G5 includes sequentially from an object side, a cemented lens formed of a negative meniscus lens L14 having a surface which is convex toward an object side and a positive meniscus lens L15 having a surface which is convex toward an object side, which are cemented together, and a double convex lens L16. The double convex lens L16 is a glass-molding-type aspherical lens in which both surfaces have an aspherical shape.

The sixth lens group G6 includes a negative meniscus lens L17 having a surface which is convex toward an object side. The negative meniscus lens L17 is a glass-molding-type aspherical lens in which an image-side surface has an aspherical shape.

The seventh lens group G7 includes sequentially from an object side, a double convex lens L18, a double concave lens L19, and a negative meniscus lens L20 having a surface which is convex toward an image side. Here, the double convex lens L18 corresponds to the positive lens component P, the double concave lens L19 corresponds to the negative lens component Nf, and the negative meniscus lens L20 corresponds to the negative lens component Nb.

In zooming from a wide-angle end to a telephoto end, the first lens group G1 is moved to an object side, the second lens group G2 is moved to an image side first, and then is moved to an object side, the third lens group G3 is moved to an object side, the fourth lens group G4 is moved to an object side, the fifth lens group G5 is moved to an object side, the sixth lens group G6 is moved to an object side, and the seventh lens group G7 is moved to an object side. In zooming, the third lens group G3, the fifth lens group G5, and the seventh lens group G7 are moved along the same track.

Focusing on an object in a close region from an object at infinity is obtained by movement of the sixth lens group G6 to an image side along an optical axis.

(2) Numerical-Value Example

Next, a numerical-value example in which specific numerical values of the zoom lens are applied will be described. Table 11 shows surface data of the zoom lens. Table 12 shows specifications of the zoom lens. Table 13 shows variable distances on an optical axis in the zoom lens in cases where the zoom lens is focused at infinity and where the zoom lens is focused on an object in a close region (photographing distances are 300 mm at a wide-angle end, 500 mm in an intermediate-focal-length position, and 800 mm at a telephoto end, which are shown sequentially from the left side). Table 14 shows respective focal lengths of lens groups forming the zoom lens. Table 15 shows respective aspherical coefficients of aspherical surfaces. It is noted that each aspherical coefficient not shown in Table 15 is 0.00. Also, values in the condition expressions (1) to (8) and values used for calculation of the condition expressions (1) to (8) are shown in Table 46.

Figure 10:
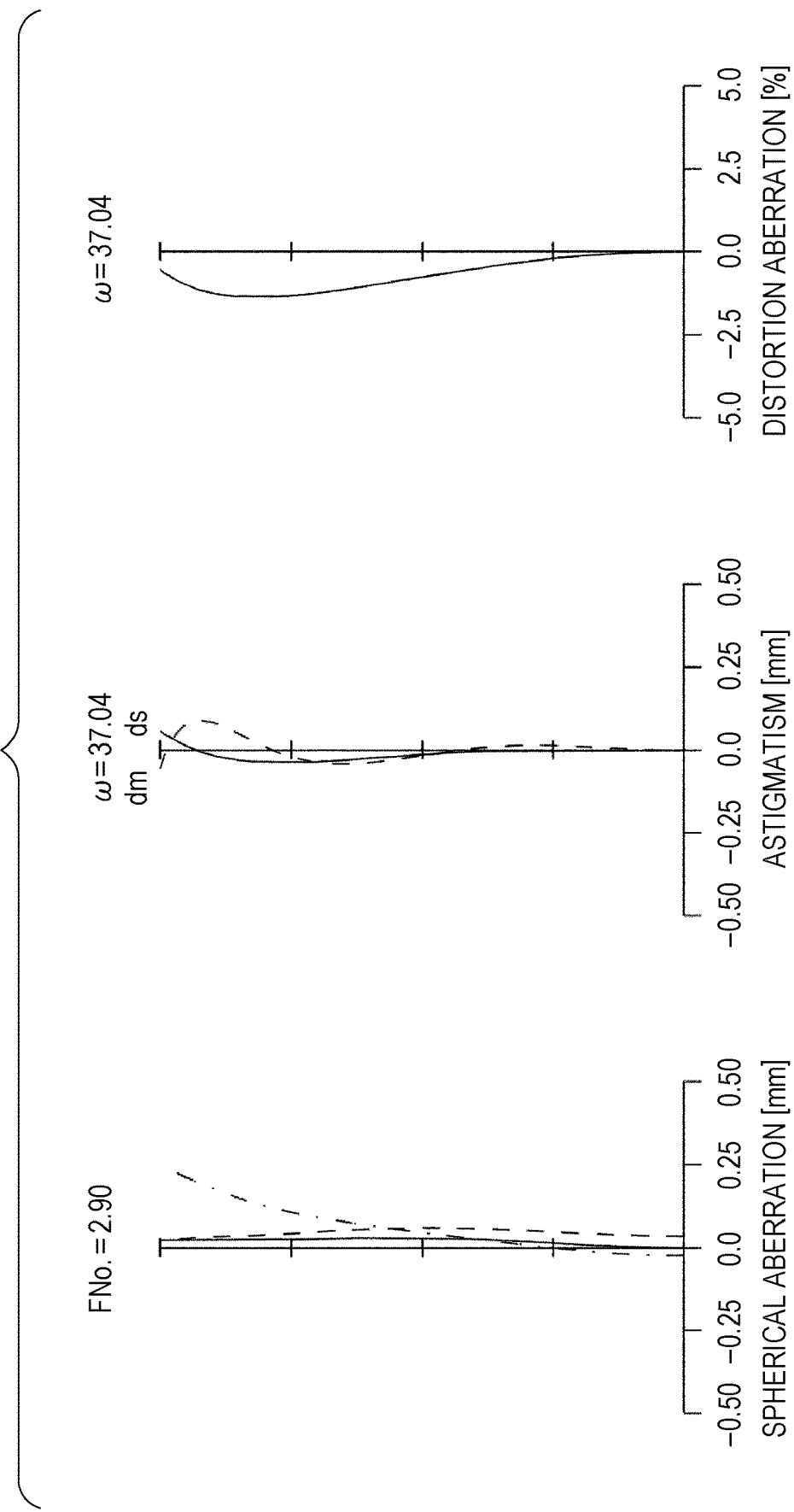
FIG. 10 is a diagram of aberration in the zoom lens according to the third embodiment at a wide-angle end.
Figure 11:
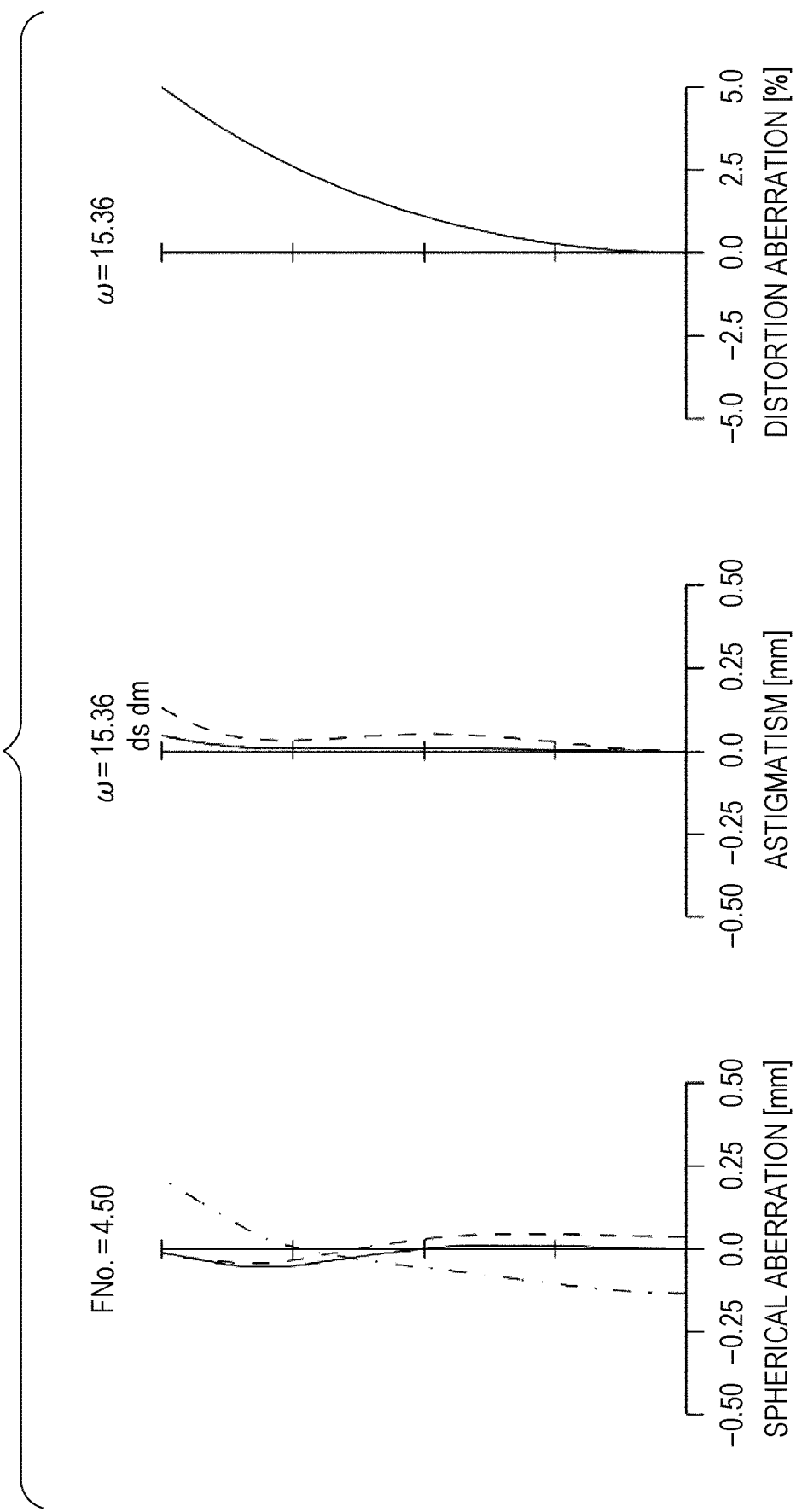
FIG. 11 is a diagram of aberration in the zoom lens according to the third embodiment in an intermediate-focal-length position.
Figure 12:
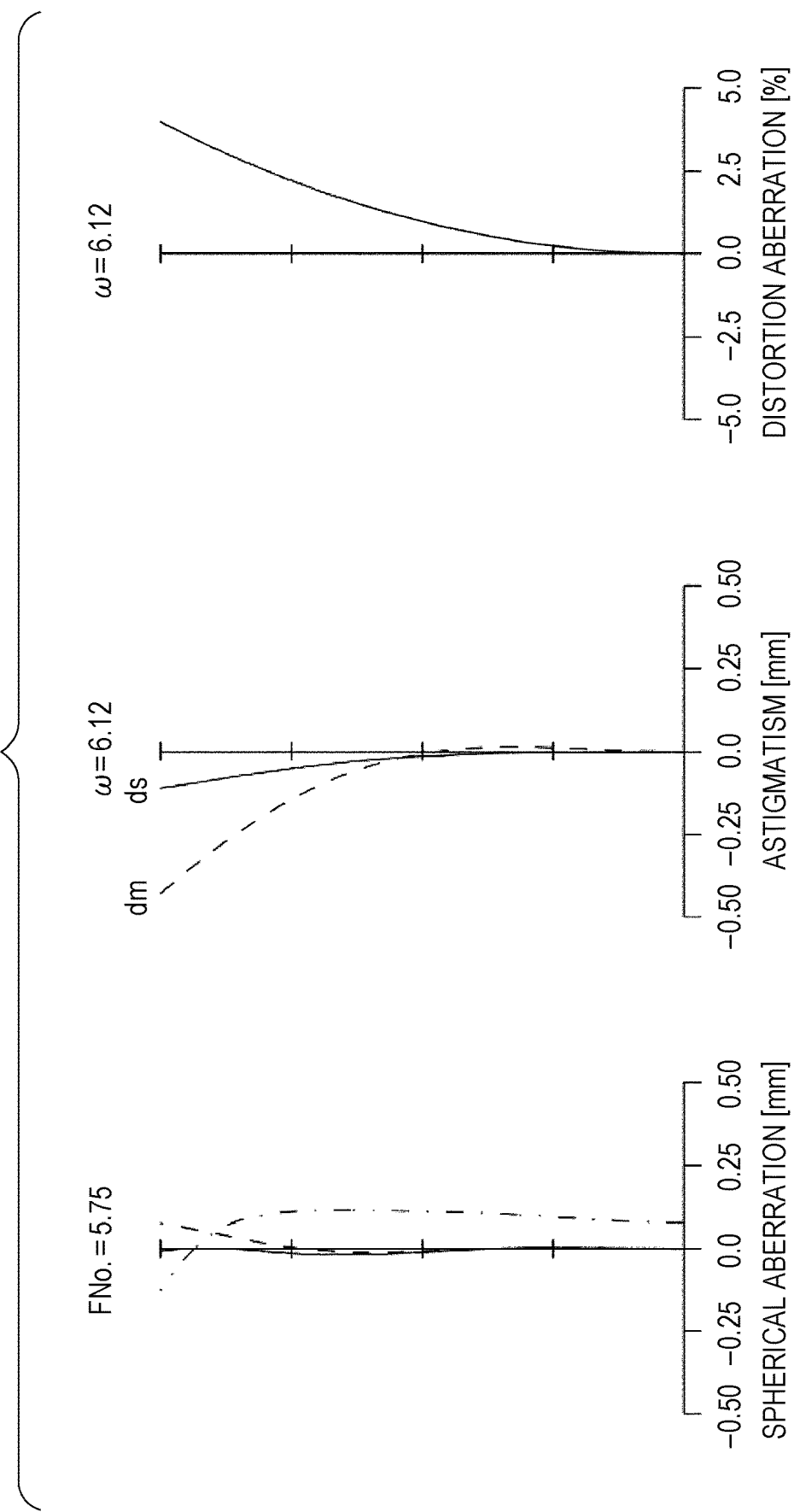
FIG. 12 is a diagram of aberration in the zoom lens according to the third embodiment at a telephoto end.

Further, in FIGS. 10 to 12, diagrams of longitudinal aberration in cases where the zoom lens in the third embodiment is focused at infinity while being at a wide-angle end, in an intermediate-focal-length position, and at a telephoto end, respectively, are provided.

TABLE 11

| SURFACE NUMBER | r | d | nd | vd |
|---|---|---|---|---|
| SURFACE OF OBJECT | ∞ | d(0) | | |
| 1 | 72.7418 | 1.2000 | 1.85478 | 24.80 |
| 2 | 55.0925 | 7.1178 | 1.49700 | 81.61 |
| 3 | −2576.0254 | 0.2000 | | |
| 4 | 67.9905 | 3.3979 | 1.59349 | 67.00 |
| 5 | 131.2902 | d(5) | | |
| 6* | 81.8222 | 1.1000 | 1.87070 | 40.73 |
| 7 | 17.3549 | 7.3619 | | |
| 8 | −46.9936 | 0.8000 | 1.87070 | 40.73 |
| 9 | 55.3112 | 0.1500 | | |
| 10 | 37.6433 | 6.1652 | 1.85478 | 24.80 |
| 11 | −32.9640 | 0.9561 | | |
| 12 | −26.2287 | 0.9000 | 1.83481 | 42.72 |
| 13 | −101.7927 | d(13) | | |
| 14S | ∞ | 1.2000 | | |
| 15* | 37.1604 | 2.7113 | 1.69350 | 53.18 |
| 16* | 132.8507 | 0.2000 | | |
| 17 | 38.9190 | 3.0811 | 1.60311 | 60.69 |
| 18 | 682.8260 | 0.2000 | | |
| 19 | 42.5438 | 0.8000 | 1.80000 | 29.84 |
| 20 | 17.2829 | 5.3715 | 1.59282 | 68.62 |

TABLE 11-continued

| SURFACE NUMBER | r | d | nd | vd |
|---|---|---|---|---|
| 21 | −174.6671 | d(21) | | |
| 22 | −85.1322 | 0.8000 | 1.78800 | 47.37 |
| 23 | 21.4134 | 2.9687 | 1.85478 | 24.80 |
| 24 | 58.4808 | d(24) | | |
| 25 | 51.7474 | 0.8000 | 1.90366 | 31.31 |
| 26 | 17.9175 | 2.8921 | 1.49700 | 81.61 |
| 27 | 43.1221 | 0.2000 | | |
| 28* | 20.7365 | 5.6905 | 1.59201 | 67.02 |
| 29* | −28.6011 | d(29) | | |
| 30 | 190.9486 | 0.9000 | 1.59201 | 67.02 |
| 31* | 20.2337 | d(31) | | |
| 32 | 36.8017 | 7.0403 | 1.60342 | 38.03 |
| 33 | −31.9447 | 0.2000 | | |
| 34 | −58.6191 | 0.9000 | 1.88300 | 40.80 |
| 35 | 340.8507 | 4.3067 | | |
| 36 | −24.4531 | 1.0000 | 1.80420 | 46.50 |
| 37 | −104.9522 | d(37) | | |
| 38 | ∞ | 2.5000 | 1.51680 | 64.20 |
| 39 | ∞ | 1.0000 | | |
| IMAGE PLANE | ∞ | | | |

TABLE 12

| | WIDE-ANGLE END | INTERMEDIATE | TELEPHOTO END |
|---|---|---|---|
| f | 28.8003 | 75.0027 | 193.9288 |
| FNo. | 2.8982 | 4.5018 | 5.7528 |
| ω | 37.0367 | 15.3644 | 6.1210 |
| Y | 21.6330 | 21.6330 | 21.6330 |

TABLE 13

| | WIDE-ANGLE END | INTERMEDIATE | TELEPHOTO END | WIDE-ANGLE END | INTERMEDIATE | TELEPHOTO END |
|---|---|---|---|---|---|---|
| d(0) | ∞ | ∞ | ∞ | 165.0002 | 341.3593 | 610.0000 |
| d(5) | 0.8000 | 21.8724 | 50.6988 | 0.8000 | 21.8724 | 50.6988 |
| d(13) | 24.8447 | 9.6041 | 1.7762 | 24.8447 | 9.6041 | 1.7762 |
| d(21) | 1.4907 | 4.5549 | 7.0064 | 1.4907 | 4.5549 | 7.0064 |
| d(24) | 6.6157 | 3.5515 | 1.1000 | 6.6157 | 3.5515 | 1.1000 |
| d(29) | 4.6632 | 4.9482 | 1.3034 | 6.2596 | 7.5604 | 7.6792 |
| d(31) | 8.9747 | 8.6898 | 12.3345 | 7.3783 | 6.0775 | 5.9587 |
| d(37) | 13.4998 | 31.3089 | 41.6697 | 13.4998 | 31.3089 | 41.6697 |

TABLE 14

| G1 | 103.1709 |
|---|---|
| G2 | −10.9223 |
| G3 | 27.1565 |
| G4 | −47.7441 |
| G5 | 31.2329 |
| G6 | −38.3038 |
| G7 | −298.9440 |

TABLE 15

| SURFACE NUMBER | k | A4 | A6 | A8 | A10 | A12 |
|---|---|---|---|---|---|---|
| 6 | 0.0000 | 1.11737E−06 | 7.19073E−10 | −1.04952E−11 | 3.44628E−14 | 0.00000E+00 |
| 15 | 0.8177 | −6.08206E−06 | 2.68573E−08 | 3.62072E−11 | −1.38597E−13 | 5.64966E−15 |
| 16 | 0.0000 | −1.55722E−06 | 3.17267E−08 | 1.05195E−10 | −6.46114E−13 | 7.81993E−15 |
| 28 | −0.4515 | −1.96769E−05 | 3.02593E−09 | 1.65183E−10 | −2.06130E−12 | 4.64386E−15 |
| 29 | −1.4863 | 2.82074E−06 | −4.69572E−08 | 1.82020E−10 | −1.21460E−12 | −4.72267E−16 |
| 31 | 0.0000 | −9.57691E−06 | 7.26474E−09 | 2.57523E−10 | −2.29565E−12 | 1.06894E−14 |

Fourth Embodiment (1) Optical Configuration of Zoom Lens

Figure 13:
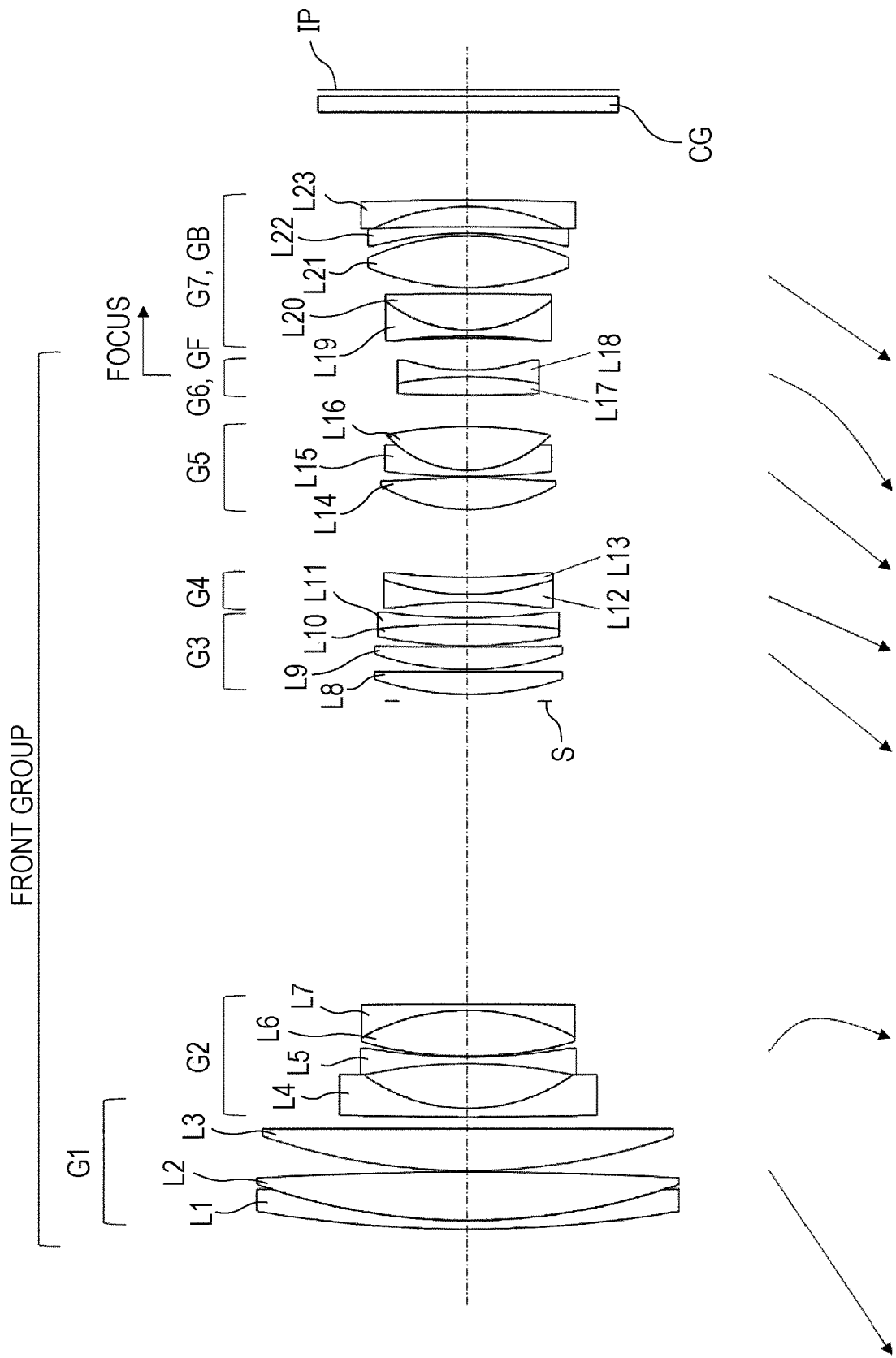
FIG. 13 shows a lens section at a time when a zoom lens according to a fourth embodiment of the present invention is focused at infinity while being at a wide-angle end.

FIG. 13 is a lens section showing a lens configuration of a zoom lens according to a fourth embodiment of the present invention at a time when the zoom lens is focused at infinity while being at a wide-angle end. The zoom lens includes sequentially from an object side, a front group having positive refractive power as a whole, and a lens group GB.

The front group includes sequentially from an object side, a first lens group G1 having positive refractive power, a second lens group G2 having negative refractive power, a third lens group G3 having positive refractive power, a fourth lens group G4 having negative refractive power, a fifth lens group G5 having positive refractive power, and a sixth lens group G6 having negative refractive power. The sixth lens group G6 corresponds to a lens group GF. The lens group GB includes a seventh lens group G7 having negative refractive power. An aperture stop S is disposed adjacently to the third lens group G3 on an object side of the third lens group G3.

Below, a configuration of each lens group will be described. The first lens group G1 includes sequentially from an object side, a cemented lens formed of a negative meniscus lens L1 having a surface which is convex toward an object side and a double convex lens L2, which are cemented together, and a double convex lens L3.

The second lens group G2 includes sequentially from an object side, a negative meniscus lens L4 having a surface which is convex toward an object side, a double concave lens L5, and a cemented lens formed of a double convex lens L6 and a negative meniscus lens L7 having a surface which is convex toward an image side, which are cemented together. The negative meniscus lens L4 is a glass-molding-type aspherical lens in which both surfaces have an aspherical shape.

The third lens group G3 includes sequentially from an object side, a double convex lens L8, a positive meniscus lens L9 having a surface which is convex toward an object side, and a cemented lens formed of a double convex lens L10 and a double concave lens L11, which are cemented together.

The fourth lens group G4 includes a cemented lens formed of a double concave lens L12 and a positive meniscus lens L13 having a surface which is convex toward an object side, which are cemented together and are arranged in the stated order from an object side. The double concave lens L12 is a glass-molding-type aspherical lens in which an object-side surface has an aspherical shape.

The fifth lens group G5 includes sequentially from an object side, a double convex lens L14, and a cemented lens formed of a negative meniscus lens L15 having a surface which is convex toward an object side and a double convex lens L16, which are cemented together. The double convex lens L14 is a glass-molding-type aspherical lens in which both surfaces have an aspherical shape.

The sixth lens group G6 includes a cemented lens formed of a double convex lens L17 and a double concave lens L18 which are cemented together and are arranged in the stated order from an object side. The double concave lens L18 is a glass-molding-type spherical lens in which an image-side surface has an aspherical shape.

The seventh lens group G7 includes sequentially from an object side, a cemented lens formed of a double concave lens L19 and a double convex lens L20 which are cemented together, a double convex lens L21, a negative meniscus lens L22 having a surface which is convex toward an image side, and a negative meniscus lens L23 having a surface which is convex toward an image side. The double concave lens L19 is a composite-resin-type aspherical lens in which a composite resin film molded in an aspherical shape is stuck to an object-side surface. Here, the double convex lens L21 corresponds to the positive lens component P, the negative meniscus lens L22 corresponds to the negative lens component Nf, and the negative meniscus lens L23 corresponds to the negative lens component Nb.

In zooming from a wide-angle end to a telephoto end, the first lens group G1 is moved to an object side, the second lens group G2 is moved to an image side first, and then is moved to an object side, the third lens group G3 is moved to an object side, the fourth lens group G4 is moved to an object side, the fifth lens group G5 is moved to an object side, the sixth lens group G6 is moved to an object side, and the seventh lens group G7 is moved to an object side.

Focusing on an object in a close region from an object at infinity is obtained by movement of the sixth lens group G6 to an image side along an optical axis.

Next, a numerical-value example in which specific numerical values of the zoom lens are applied will be described. Table 16 shows surface data of the zoom lens. Table 17 shows specifications of the zoom lens. Table 18 shows variable distances on an optical axis in the zoom lens in cases where the zoom lens is focused at infinity and where the zoom lens is focused on an object in a close region (photographing distances are 500 mm at a wide-angle end, 700 mm in an intermediate-focal-length position, and 1200 mm at a telephoto end, which are shown sequentially from the left side). Table 19 shows respective focal lengths of lens groups forming the zoom lens. Table 20 shows respective aspherical coefficients of aspherical surfaces. It is noted that each aspherical coefficient not shown in Table 20 is 0.00. Also, values in the condition expressions (1) to (8) and values used for calculation of the condition expressions (1) to (8) are shown in Table 46.

Figure 14:
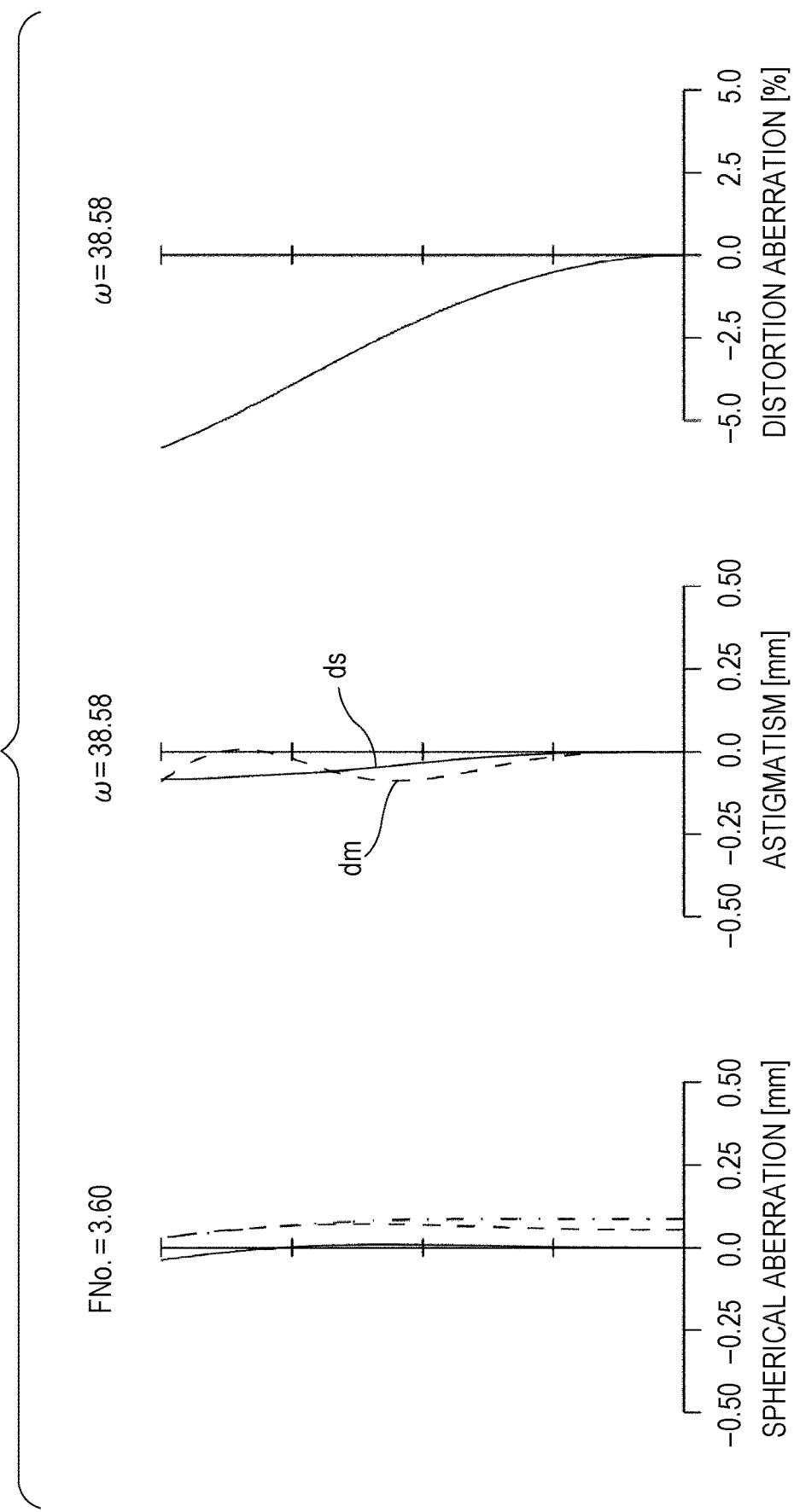
FIG. 14 is a diagram of aberration in the zoom lens according to the fourth embodiment at a wide-angle end.
Figure 15:
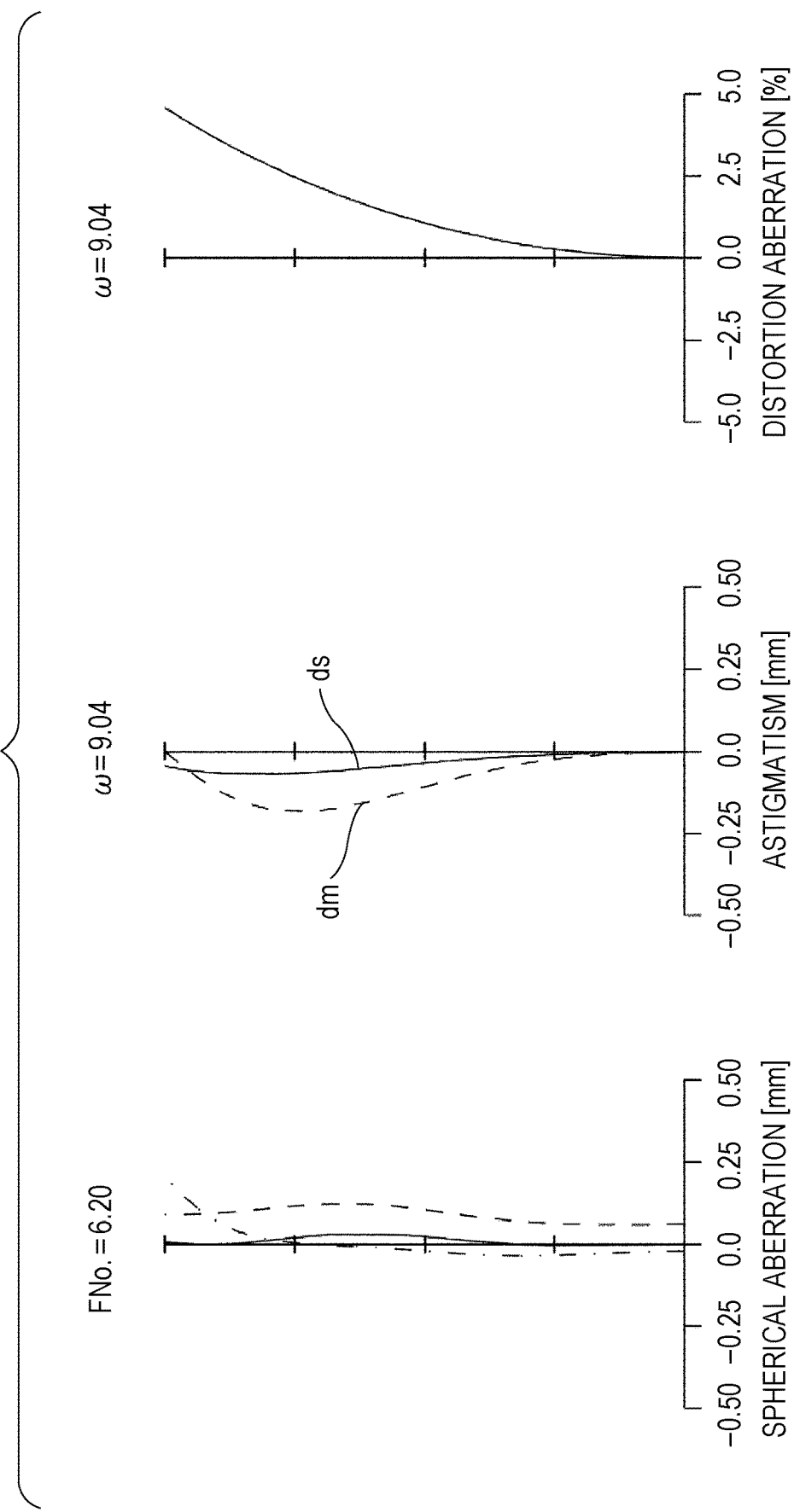
FIG. 15 is a diagram of aberration in the zoom lens according to the fourth embodiment in an intermediate-focal-length position.
Figure 16:
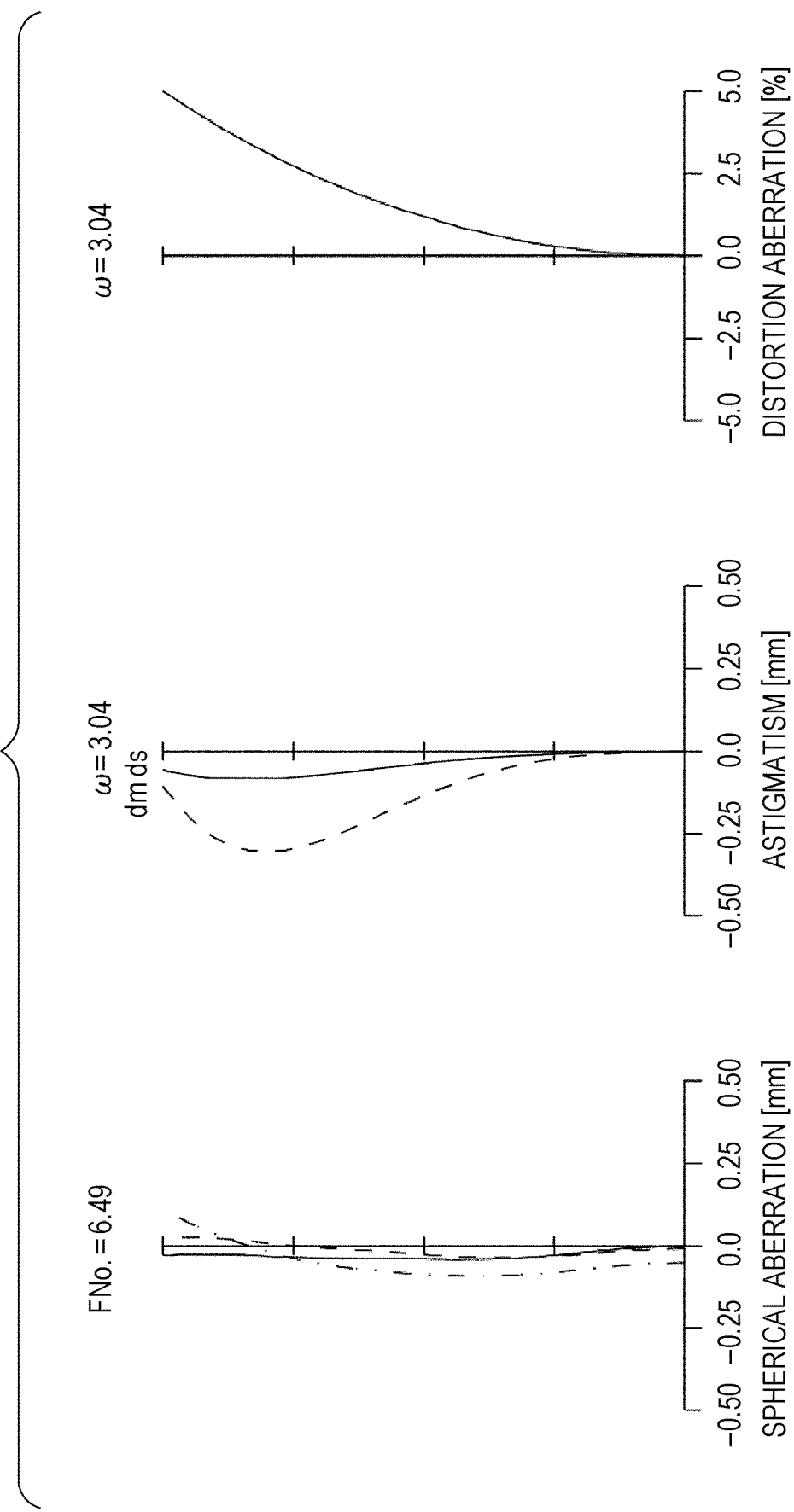
FIG. 16 is a diagram of aberration in the zoom lens according to the fourth embodiment at a telephoto end.

Further, in FIGS. 14 to 16, diagrams of longitudinal aberration in cases where the zoom lens in the fourth embodiment is focused at infinity while being at a wide-angle end, in an intermediate-focal-length position, and at a telephoto end, respectively, are provided.

TABLE 16

| SURFACE NUMBER | r | d | nd | vd |
| --- | --- | --- | --- | --- |
| SURFACE OF OBJECT | ∞ | d(0) | | |
| 1 | 192.6617 | 1.3000 | 1.87070 | 40.73 |
| 2 | 95.9244 | 7.4083 | 1.43700 | 95.10 |
| 3 | −554.2655 | 0.2000 | | |
| 4 | 94.2764 | 6.5301 | 1.49700 | 81.61 |
| 5 | −7370.9991 | d(5) | | |
| 6* | 679.0773 | 1.3000 | 1.88202 | 37.22 |
| 7* | 27.5984 | 6.8641 | | |
| 8 | −73.8932 | 1.0000 | 1.88300 | 40.80 |
| 9 | 79.6776 | 0.1500 | | |
| 10 | 57.8945 | 7.0811 | 1.85478 | 24.80 |
| 11 | −34.0424 | 1.0000 | 1.78590 | 44.20 |
| 12 | −1463.4181 | d(12) | | |
| 13S | ∞ | 1.0000 | | |
| 14 | 45.4512 | 3.4975 | 1.64850 | 53.02 |
| 15 | −4514.9247 | 0.2825 | | |
| 16 | 44.0199 | 3.4681 | 1.60342 | 38.03 |
| 17 | 1022.8033 | 0.2000 | | |
| 18 | 68.1589 | 3.3302 | 1.49700 | 81.61 |
| 19 | −132.0158 | 1.0000 | 1.92286 | 20.88 |
| 20 | 99.2304 | d(20) | | |
| 21* | −71.0569 | 1.2000 | 1.77377 | 47.17 |
| 22 | 36.5603 | 2.6661 | 1.92119 | 23.96 |
| 23 | 92.3328 | d(23) | | |

TABLE 16-continued

| SURFACE NUMBER | r | d | nd | vd |
|---|---|---|---|---|
| 24* | 25.1199 | 4.9010 | 1.69350 | 53.18 |
| 25* | −98.8550 | 0.1500 | | |
| 26 | 98.6246 | 1.0000 | 1.91082 | 35.25 |
| 27 | 17.1392 | 6.6649 | 1.59282 | 68.62 |
| 28 | −64.0599 | d(28) | | |
| 29 | 204.9516 | 2.8807 | 1.62004 | 36.26 |
| 30 | −53.7779 | 1.0000 | 1.59201 | 67.02 |
| 31* | 29.8860 | d(31) | | |
| 32* | −162.6004 | 0.2500 | 1.51460 | 49.96 |
| 33 | −101.8172 | 1.0000 | 2.00100 | 29.13 |
| 34 | 20.1279 | 5.5899 | 1.59551 | 39.24 |
| 35 | −486.2883 | 0.9292 | | |
| 36 | 40.1305 | 7.8732 | 1.76182 | 26.61 |
| 37 | −36.3556 | 0.4110 | | |
| 38 | −55.1244 | 1.0000 | 1.88300 | 40.80 |
| 39 | −3521.6208 | 3.1126 | | |
| 40 | −32.6941 | 1.0000 | 1.69680 | 55.53 |
| 41 | −459.9848 | d(41) | | |
| 42 | ∞ | 2.5000 | 1.51680 | 64.20 |
| 43 | ∞ | 1.0000 | | |
| IMAGE PLANE | ∞ | | | |

TABLE 17

| | WIDE-ANGLE END | INTERMEDIATE | TELEPHOTO END |
|---|---|---|---|
| f | 28.8049 | 130.0083 | 387.8306 |
| FNo. | 3.6008 | 6.2008 | 6.4916 |
| ω | 38.5769 | 9.0404 | 3.0410 |
| Y | 21.6330 | 21.6330 | 21.6330 |

TABLE 18

| | WIDE-ANGLE END | INTERMEDIATE | TELEPHOTO END | WIDE-ANGLE END | INTERMEDIATE | TELEPHOTO END |
|---|---|---|---|---|---|---|
| d(0) | ∞ | ∞ | ∞ | 325.0000 | 480.3873 | 930.6798 |
| d(5) | 1.7332 | 50.3141 | 101.6060 | 1.7332 | 50.3141 | 101.6060 |
| d(12) | 46.5713 | 11.2573 | 1.8737 | 46.5713 | 11.2573 | 1.8737 |
| d(20) | 2.3437 | 3.9857 | 7.4130 | 2.3437 | 3.9857 | 7.4130 |
| d(23) | 10.3197 | 4.8164 | 1.2000 | 10.3197 | 4.8164 | 1.2000 |
| d(28) | 4.7875 | 8.3835 | 1.6036 | 5.8711 | 12.8913 | 14.9238 |
| d(31) | 5.0042 | 8.1145 | 16.2964 | 3.9206 | 3.6067 | 2.9762 |
| d(41) | 13.5000 | 42.0009 | 49.2670 | 13.5000 | 42.0009 | 49.2670 |

TABLE 19

| G1 | 163.4648 |
|---|---|
| G2 | −27.1555 |
| G3 | 42.5800 |
| G4 | −58.9198 |
| G5 | 30.1155 |
| G6 | −62.0549 |
| G7 | −52.1550 |

TABLE 20

| SURFACE NUMBER | k | A4 | A6 | A8 | A10 | A12 |
|---|---|---|---|---|---|---|
| 6 | 0.0000 | −6.33623E−07 | 5.25166E−09 | −1.15628E−11 | 7.27254E−15 | 0.00000E+00 |
| 7 | 0.0000 | 2.74174E−07 | 1.99347E−09 | 2.62210E−11 | −6.48205E−14 | 0.00000E+00 |
| 21 | 0.0000 | 2.01736E−06 | 1.91949E−09 | −4.73234E−11 | 2.29474E−13 | −2.05133E−16 |
| 24 | 0.0000 | −7.39076E−06 | −2.71133E−10 | 9.34250E−11 | −4.95710E−13 | 2.17971E−15 |
| 25 | 0.0000 | 1.02751E−05 | −7.03604E−09 | 4.20959E−11 | −1.66847E−14 | 8.26127E−16 |
| 31 | 0.0000 | −5.59575E−06 | 3.76510E−08 | −5.94358E−10 | 3.17506E−16 | 0.00000E+00 |
| 32 | 0.0000 | −8.92299E−06 | 4.32413E−08 | −6.83984E−10 | 4.61131E−12 | −1.71298E−15 |

Fifth Embodiment (1) Optical Configuration of Zoom Lens

Figure 17:
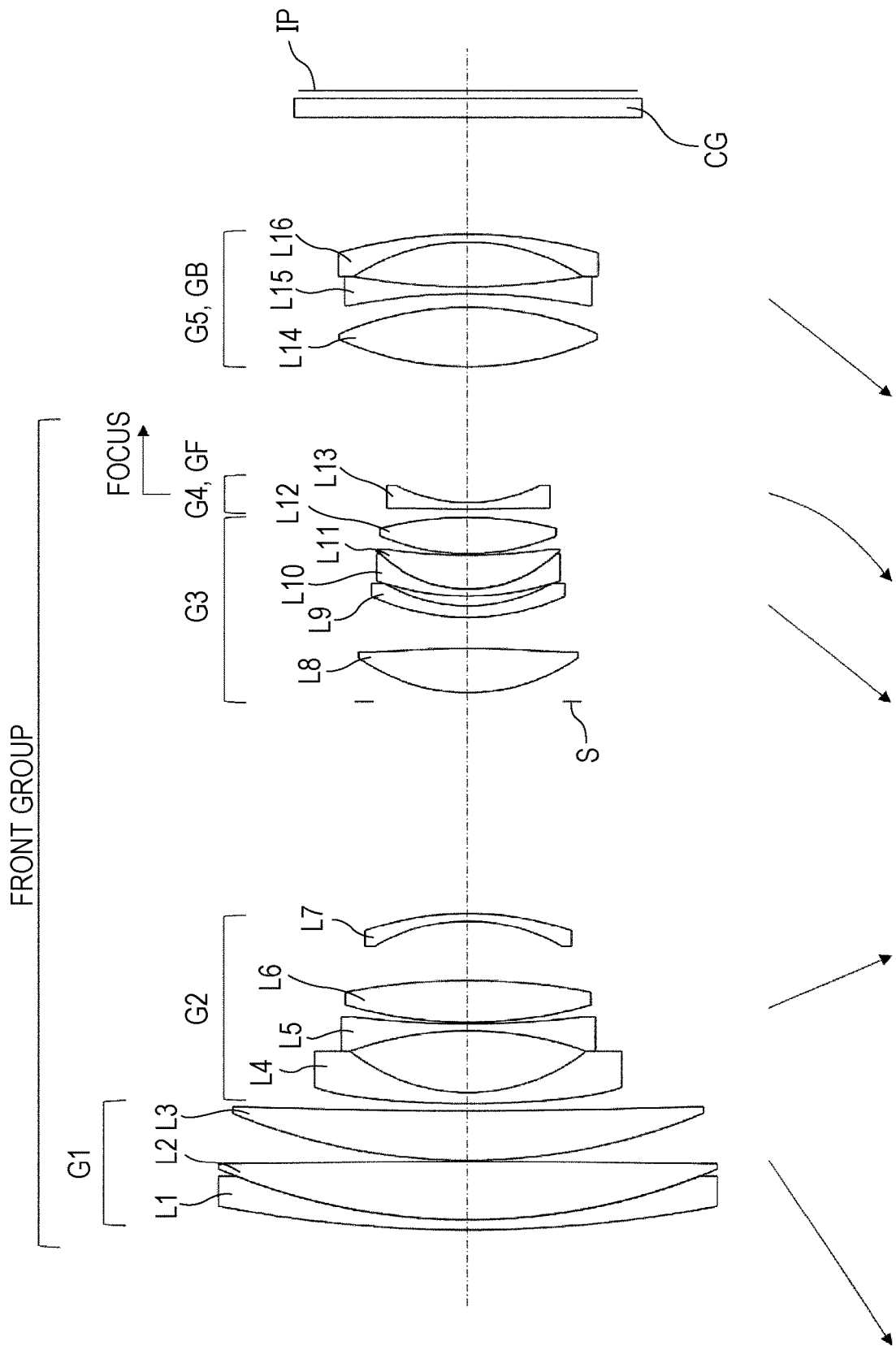
FIG. 17 shows a lens section at a time when a zoom lens according to a fifth embodiment of the present invention is focused at infinity while being at a wide-angle end.
Figure 18:
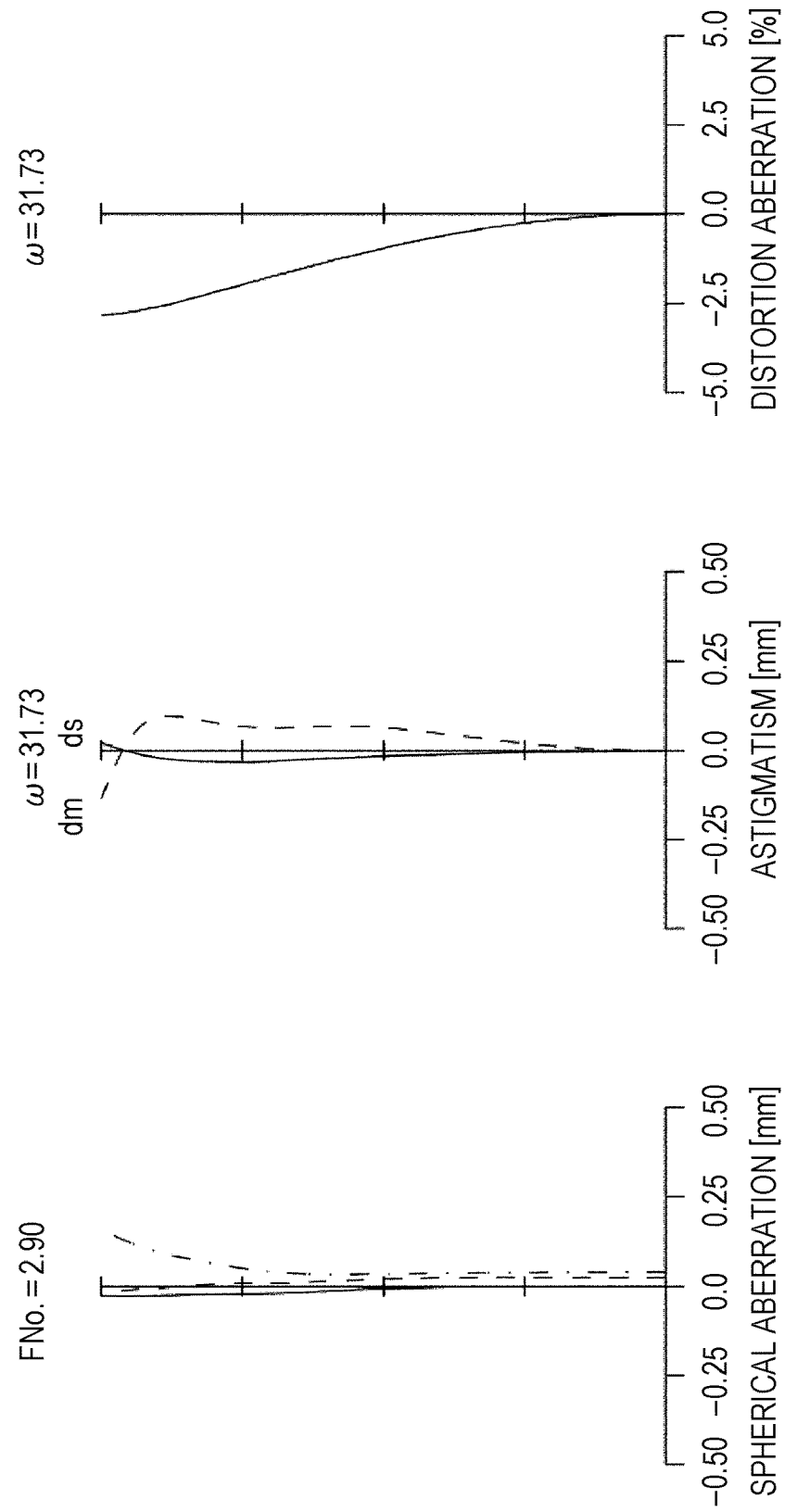
FIG. 18 is a diagram of aberration in the zoom lens according to the fifth embodiment at a wide-angle end.
Figure 19:
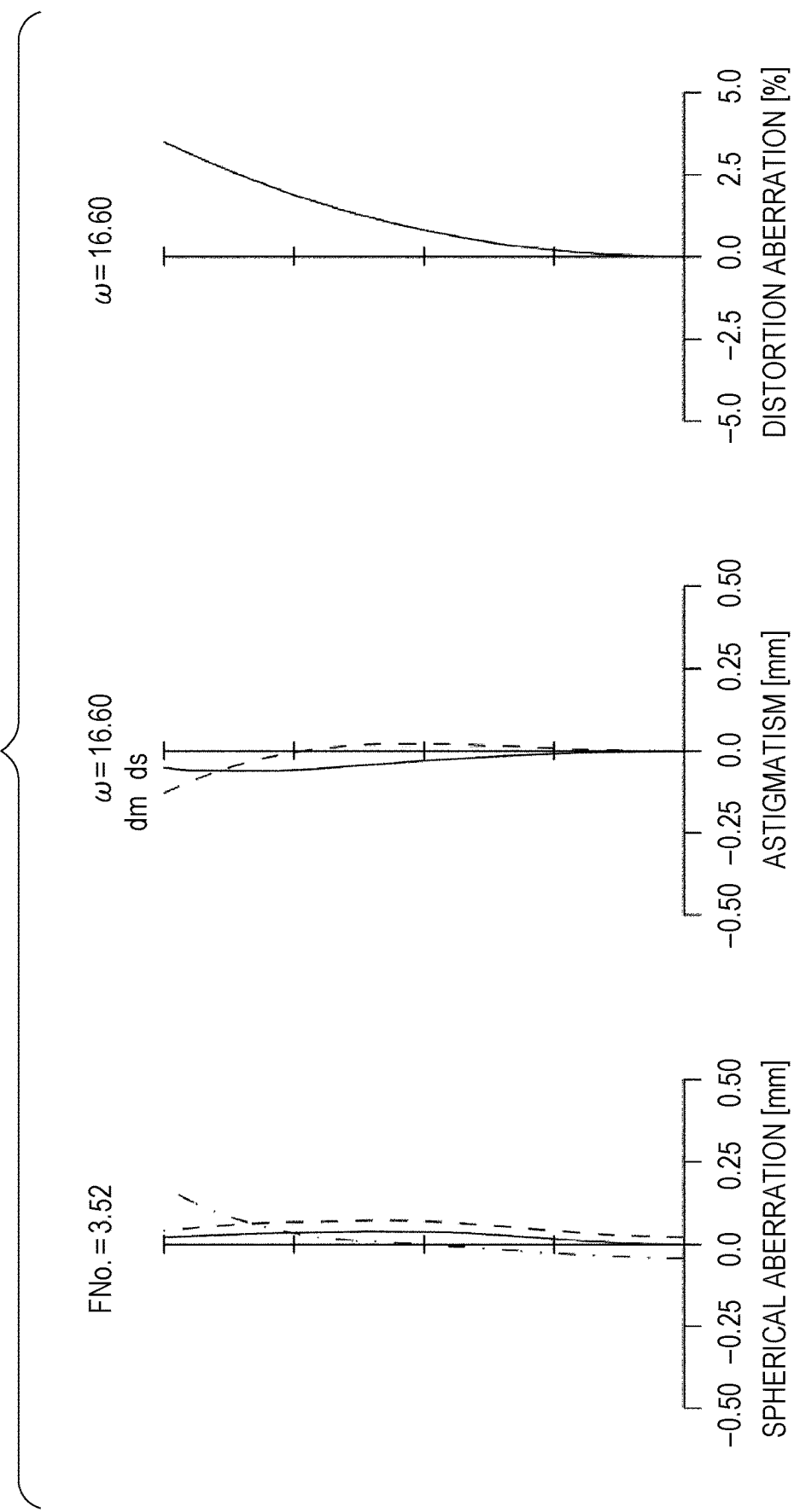
FIG. 19 is a diagram of aberration in the zoom lens according to the fifth embodiment in an intermediate-focal-length position.
Figure 20:
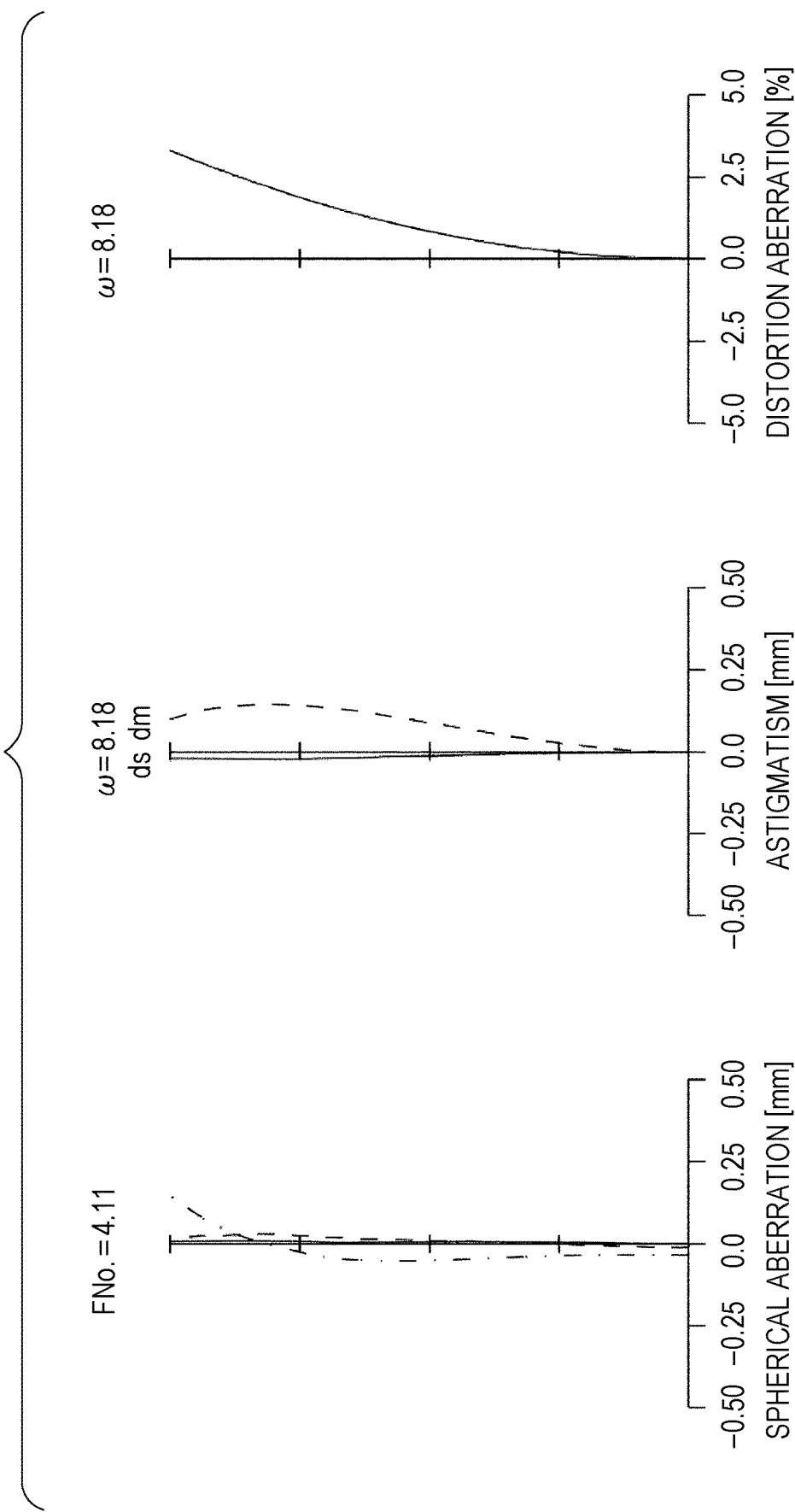
FIG. 20 is a diagram of aberration in the zoom lens according to the fifth embodiment at a telephoto end.

FIG. 17 is a lens section showing a lens configuration of a zoom lens according to a fifth embodiment of the present invention at a time when the zoom lens is focused at infinity while being at a wide-angle end. The zoom lens includes sequentially from an object side, a front group having positive refractive power as a whole, and a lens group GB.

The front group includes sequentially from an object side, a first lens group G1 having positive refractive power, a second lens group G2 having negative refractive power, a third lens group G3 having positive refractive power, and a fourth lens group G4 having negative refractive power. The fourth lens group G4 corresponds to a lens group GF. The lens group GB includes a fifth lens group G5 having positive refractive power. An aperture stop S is disposed adjacently to the third lens group G3 on an object side of the third lens group G3.

Below, a configuration of each lens group will be described. The first lens group G1 includes sequentially from an object side, a cemented lens formed of a negative meniscus lens L1 having a surface which is convex toward an object side and a double convex lens L2, which are cemented together, and a positive meniscus lens L3 having a surface which is convex toward an object side.

The second lens group G2 includes sequentially from an object side, a negative meniscus lens L4 having a surface which is convex toward an object side, a double concave lens L5, a double convex lens L6, and a negative meniscus lens L7 having a surface which is convex toward an image side. The negative meniscus lens L4 is a glass-molding-type aspherical lens in which an object-side surface has an aspherical shape.

The third lens group G3 includes sequentially from an object side, a double convex lens L8, a negative meniscus lens L9 having a surface which is convex toward an object side, and a cemented lens formed of a negative meniscus lens L10 having a surface which is convex toward an object side and a positive meniscus lens L11 having a surface which is convex toward an object side, which are cemented together, and a double convex lens L12. The double convex lens L8 is a glass-molding-type aspherical lens in which both surfaces have an aspherical shape.

The fourth lens group G4 includes a negative meniscus lens L13 having a surface which is convex toward an object side. The negative meniscus lens L13 is a glass-molding-type aspherical lens in which both surfaces have an aspherical shape.

The fifth lens group G5 includes sequentially from an object side, a double convex lens L14, a double concave lens L15, and a negative meniscus lens L16 having a surface which is convex toward an image side. Here, the double convex lens L14 corresponds to the positive lens component P, the double concave lens L15 corresponds to the negative lens component Nf, and the negative meniscus lens L16 corresponds to the negative lens component Nb.

In zooming from a wide-angle end to a telephoto end, the first lens group G1 is moved to an object side, the second lens group G2 is moved to an image side, the third lens group G3 is moved to an object side, the fourth lens group G4 is moved to an object side, and the fifth lens group G5 is moved to an object side. In zooming, the third lens group G3 and the fifth lens group G5 are moved along the same track.

Focusing on an object in a close region from an object at infinity is obtained by movement of the fourth lens group G4 to an image side along an optical axis.

(2) Numerical-Value Example

Next, a numerical-value example in which specific numerical values of the zoom lens are applied will be described. Table 21 shows surface data of the zoom lens. Table 22 shows specifications of the zoom lens. Table 23 shows variable distances on an optical axis in the zoom lens in cases where the zoom lens is focused at infinity and where the zoom lens is focused on an object in a close region (a photographing distance is 500 mm). Table 24 shows respective focal lengths of lens groups forming the zoom lens. Table 25 shows respective aspherical coefficients of aspherical surfaces. It is noted that each aspherical coefficient not shown in Table 25 is 0.00. Also, values in the condition expressions (1) to (8) and values used for calculation of the condition expressions (1) to (8) are shown in Table 46.

Further, in FIGS. 17 to 20, diagrams of longitudinal aberration in cases where the zoom lens in the fifth embodiment is focused at infinity while being at a wide-angle end, in an intermediate-focal-length position, and at a telephoto end, respectively, are provided.

TABLE 21

| SURFACE NUMBER | r | d | nd | vd |
|---|---|---|---|---|
| SURFACE OF OBJECT | ∞ | d(0) | | |
| 1 | 169.1758 | 1.3000 | 1.90525 | 35.04 |
| 2 | 81.6634 | 7.5716 | 1.49700 | 81.61 |

TABLE 21-continued

| SURFACE NUMBER | r | d | nd | vd |
|---|---|---|---|---|
| 3 | −1656.5789 | 0.2000 | | |
| 4 | 78.1124 | 6.4260 | 1.59282 | 68.62 |
| 5 | 725.1812 | d(5) | | |
| 6* | 158.1127 | 1.4000 | 1.65100 | 56.24 |
| 7 | 24.2856 | 8.0217 | | |
| 8 | −44.9153 | 0.9000 | 1.72916 | 54.67 |
| 9 | 123.6307 | 0.2000 | | |
| 10 | 57.0357 | 5.4113 | 1.80518 | 25.46 |
| 11 | −83.8383 | 7.7671 | | |
| 12 | −23.8514 | 1.0000 | 1.67003 | 47.23 |
| 13 | −40.3623 | d(13) | | |
| 14S | ∞ | 1.2000 | | |
| 15* | 23.4350 | 5.7748 | 1.59201 | 67.02 |
| 16* | −101.1571 | 4.0777 | | |
| 17 | 30.3652 | 1.4907 | 1.80400 | 46.53 |
| 18 | 21.7617 | 1.2402 | | |
| 19 | 36.5459 | 0.9000 | 1.95375 | 32.32 |
| 20 | 16.5447 | 4.3221 | 1.49700 | 81.61 |
| 21 | 70.3425 | 0.2000 | | |
| 22 | 28.6539 | 4.7173 | 1.59282 | 68.62 |
| 23 | −47.3256 | d(23) | | |
| 24* | 279.9474 | 0.8000 | 1.59201 | 67.02 |
| 25* | 19.5293 | d(25) | | |
| 26 | 40.9857 | 7.7026 | 1.60562 | 43.71 |
| 27 | −41.7923 | 1.7653 | | |
| 28 | −76.2569 | 0.9000 | 1.58913 | 61.13 |
| 29 | 80.9264 | 5.8177 | | |
| 30 | −26.7232 | 1.0000 | 1.74320 | 49.34 |
| 31 | −59.2219 | d(31) | | |
| 32 | ∞ | 2.5000 | 1.51680 | 64.20 |
| 33 | ∞ | 1.0000 | | |
| IMAGE PLANE | ∞ | | | |

TABLE 22

| | WIDE-ANGLE END | INTERMEDIATE | TELEPHOTO END |
|---|---|---|---|
| f | 36.0054 | 69.9898 | 145.5012 |
| FNo. | 2.9021 | 3.5240 | 4.1110 |
| ω | 31.7348 | 16.6038 | 8.1830 |
| Y | 21.6330 | 21.6330 | 21.6330 |

TABLE 23

| | WIDE-ANGLE END | INTERMEDIATE | TELEPHOTO END | WIDE-ANGLE END | INTERMEDIATE | TELEPHOTO END |
|---|---|---|---|---|---|---|
| d(0) | ∞ | ∞ | ∞ | 351.7464 | 334.4374 | 302.4795 |
| d(5) | 1.0000 | 25.6750 | 56.1506 | 1.0000 | 25.6750 | 56.1506 |
| d(13) | 27.5461 | 10.9512 | 1.3000 | 27.5461 | 10.9512 | 1.3000 |
| d(23) | 1.1228 | 2.6230 | 0.9999 | 2.0055 | 5.1121 | 8.2701 |
| d(25) | 17.7278 | 16.2280 | 17.8508 | 16.8452 | 13.7390 | 10.5806 |
| d(31) | 15.2508 | 24.4793 | 35.6132 | 15.2508 | 24.4793 | 35.6132 |

TABLE 24

| G1 | 134.6072 |
|---|---|
| G2 | −28.3313 |
| G3 | 26.0220 |
| G4 | −35.5023 |
| G5 | 303.7356 |

TABLE 25

| SURFACE NUMBER | k | A4 | A6 | A8 | A10 | A12 |
|---|---|---|---|---|---|---|
| 6 | 0.0000 | 3.74943E−06 | 3.15104E−10 | 1.31029E−11 | −3.81318E−14 | 7.24354E−17 |
| 15 | 0.2739 | −7.80546E−06 | −1.54896E−08 | 1.54159E−10 | −1.13884E−12 | 2.75902E−15 |
| 16 | −57.6238 | 7.25687E−06 | −1.67175E−09 | 1.28764E−10 | −1.00135E−12 | 2.74816E−15 |
| 24 | 0.0000 | −3.92808E−06 | −1.40084E−07 | 1.98829E−09 | −1.24667E−11 | 3.06394E−14 |
| 25 | 0.0000 | −1.20468E−05 | −1.99489E−07 | 2.51719E−09 | −1.74900E−11 | 4.70638E−14 |

Sixth Embodiment (1) Optical Configuration of Zoom Lens

Figure 21:
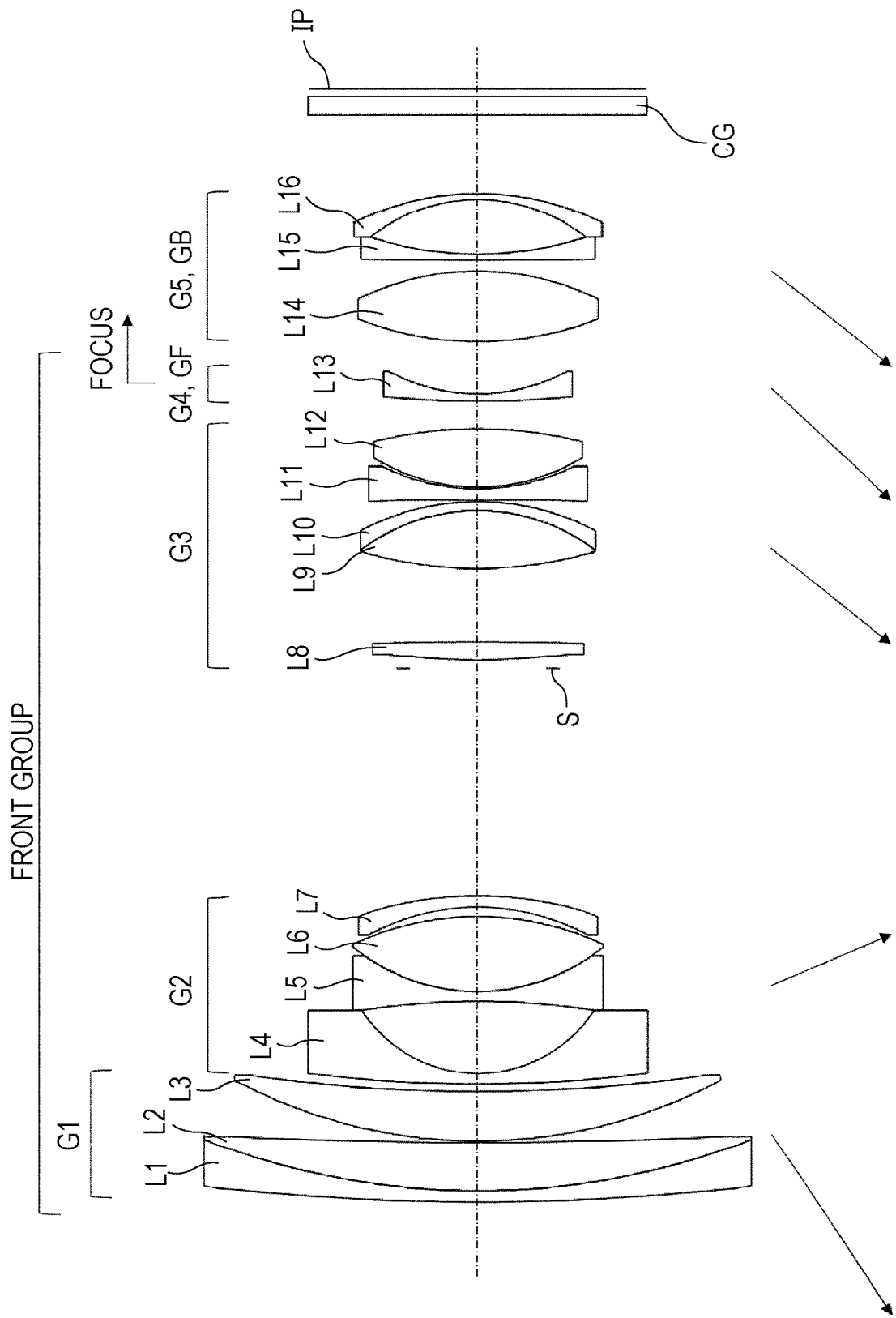
FIG. 21 shows a lens section at a time when a zoom lens according to a sixth embodiment of the present invention is focused at infinity while being at a wide-angle end.

FIG. 21 is a lens section showing a lens configuration of a zoom lens according to a sixth embodiment of the present invention at a time when the zoom lens is focused at infinity while being at a wide-angle end. The zoom lens includes sequentially from an object side, a front group having positive refractive power as a whole, and a lens group GB.

The front group includes sequentially from an object side, a first lens group G1 having positive refractive power, a second lens group G2 having negative refractive power, a third lens group G3 having positive refractive power, and a fourth lens group G4 having negative refractive power. The fourth lens group G4 corresponds to a lens group GF. The lens group GB includes a fifth lens group G5 having positive refractive power. An aperture stop S is disposed adjacently to the third lens group G3 on an object side of the third lens group G3.

Below, a configuration of each lens group will be described. The first lens group G1 includes sequentially from an object side, a cemented lens formed of a negative meniscus lens L1 having a surface which is convex toward an object side and a positive meniscus lens L2 having a surface which is convex toward an object side, which are cemented together, and a positive meniscus lens L3 having a surface which is convex toward an object side.

The second lens group G2 includes sequentially from an object side, a negative meniscus lens L4 having a surface which is convex toward an object side, a cemented lens formed of a double concave lens L5 and a double convex lens L6 which are cemented together, and a negative meniscus lens L7 having a surface which is convex toward an image side. The negative meniscus lens L4 is a glass-molding-type aspherical lens in which an object-side surface has an aspherical shape, and the negative meniscus lens L7 is a glass-molding-type aspherical lens in which both surfaces have an aspherical shape.

The third lens group G3 includes sequentially from an object side, a double convex lens L8, a cemented lens formed of a double convex lens L9 and a negative meniscus lens L10 having a surface which is convex toward an image side, which are cemented together, a negative meniscus lens L11 having a surface which is convex toward an object side, and a double convex lens L12. Each of the double convex lens L8 and the negative meniscus lens L11 is a glass-molding-type aspherical lens in which both surfaces have an aspherical shape.

The fourth lens group G4 includes a negative meniscus lens L13 having a surface which is convex toward an object side. The negative meniscus lens L13 is a glass-molding-type aspherical lens in which both surfaces have an aspherical shape.

The fifth lens group G5 includes sequentially from an object side, a double convex lens L14, a negative meniscus lens L15 having a surface which is convex toward an object side, and a negative meniscus lens L16 having a surface which is convex toward an image side. Here, the double convex lens L14 corresponds to the positive lens component P, the negative meniscus lens L15 corresponds to the negative lens component Nf, and the negative meniscus lens L16 corresponds to the negative lens component Nb.

In zooming from a wide-angle end to a telephoto end, the first lens group G1 is moved to an object side, the second lens group G2 is moved to an image side, the third lens group G3 is moved to an object side, the fourth lens group G4 is moved to an object side, and the fifth lens group G5 is moved to an object side. In zooming, the third lens group G3 and the fifth lens group G5 are moved along the same track.

Focusing on an object in a close region from an object at infinity is obtained by movement of the fourth lens group G4 to an image side along an optical axis.

(2) Numerical-Value Example

Next, a numerical-value example in which specific numerical values of the zoom lens are applied will be described. Table 26 shows surface data of the zoom lens. Table 27 shows specifications of the zoom lens. Table 28 shows variable distances on an optical axis in the zoom lens in cases where the zoom lens is focused at infinity and where the zoom lens is focused on an object in a close region (a photographing distance is 500 mm). Table 29 shows respective focal lengths of lens groups forming the zoom lens. Table 30 shows respective aspherical coefficients of aspherical surfaces. It is noted that each aspherical coefficient not shown in Table 30 is 0.00. Also, values in the condition expressions (1) to (8) and values used for calculation of the condition expressions (1) to (8) are shown in Table 47.

Figure 22:
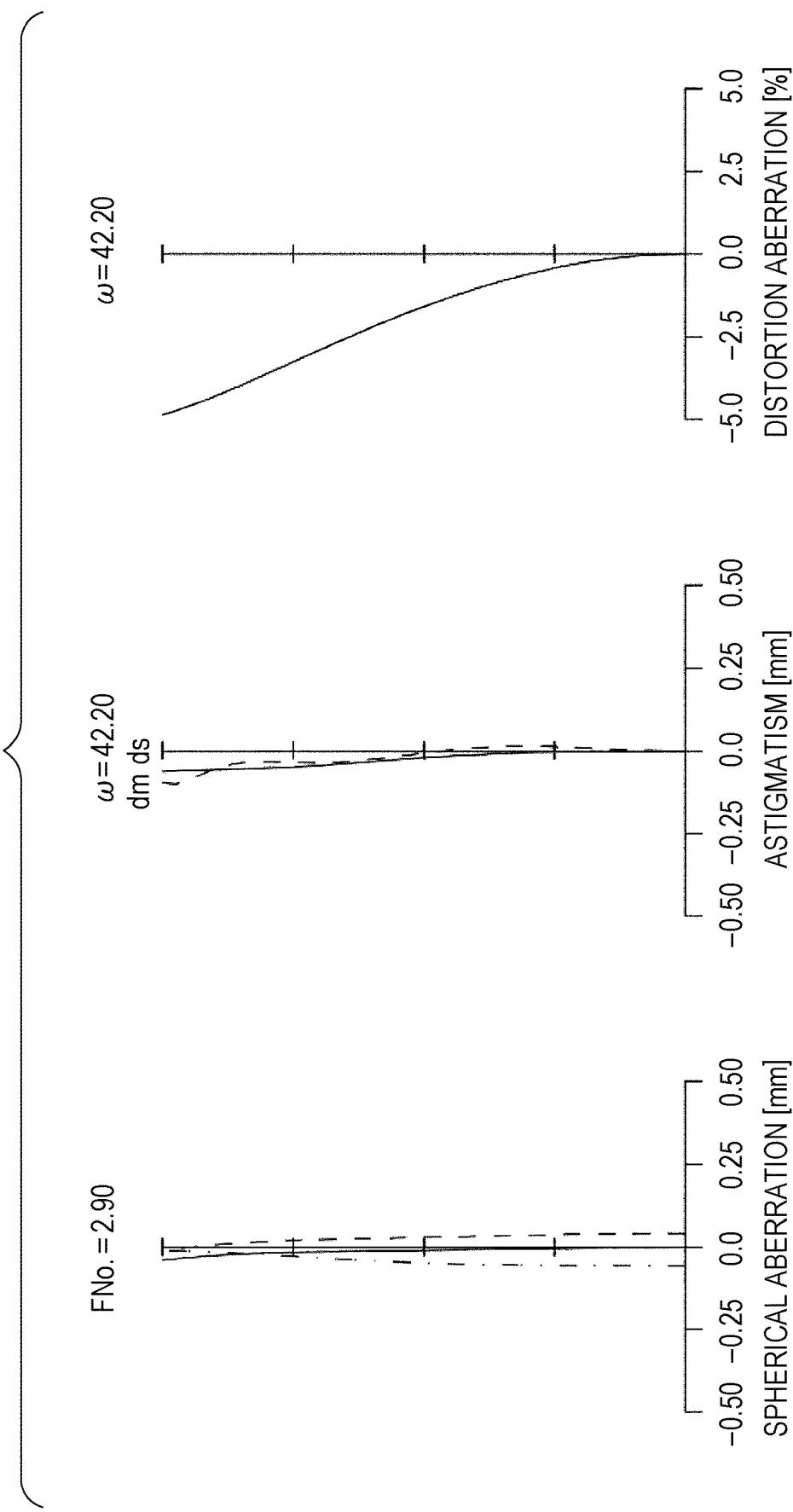
FIG. 22 is a diagram of aberration in the zoom lens according to the sixth embodiment at a wide-angle end.
Figure 23:
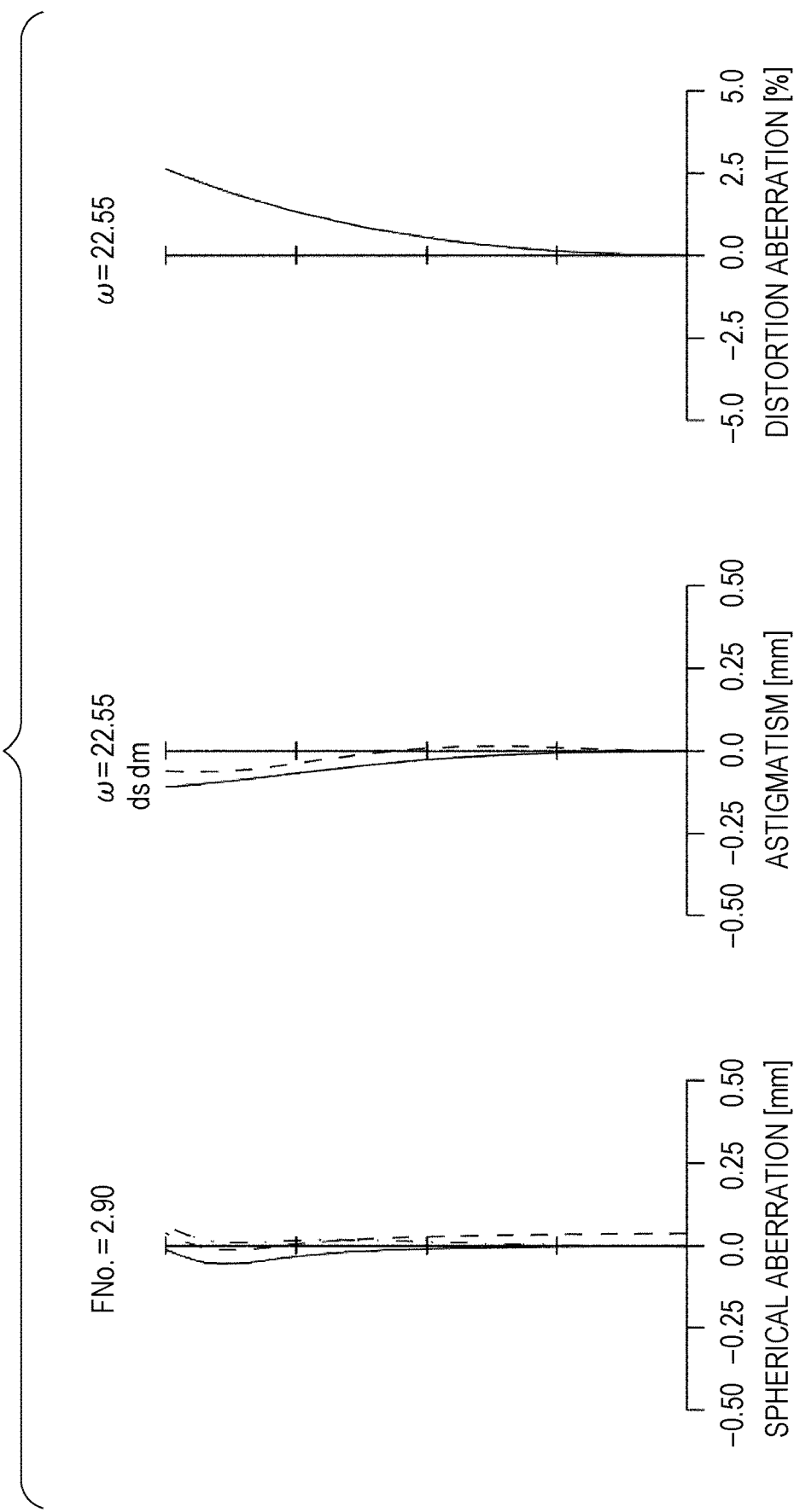
FIG. 23 is a diagram of aberration in the zoom lens according to the sixth embodiment in an intermediate-focal-length position.
Figure 24:
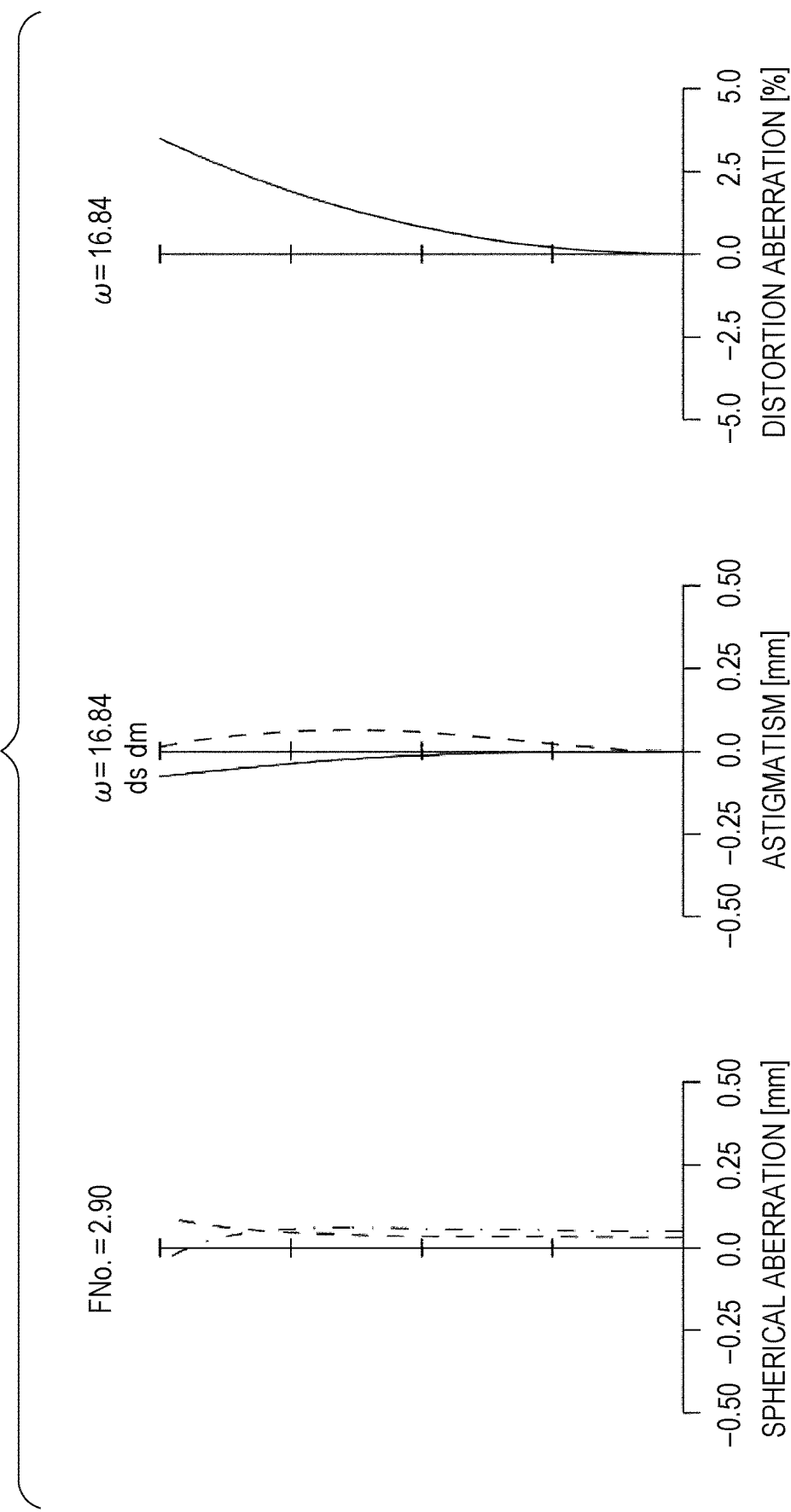
FIG. 24 is a diagram of aberration in the zoom lens according to the sixth embodiment at a telephoto end.

Further, in FIGS. 22 to 24, diagrams of longitudinal aberration in cases where the zoom lens in the sixth embodiment is focused at infinity while being at a wide-angle end, in an intermediate-focal-length position, and at a telephoto end, respectively, are provided.

TABLE 26

| SURFACE NUMBER | r | d | nd | vd |
|---|---|---|---|---|
| SURFACE OF OBJECT | ∞ | d(0) | | |
| 1 | 313.5371 | 1.5000 | 1.84666 | 23.78 |
| 2 | 99.2888 | 6.4887 | 1.88300 | 40.80 |
| 3 | 697.1234 | 0.2000 | | |
| 4 | 67.8579 | 6.6276 | 1.61800 | 63.39 |
| 5 | 211.3308 | d(5) | | |
| 6* | 185.5343 | 1.4000 | 1.80139 | 45.45 |
| 7 | 18.2671 | 9.6435 | | |
| 8 | −99.2772 | 1.3000 | 1.69930 | 51.11 |
| 9 | 26.2105 | 10.0000 | 1.74950 | 35.28 |
| 10 | −39.0628 | 1.3210 | | |
| 11* | −27.8901 | 1.5000 | 1.59201 | 67.02 |
| 12* | −50.9104 | d(12) | | |
| 13S | ∞ | 1.2000 | | |
| 14* | 85.7451 | 2.3031 | 1.61881 | 63.85 |
| 15* | −776.7378 | 9.8288 | | |
| 16 | 54.210 | 7.6790 | 1.59282 | 68.62 |

TABLE 26-continued

| SURFACE NUMBER | r | d | nd | vd |
|---|---|---|---|---|
| 17 | −25.5578 | 1.2000 | 1.85026 | 32.27 |
| 18 | −33.1229 | 0.2000 | | |
| 19* | 547.9488 | 1.5000 | 1.73077 | 40.51 |
| 20* | 28.7932 | 0.2000 | | |
| 21 | 26.0335 | 7.8707 | 1.59282 | 68.62 |
| 22 | −56.7976 | d(22) | | |
| 23* | 129.0533 | 1.0000 | 1.86100 | 37.10 |
| 24* | 24.5284 | d(24) | | |
| 25 | 43.1237 | 9.4497 | 1.56732 | 42.82 |
| 26 | −35.6052 | 1.4436 | | |
| 27 | 783.3285 | 0.8000 | 1.59282 | 68.62 |
| 28 | 45.7837 | 7.3325 | | |
| 29 | −22.7090 | 0.8000 | 1.89190 | 37.13 |
| 30 | −36.7314 | d(30) | | |
| 31 | ∞ | 2.5000 | 1.51680 | 64.20 |
| 32 | ∞ | 1.0000 | | |
| IMAGE PLANE | ∞ | | | |

TABLE 27

| | WIDE-ANGLE END | INTERMEDIATE | TELEPHOTO END |
|---|---|---|---|
| f | 24.7000 | 49.9999 | 68.0000 |
| FNo. | 2.9028 | 2.9012 | 2.8996 |
| ω | 42.2046 | 22.5497 | 16.8380 |
| Y | 21.3000 | 21.3000 | 21.3000 |

TABLE 28

| | WIDE-ANGLE END | INTERMEDIATE | TELEPHOTO END | WIDE-ANGLE END | INTERMEDIATE | TELEPHOTO END |
|---|---|---|---|---|---|---|
| d(0) | ∞ | ∞ | ∞ | 351.1478 | 343.3881 | 329.5515 |
| d(5) | 1.0000 | 17.5230 | 33.0236 | 1.0000 | 17.5230 | 33.0236 |
| d(12) | 30.4410 | 6.1788 | 1.3000 | 30.4410 | 6.1788 | 1.3000 |
| d(22) | 3.6953 | 1.8047 | 1.0000 | 4.3398 | 3.3246 | 3.3989 |
| d(24) | 6.9276 | 8.8182 | 9.6230 | 6.2832 | 7.2983 | 7.2241 |
| d(30) | 10.5001 | 25.4989 | 29.2137 | 10.5001 | 25.4989 | 29.2137 |

TABLE 29

| G1 | 124.2814 |
|---|---|
| G2 | −33.4252 |
| G3 | 27.5610 |
| G4 | −35.3300 |
| G5 | 158.5804 |

TABLE 30

| SURFACE NUMBER | k | A4 | A6 | A8 | A10 | A12 |
|---|---|---|---|---|---|---|
| 6 | 0.0000 | 1.24988E−06 | −1.66142E−09 | −2.63883E−12 | 4.74801E−15 | −2.52742E−18 |
| 11 | 0.0000 | 8.09226E−06 | −2.11044E−08 | 1.56833E−10 | −3.14472E−13 | 0.00000E+00 |
| 12 | 0.0000 | −3.66948E−08 | −3.27265E−08 | 1.51394E−10 | −3.94734E−13 | 0.00000E+00 |
| 14 | 0.0000 | −8.83574E−06 | −3.75055E−09 | −6.86500E−11 | −7.24861E−14 | 3.21734E−16 |
| 15 | 0.0000 | −9.08618E−07 | 7.26658E−09 | −6.35024E−11 | −1.07811E−13 | 7.11002E−16 |
| 19 | 0.0000 | −8.06138E−06 | −1.62754E−08 | 6.41258E−11 | −1.18790E−13 | 7.65648E−17 |
| 20 | 0.0000 | 2.73643E−06 | −1.38139E−08 | 2.15996E−11 | 8.28560E−14 | 0.00000E+00 |
| 23 | 0.0000 | −1.90993E−06 | −1.00835E−10 | −7.87563E−12 | −9.96550E−14 | 1.21343E−15 |
| 24 | 0.0000 | −3.62666E−06 | −1.03642E−08 | 1.32309E−10 | −9.06930E−13 | 3.65180E−15 |

Seventh Embodiment (1) Optical Configuration of Zoom Lens

Figure 25:
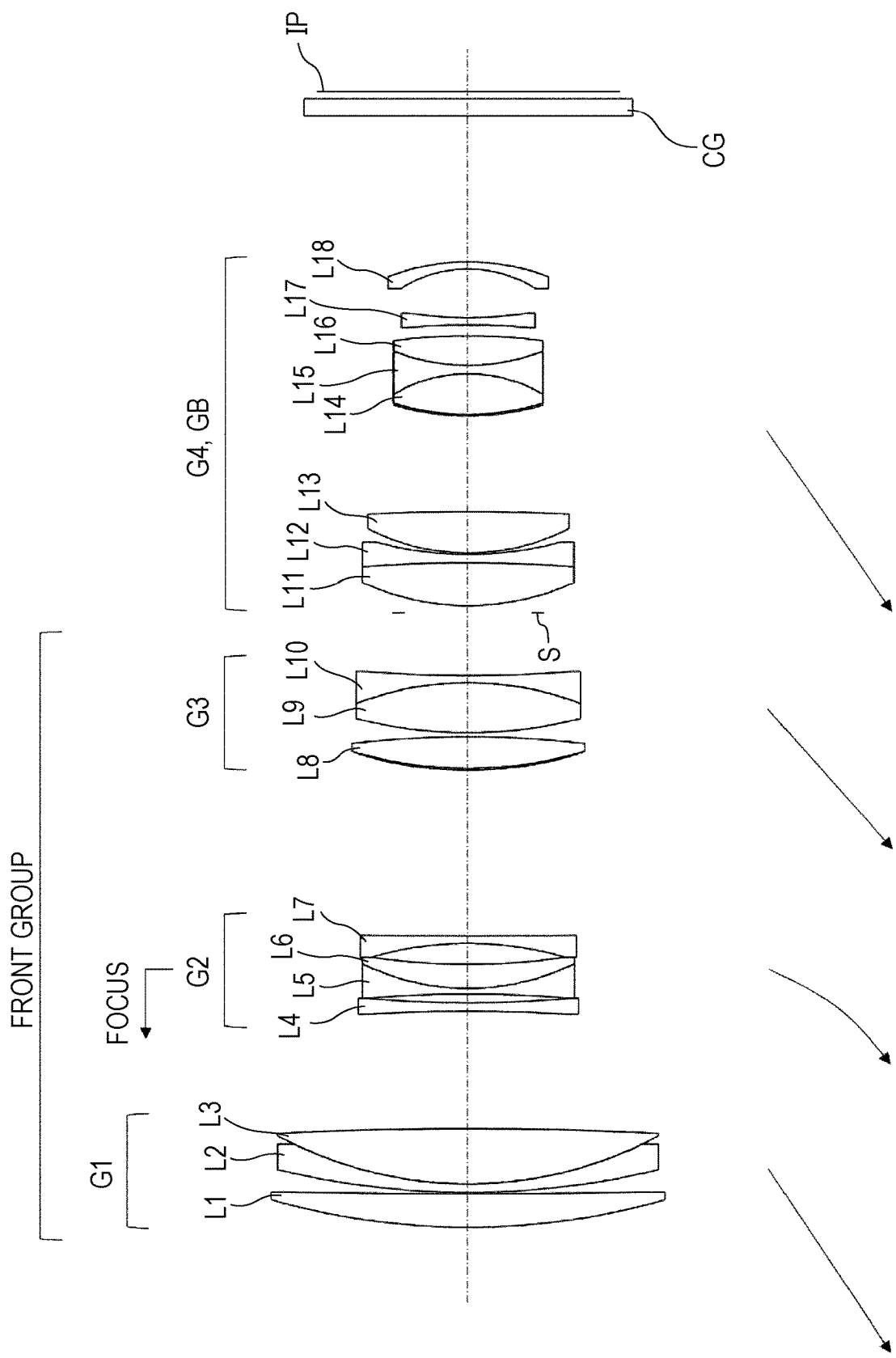
FIG. 25 shows a lens section at a time when a zoom lens according to a seventh embodiment of the present invention is focused at infinity while being at a wide-angle end.

FIG. 25 is a lens section showing a lens configuration of a zoom lens according to a seventh embodiment of the present invention at a time when the zoom lens is focused at infinity while being at a wide-angle end. The zoom lens includes sequentially from an object side, a front group having positive refractive power as a whole, and a lens group GB.

The front group includes sequentially from an object side, a first lens group G1 having positive refractive power, a second lens group G2 having negative refractive power, and a third lens group G3 having positive refractive power. The lens group GB includes a fourth lens group G4 having positive refractive power. An aperture stop S is disposed adjacently to the fourth lens group G4 on an object side of the fourth lens group G4.

Below, a configuration of each lens group will be described. The first lens group G1 includes sequentially from an object side, a positive meniscus lens L1 having a surface which is convex toward an object side, and a cemented lens formed of a negative meniscus lens L2 having a surface which is convex toward an object side and a double convex lens L3, which are cemented together.

The second lens group G2 includes sequentially from an object side, a double concave lens L4, a cemented lens formed of a double concave lens L5 and a positive meniscus lens L6 having a surface which is convex toward an object side, which are cemented together, and a double concave lens L7.

The third lens group G3 includes sequentially from an object side, a double convex lens L8, and a cemented lens formed of a double convex lens L9 and a double concave lens L10 which are cemented together. The double convex lens L8 is a composite-resin-type aspherical lens in which a composite resin film molded in an aspherical shape is stuck to an object-side surface.

The fourth lens group G4 includes sequentially from an object side, a cemented lens formed of a double convex lens L11 and a double concave lens L12 which are cemented together, a double convex lens L13, a cemented lens formed of three lenses cemented together, of a double convex lens L14, a double concave lens L15, and a double convex lens L16, a double concave lens L17, and a negative meniscus lens L18 having a surface which is convex toward an image side. The double convex lens L14 is a composite-resin-type aspherical lens in which a composite resin film molded in an aspherical shape is stuck to an object-side surface. Here, the double convex lens L14, the double concave lens L15, and the double convex lens L16 which form the above-described cemented lens formed of three lenses correspond to the positive lens component P, the double concave lens L17 corresponds to the negative lens component Nf, and the negative meniscus lens L18 corresponds to the negative lens component Nb.

In zooming from a wide-angle end to a telephoto end, the first lens group G1 is moved to an object side, the second lens group G2 is moved to an object side, the third lens group G3 is moved to an object side, and the fourth lens group G4 is moved to an object side.

Focusing on an object in a close region from an object at infinity is obtained by movement of the second lens group G2 to an object side along an optical axis.

(2) Numerical-Value Example

Next, a numerical-value example in which specific numerical values of the zoom lens are applied will be described. Table 31 shows surface data of the zoom lens. Table 32 shows specifications of the zoom lens. Table 33 shows variable distances on an optical axis in the zoom lens in cases where the zoom lens is focused at infinity and where the zoom lens is focused on an object in a close region (a photographing distance is 1500 mm). Table 34 shows respective focal lengths of lens groups forming the zoom lens. Table 35 shows respective aspherical coefficients of aspherical surfaces. It is noted that each aspherical coefficient not shown in Table 35 is 0.00. Also, values in the condition expressions (1) to (8) and values used for calculation of the condition expressions (1) to (8) are shown in Table 47.

Figure 26:
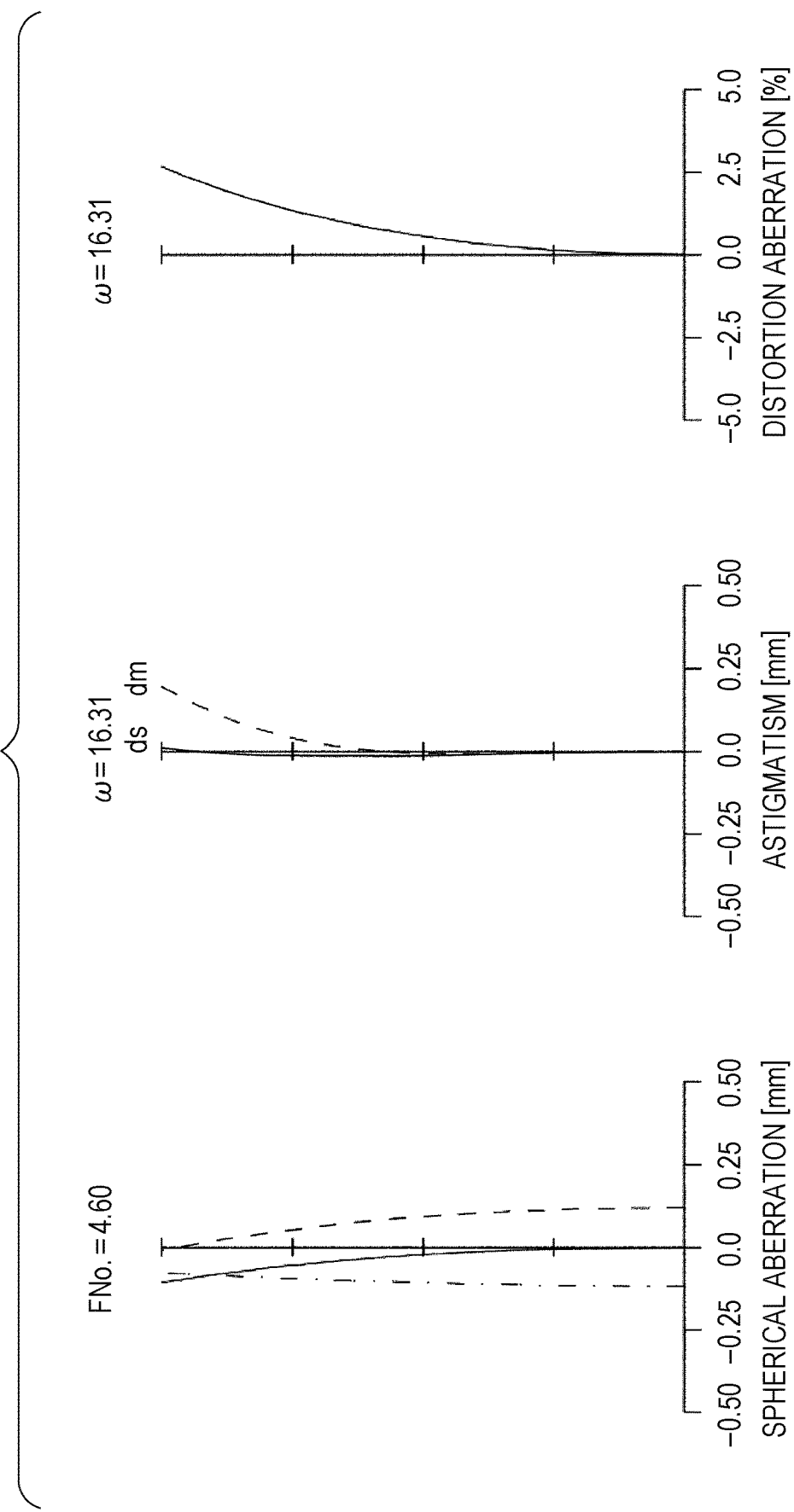
FIG. 26 is a diagram of aberration in the zoom lens according to the seventh embodiment at a wide-angle end.
Figure 27:
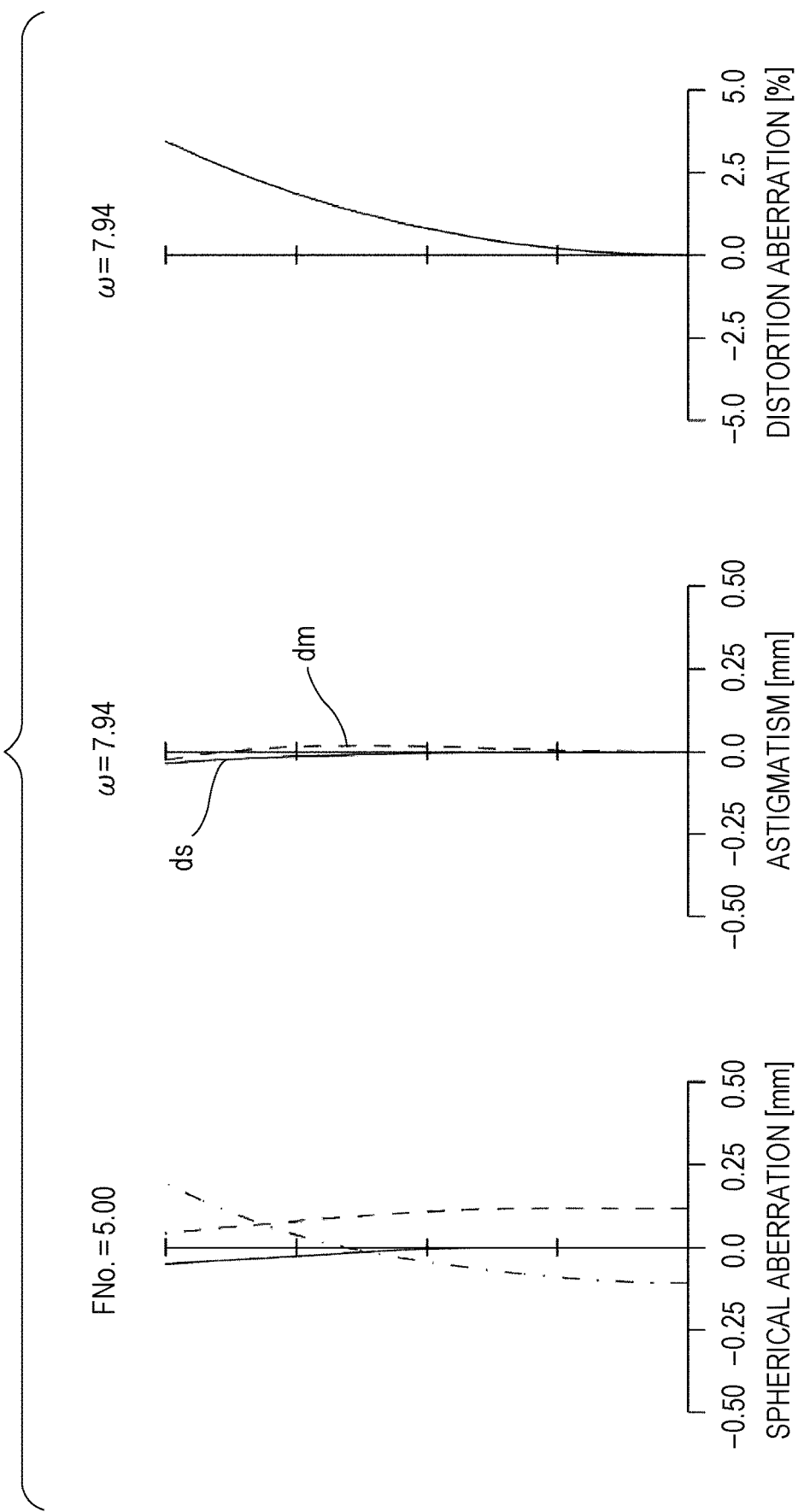
FIG. 27 is a diagram of aberration in the zoom lens according to the seventh embodiment in an intermediate-focal-length position.
Figure 28:
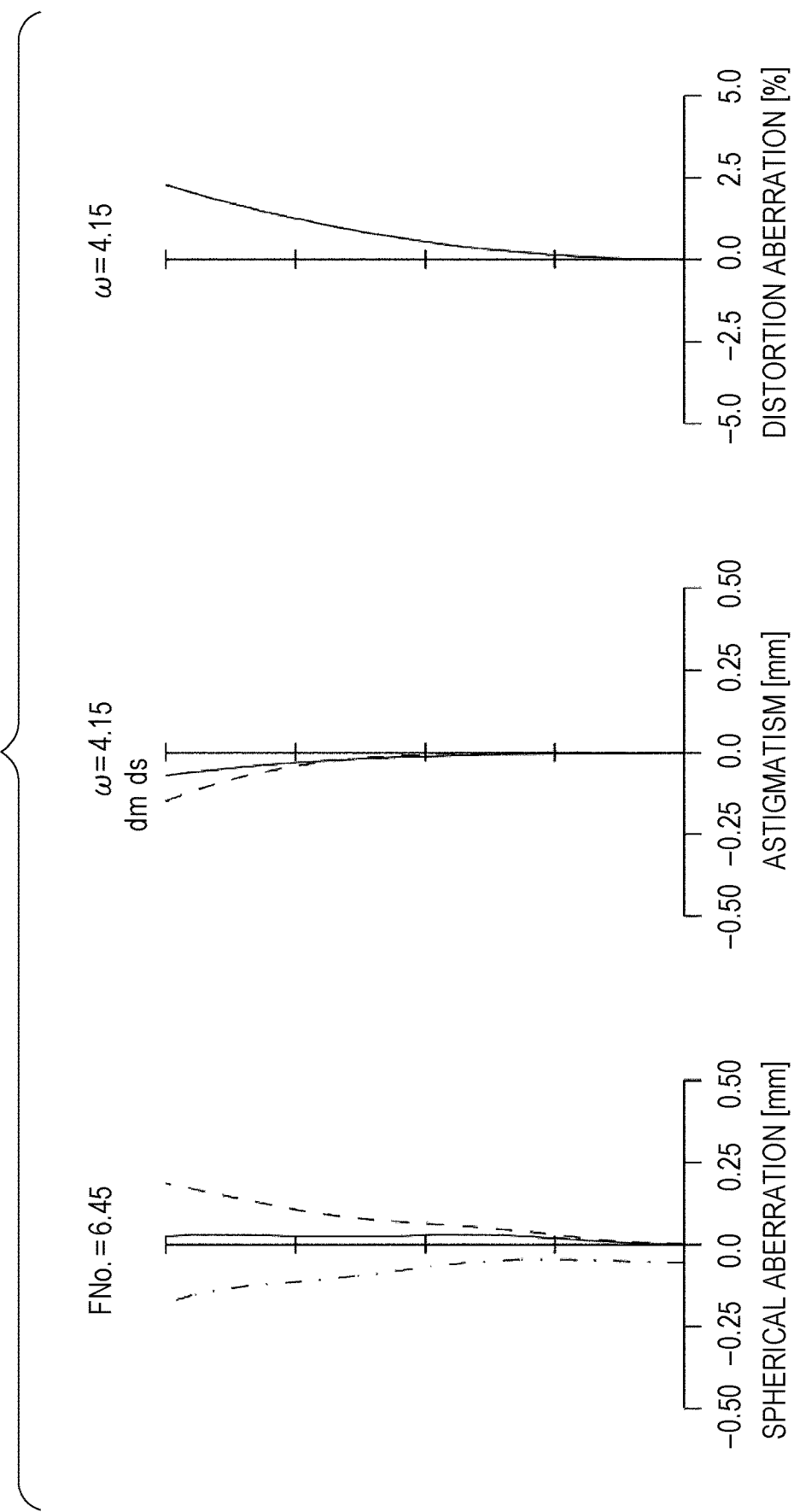
FIG. 28 is a diagram of aberration in the zoom lens according to the seventh embodiment at a telephoto end.

Further, in FIGS. 26 to 28, diagrams of longitudinal aberration in cases where the zoom lens in the seventh embodiment is focused at infinity while being at a wide-angle end, in an intermediate-focal-length position, and at a telephoto end, respectively, are provided.

TABLE 31

| SURFACE NUMBER | r | d | nd | vd |
|---|---|---|---|---|
| SURFACE OF OBJECT | ∞ | d(0) | | |
| 1 | 99.4643 | 4.7013 | 1.48749 | 70.24 |
| 2 | 1272.3853 | 0.2000 | | |
| 3 | 112.1625 | 1.2000 | 1.70154 | 41.24 |
| 4 | 55.6158 | 7.7447 | 1.43875 | 94.94 |
| 5 | −539.4425 | d(5) | | |
| 6 | −247.1969 | 1.2000 | 1.74320 | 49.34 |
| 7 | 158.9413 | 1.2000 | | |
| 8 | −175.1592 | 0.8000 | 1.78590 | 44.20 |
| 9 | 33.2292 | 3.3929 | 1.92286 | 20.88 |
| 10 | 93.2050 | 2.9489 | | |
| 11 | −47.1415 | 1.0000 | 1.48749 | 70.24 |
| 12 | 932.8063 | d(12) | | |
| 13* | 52.7618 | 0.2500 | 1.51460 | 49.96 |
| 14 | 56.0006 | 4.4355 | 1.88300 | 40.80 |
| 15 | −143.9670 | 0.6191 | | |
| 16 | 64.0723 | 7.0000 | 1.51633 | 64.14 |
| 17 | −42.9797 | 1.0000 | 1.91082 | 35.25 |
| 18 | 177.8962 | d(18) | | |
| 19S | ∞ | 1.0000 | | |
| 20 | 34.9841 | 6.0000 | 1.48749 | 70.24 |
| 21 | −205.0838 | 1.2000 | 1.92119 | 23.96 |
| 22 | 48.8700 | 0.2000 | | |
| 23 | 30.6099 | 5.8000 | 1.51633 | 64.14 |
| 24 | −300.7770 | 13.4699 | | |
| 25* | 35.2632 | 0.2000 | 1.51460 | 49.96 |
| 26 | 35.4682 | 5.7000 | 1.73800 | 32.33 |
| 27 | −20.2725 | 1.2000 | 1.83481 | 42.74 |
| 28 | 28.1903 | 4.2000 | 1.67270 | 32.10 |
| 29 | −81.7124 | 1.5384 | | |
| 30 | −91.7124 | 1.0000 | 1.85150 | 40.78 |
| 31 | 53.6030 | 6.8506 | | |
| 32 | −17.4556 | 1.0000 | 1.59522 | 67.73 |
| 33 | −31.2111 | d(33) | | |
| 34 | ∞ | 2.5000 | 1.51633 | 64.14 |
| 35 | ∞ | 1.0000 | | |
| IMAGE PLANE | ∞ | | | |

TABLE 32

| | WIDE-ANGLE END | INTERMEDIATE | TELEPHOTO END |
|---|---|---|---|
| f | 72.1000 | 149.9999 | 291.4997 |
| Fno. | 4.5999 | 5.0003 | 6.4501 |
| ω | 16.3124 | 7.9390 | 4.1494 |
| Y | 21.6330 | 21.6330 | 21.6330 |

TABLE 33

| | WIDE-ANGLE END | INTERMEDIATE | TELEPHOTO END | WIDE-ANGLE END | INTERMEDIATE | TELEPHOTO END |
|---|---|---|---|---|---|---|
| d(0) | ∞ | ∞ | ∞ | 1340.1438 | 1316.0004 | 1284.1438 |
| d(5) | 16.5814 | 35.3224 | 49.8583 | 14.1608 | 31.0032 | 42.4340 |
| d(12) | 23.3990 | 10.9912 | 1.5000 | 25.8196 | 15.3104 | 8.9243 |
| d(18) | 8.8244 | 4.5645 | 2.6913 | 8.8244 | 4.5645 | 2.6913 |
| d(33) | 20.5000 | 42.5702 | 71.2553 | 20.5000 | 42.5702 | 71.2553 |

TABLE 34

| G1 | 146.3826 |
|---|---|
| G2 | −33.2874 |
| G3 | 54.5437 |
| G4 | 205.2293 |

TABLE 35

| SURFACE NUMBER | k | A4 | A6 | A8 | A10 | A12 |
|---|---|---|---|---|---|---|
| 13 | 0.0000 | −2.39090E−07 | 9.32745E−10 | 9.70513E−13 | 4.73081E−17 | 0.00000E+00 |
| 25 | 0.0000 | −8.30793E−06 | −1.62953E−09 | −7.69283E−11 | 5.06491E−13 | 0.00000E+00 |

Eighth Embodiment (1) Optical Configuration of Zoom Lens

Figure 29:
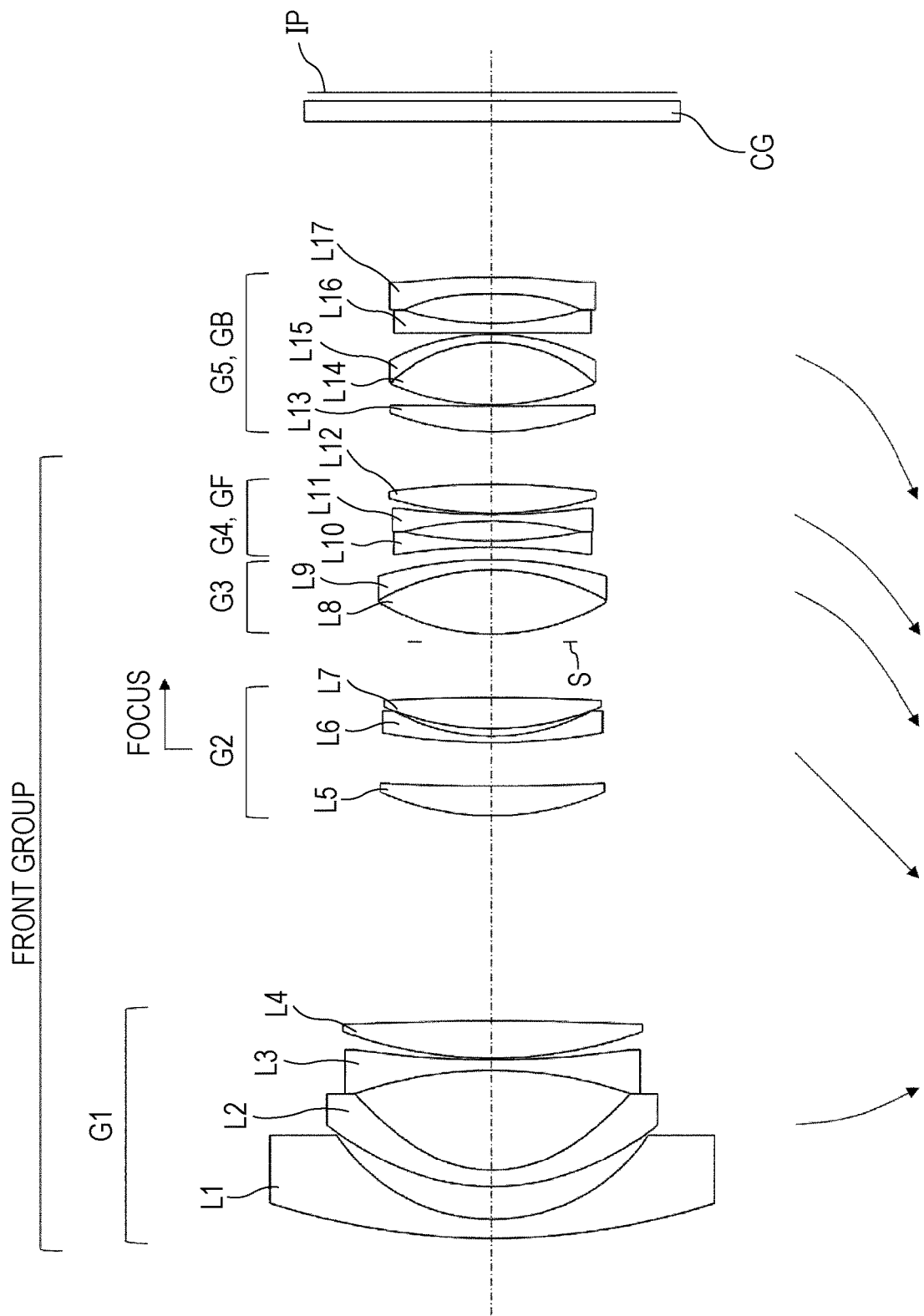
FIG. 29 shows a lens section at a time when a zoom lens according to an eighth embodiment of the present invention is focused at infinity while being at a wide-angle end.

FIG. 29 is a lens section showing a lens configuration of a zoom lens according to an eighth embodiment of the present invention at a time when the zoom lens is focused at infinity while being at a wide-angle end. The zoom lens includes sequentially from an object side, a front group having positive refractive power as a whole, and a lens group GB.

The front group includes sequentially from an object side, a first lens group G1 having negative refractive power, a second lens group G2 having positive refractive power, a third lens group G3 having positive refractive power, and a fourth lens group G4 having negative refractive power. The fourth lens group G4 corresponds to a lens group GF. The lens group GB includes a fifth lens group G5 having positive refractive power. An aperture stop S is disposed adjacently to the third lens group G3 on an object side of the third lens group G3.

Below, a configuration of each lens group will be described. The first lens group G1 includes sequentially from an object side, a negative meniscus lens L1 having a surface which is convex toward an object side, a negative meniscus lens L2 having a surface which is convex toward an object side, a double concave lens L3, and a double convex lens L4. The negative meniscus lens L2 is a glass-molding-type aspherical lens in which both surfaces have an aspherical shape.

The second lens group G2 includes sequentially from an object side, a positive meniscus lens L5 having a surface which is convex toward an object side, a negative meniscus lens L6 having a surface which is convex toward an object side, and a double convex lens L7.

The third lens group G3 includes a cemented lens formed of a double convex lens L8 and a negative meniscus lens L9 having a surface which is convex toward an image side, which are cemented together and are arranged in the stated order from an object side.

The fourth lens group G4 includes sequentially from an object side, a double concave lens L10, a double concave lens L11, and a double convex lens L12.

The fifth lens group G5 includes sequentially from an object side, a positive meniscus lens L13 having a surface which is convex toward an object side, a cemented lens formed of a double convex lens L14 and a negative meniscus lens L15 having a surface which is convex toward an image side, which are cemented together, a double concave lens L16, and a negative meniscus lens L17 having a surface which is convex toward an image side. The negative meniscus lens L17 is a glass-molding-type aspherical lens in which both surfaces have an aspherical shape. Here, the double convex lens L14 and the negative meniscus lens L15 which form the above-described cemented lens correspond to the positive lens component P, the double concave lens L16 corresponds to the negative lens component Nf, and the negative meniscus lens L17 corresponds to the negative lens component Nb.

In zooming from a wide-angle end to a telephoto end, the first lens group G1 is moved to an image side, the second lens group G2 is moved to an object side, the third lens group G3 is moved to an object side, the fourth lens group G4 is moved to an object side, and the fifth lens group G5 is moved to an object side.

Focusing on an object in a close region from an object at infinity is obtained by movement of the second lens group G2 to an image side along an optical axis.

(2) Numerical-Value Example

Next, a numerical-value example in which specific numerical values of the zoom lens are applied will be described. Table 36 shows surface data of the zoom lens. Table 37 shows specifications of the zoom lens. Table 38 shows variable distances on an optical axis in the zoom lens in cases where the zoom lens is focused at infinity and where the zoom lens is focused on an object in a close region (a photographing distance is 300 mm). Table 39 shows respective focal lengths of lens groups forming the zoom lens. Table 40 shows respective aspherical coefficients of aspherical surfaces. It is noted that each aspherical coefficient not shown in Table 40 is 0.00. Also, values in the condition expressions (1) to (8) and values used for calculation of the condition expressions (1) to (8) are shown in Table 47.

Figure 30:
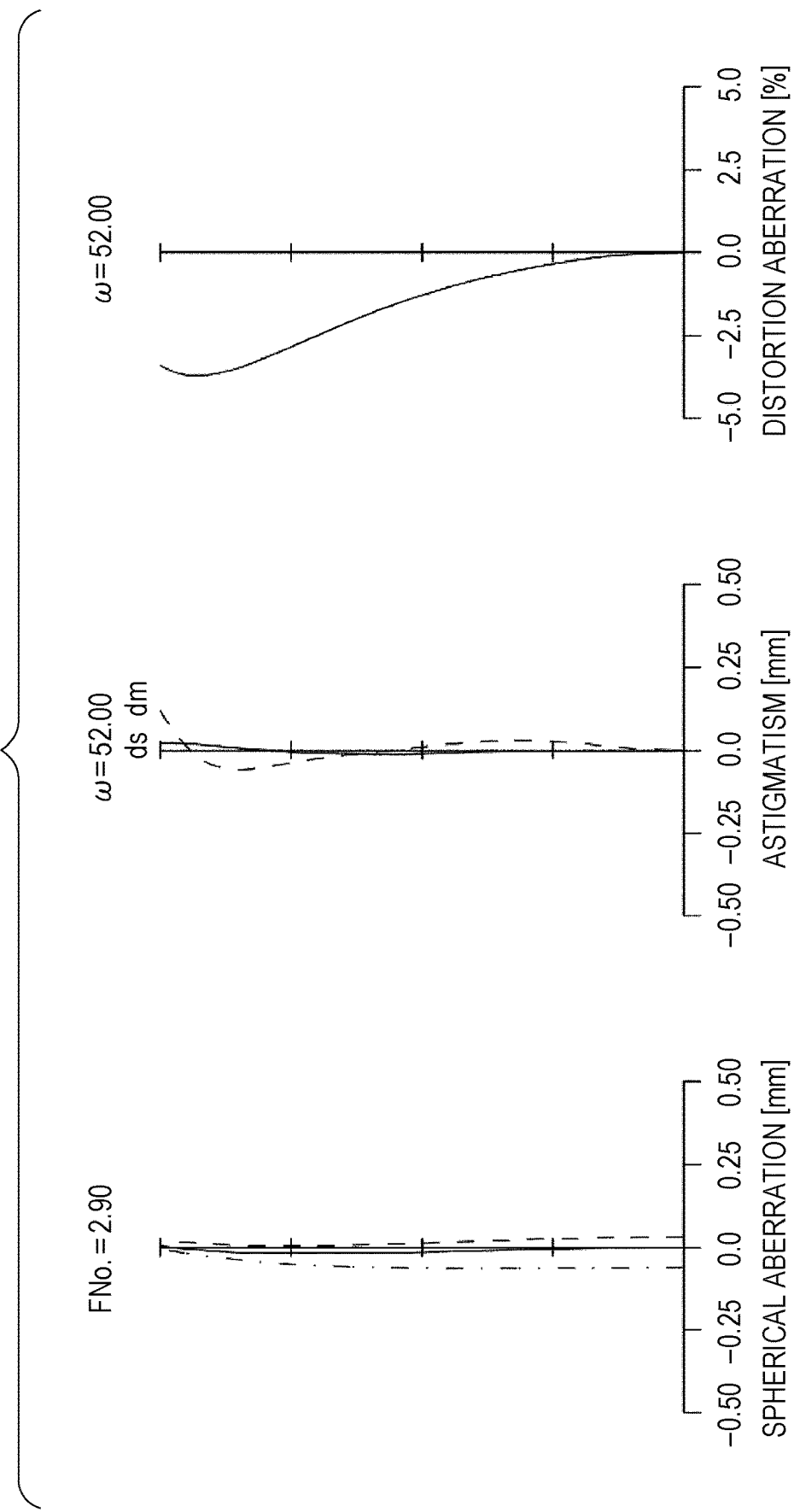
FIG. 30 is a diagram of aberration in the zoom lens according to the eighth embodiment at a wide-angle end.
Figure 31:
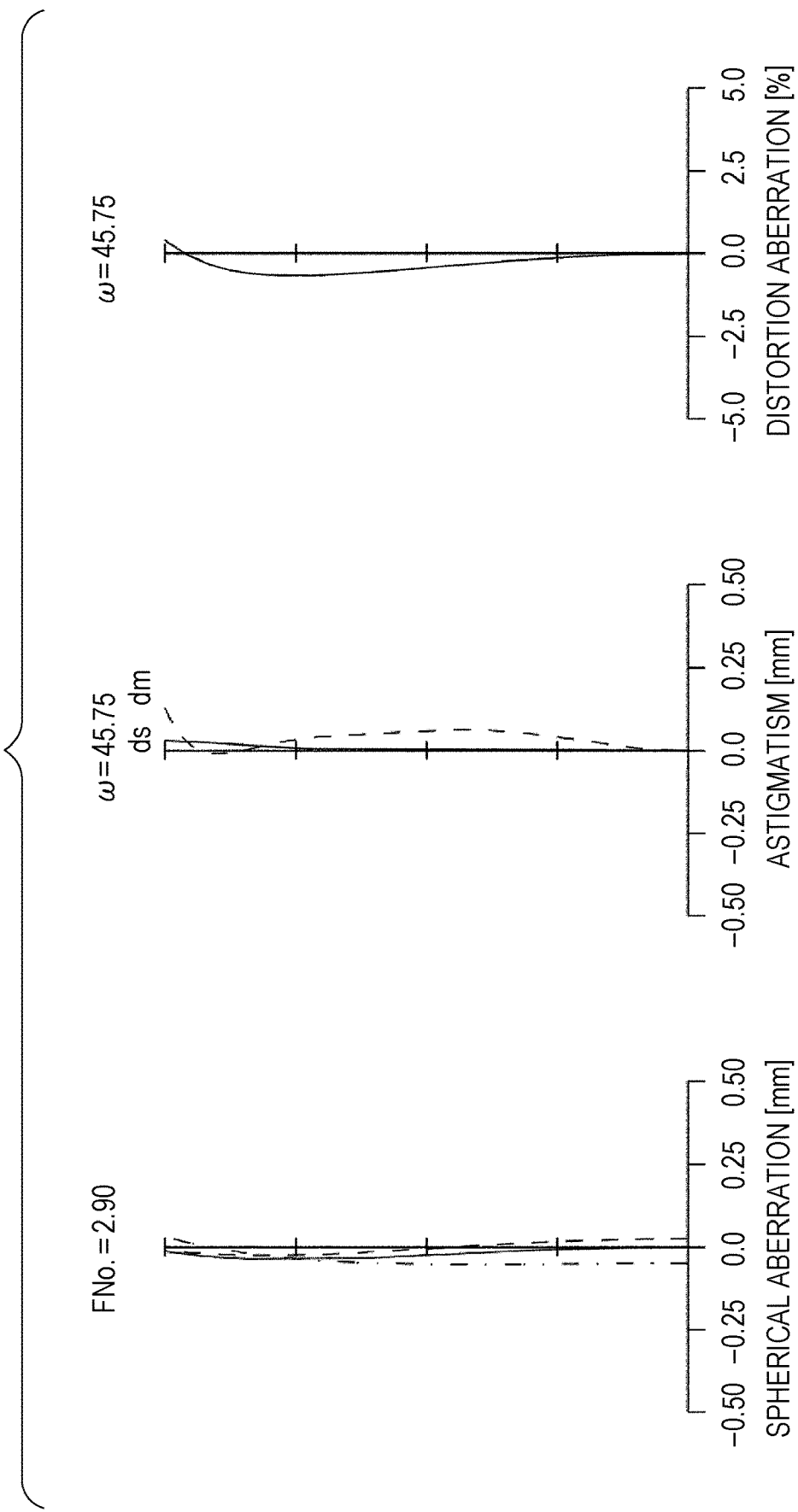
FIG. 31 is a diagram of aberration in the zoom lens according to the eighth embodiment in an intermediate-focal-length position.
Figure 32:
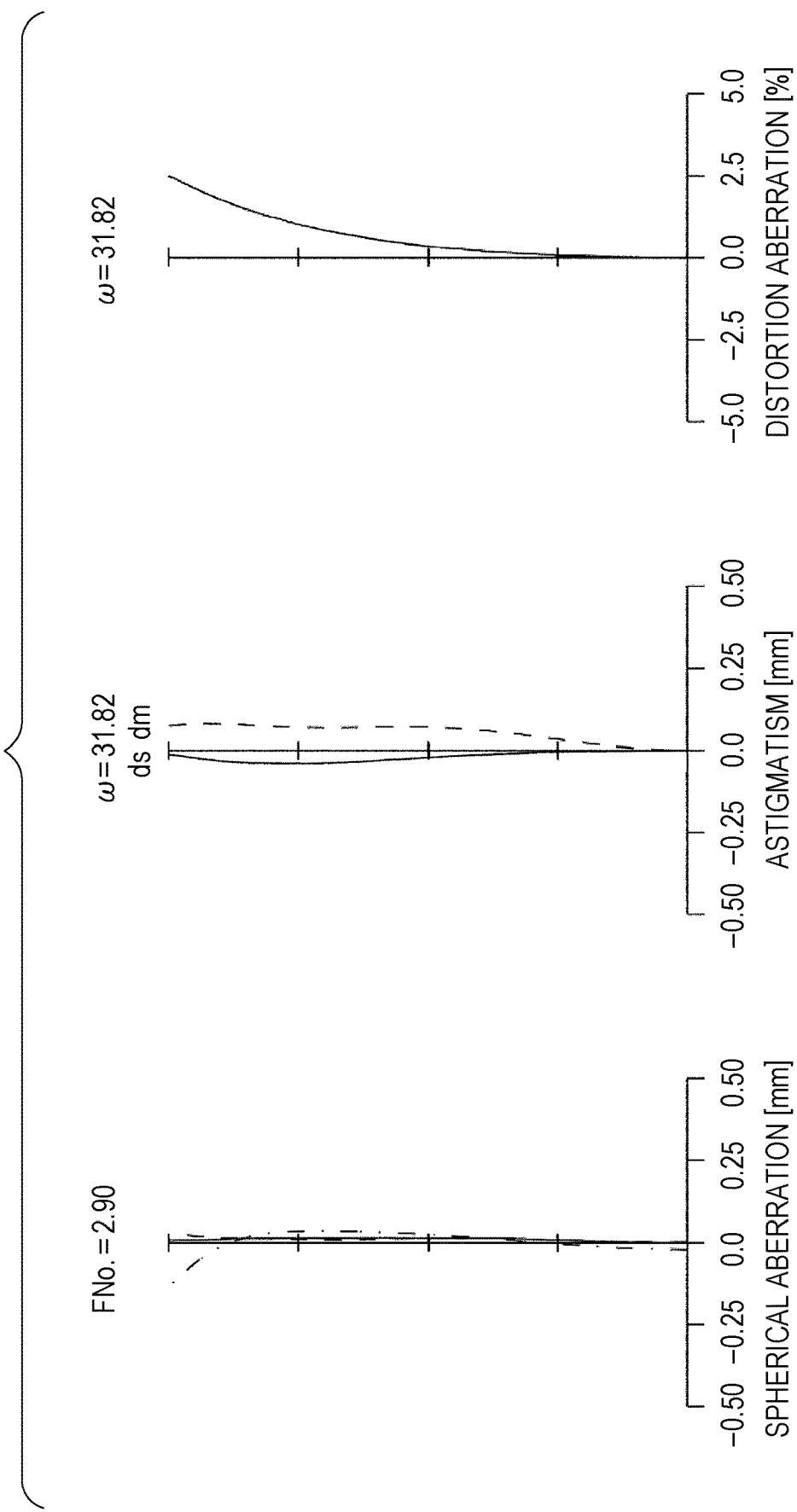
FIG. 32 is a diagram of aberration in the zoom lens according to the eighth embodiment at a telephoto end.

Further, in FIGS. 30 to 32, diagrams of longitudinal aberration in cases where the zoom lens in the eighth embodiment is focused at infinity while being at a wide-angle end, in an intermediate-focal-length position, and at a telephoto end, respectively, are provided.

TABLE 36

| SURFACE NUMBER | r | d | nd | vd |
|---|---|---|---|---|
| SURFACE OF OBJECT | ∞ | d(0) | | |
| 1 | 86.9829 | 2.3000 | 1.77250 | 49.60 |
| 2 | 22.3416 | 4.0024 | | |
| 3* | 29.1082 | 2.0000 | 1.69350 | 53.18 |
| 4* | 15.6610 | 12.2112 | | |
| 5 | −50.5156 | 1.3000 | 1.49700 | 81.61 |
| 6 | 112.7091 | 0.2000 | 1.76182 | 26.52 |
| 7 | 52.1044 | 4.5487 | | |
| 8 | −371.5056 | d(8) | | |
| 9 | 32.7086 | 3.6291 | 1.73800 | 32.33 |
| 10 | 242.9848 | 5.3128 | | |
| 11 | 74.2703 | 0.8000 | 1.92119 | 23.96 |
| 12 | 24.6959 | 0.9264 | | |
| 13 | 34.0409 | 3.7862 | 1.58913 | 61.13 |
| 14 | −240.0248 | d(14) | | |
| 15S | ∞ | 1.0000 | | |
| 16 | 26.4280 | 7.7996 | 1.59282 | 68.62 |
| 17 | −27.5101 | 1.2000 | 1.92119 | 23.96 |
| 18 | −49.7205 | d(18) | | |
| 19 | −78.5563 | 0.8000 | 1.89190 | 37.13 |
| 20 | 52.7476 | 2.4109 | | |
| 21 | −45.3680 | 0.8000 | 1.88300 | 40.80 |
| 22 | 82.7990 | 0.1500 | | |
| 23 | 44.1109 | 3.5532 | 1.92286 | 20.88 |
| 24 | −89.1785 | d(24) | | |

TABLE 36-continued

| SURFACE NUMBER | r | d | nd | vd |
|---|---|---|---|---|
| 25 | 34.6234 | 3.1363 | 1.53775 | 74.70 |
| 26 | 686.7857 | 0.1500 | | |
| 27 | 31.1108 | 7.6001 | 1.49700 | 81.61 |
| 28 | −17.9379 | 1.0000 | 1.90525 | 35.04 |
| 29 | −25.7995 | 0.1500 | | |
| 30 | −2576.4922 | 1.2000 | 1.77250 | 49.60 |
| 31 | 37.3239 | 3.5741 | | |
| 32* | −72.6304 | 2.0000 | 1.88202 | 37.22 |
| 33* | −699.0489 | d(33) | | |
| 34 | ∞ | 2.5000 | 1.51680 | 64.20 |
| 35 | ∞ | 1.0000 | | |
| IMAGE PLANE | ∞ | | | |

TABLE 37

| | WIDE-ANGLE END | INTERMEDIATE | TELEPHOTO END |
|---|---|---|---|
| f | 17.5000 | 21.0000 | 34.0000 |
| FNo. | 2.9001 | 2.8999 | 2.9000 |
| ω | 51.9992 | 45.7539 | 31.8248 |
| Y | 21.6330 | 21.6330 | 21.6330 |

TABLE 38

| | WIDE-ANGLE END | INTERMEDIATE | TELEPHOTO END | WIDE-ANGLE END | INTERMEDIATE | TELEPHOTO END |
|---|---|---|---|---|---|---|
| d(0) | ∞ | ∞ | ∞ | 160.0000 | 160.5000 | 169.0353 |
| d(8) | 25.0787 | 15.9198 | 1.5000 | 28.0132 | 18.8906 | 4.6344 |
| d(14) | 6.8158 | 12.6052 | 4.6344 | 3.8814 | 9.6344 | 1.5000 |
| d(18) | 1.5000 | 2.3549 | 4.1434 | 1.5000 | 2.3549 | 4.1434 |
| d(24) | 6.4555 | 3.9935 | 1.3000 | 6.4555 | 3.9935 | 1.3000 |
| d(33) | 19.1092 | 23.5857 | 38.3460 | 19.1092 | 23.5857 | 38.3460 |

TABLE 39

| | |
|---|---|
| G1 | −23.6182 |
| G2 | 64.6409 |
| G3 | 35.5085 |
| G4 | −38.9440 |
| G5 | 61.5671 |

TABLE 40

| SURFACE NUMBER | k | A4 | A6 | A8 | A10 | A12 |
|---|---|---|---|---|---|---|
| 3 | −2.1933 | 2.53384E−05 | −1.07903E−07 | 2.91024E−10 | −3.92272E−13 | 2.05544E−16 |
| 4 | −0.4294 | 8.66936E−06 | −1.46839E−07 | 1.24836E−10 | 4.06332E−13 | −1.55239E−15 |
| 32 | 0.0000 | −1.45788E−04 | 4.68549E−07 | 4.22206E−10 | −8.24313E−13 | −6.36887E−15 |
| 33 | 0.0000 | −1.01420E−04 | 6.19196E−07 | −3.68610E−10 | −1.05117E−12 | −1.77846E−16 |

Ninth Embodiment

(1) Optical Configuration of Zoom Lens

Figure 33:
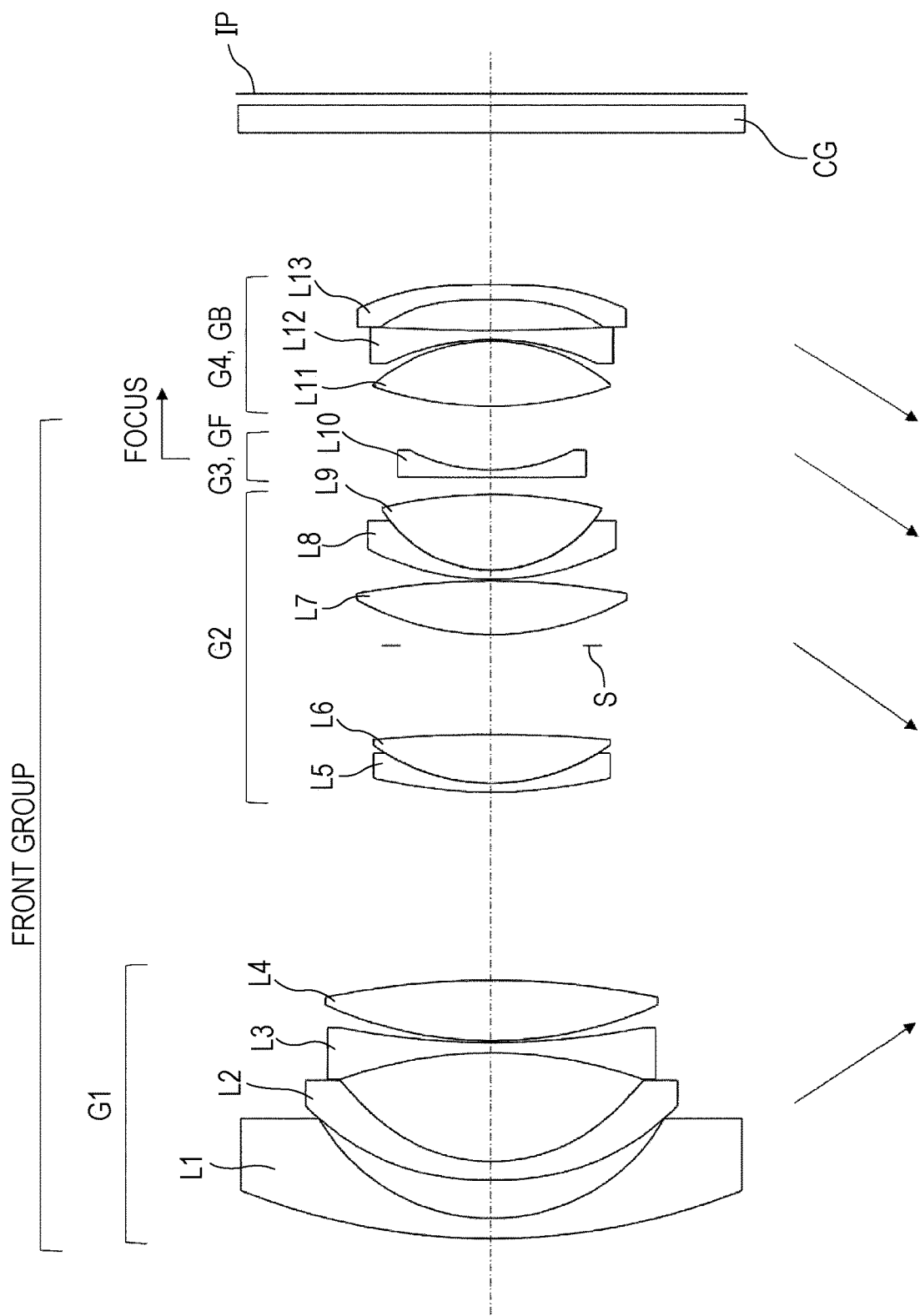
FIG. 33 shows a lens section at a time when a zoom lens according to a ninth embodiment of the present invention is focused at infinity while being at a wide-angle end.

FIG. 33 is a lens section showing a lens configuration of a zoom lens according to a ninth embodiment of the present invention at a time when the zoom lens is focused at infinity while being at a wide-angle end. The zoom lens includes sequentially from an object side, a front group having positive refractive power as a whole, and a lens group GB.

The front group includes sequentially from an object side, a first lens group G1 having negative refractive power, a second lens group G2 having positive refractive power, and a third lens group G3 having negative refractive power. The third lens group G3 corresponds to a lens group GF. The lens group GB includes a fourth lens group G4 having negative refractive power. An aperture stop S is disposed in the second lens group G2.

Below, a configuration of each lens group will be described. The first lens group G1 includes sequentially from an object side, a negative meniscus lens L1 having a surface which is convex toward an object side, a negative meniscus lens L2 having a surface which is convex toward an object side, a double concave lens L3, and a double convex lens L4. The negative meniscus lens L2 is a glass-molding-type aspherical lens in which both surfaces have an aspherical shape.

The second lens group G2 includes sequentially from an object side, a cemented lens formed of a negative meniscus lens L5 having a surface which is convex toward an object side and a double convex lens L6, which are cemented together, a double convex lens L7, and a cemented lens formed of a negative meniscus lens L8 having a surface which is convex toward an object side and a double convex lens L9, which are cemented together. The negative meniscus lens L5 is a glass-molding-type aspherical lens in which an object-side surface has an aspherical shape.

The third lens group G3 includes a negative meniscus lens L10 having a surface which is convex toward an object side.

The fourth lens group G4 includes sequentially from an object side, a double convex lens L11, a double concave lens L12, and a negative meniscus lens L13 having a surface which is convex toward an image side. The negative meniscus lens L13 is a glass-molding-type aspherical lens in which both surfaces have an aspherical shape. Here, the double convex lens L11 corresponds to the positive lens component P, the double concave lens L12 corresponds to the negative lens component Nf, and the negative meniscus lens L13 corresponds to the negative lens component Nb.

In zooming from a wide-angle end to a telephoto end, the first lens group G1 is moved to an image side, the second lens group G2 is moved to an object side, the third lens group G3 is moved to an object side, and the fourth lens group G4 is moved to an object side.

Focusing on an object in a close region from an object at infinity is obtained by movement of the third lens group G3 to an image side along an optical axis.

(2) Numerical-Value Example

Next, a numerical-value example in which specific numerical values of the zoom lens are applied will be described. Table 41 shows surface data of the zoom lens. Table 42 shows specifications of the zoom lens. Table 43 shows variable distances on an optical axis in the zoom lens in cases where the zoom lens is focused at infinity and where the zoom lens is focused on an object in a close region (a photographing distance is 280 mm). Table 44 shows respective focal lengths of lens groups forming the zoom lens. Table 45 shows respective aspherical coefficients of aspherical surfaces. It is noted that each aspherical coefficient not shown in Table 45 is 0.00. Also, values in the condition expressions (1) to (8) and values used for calculation of the condition expressions (1) to (8) are shown in Table 47.

Figure 34:
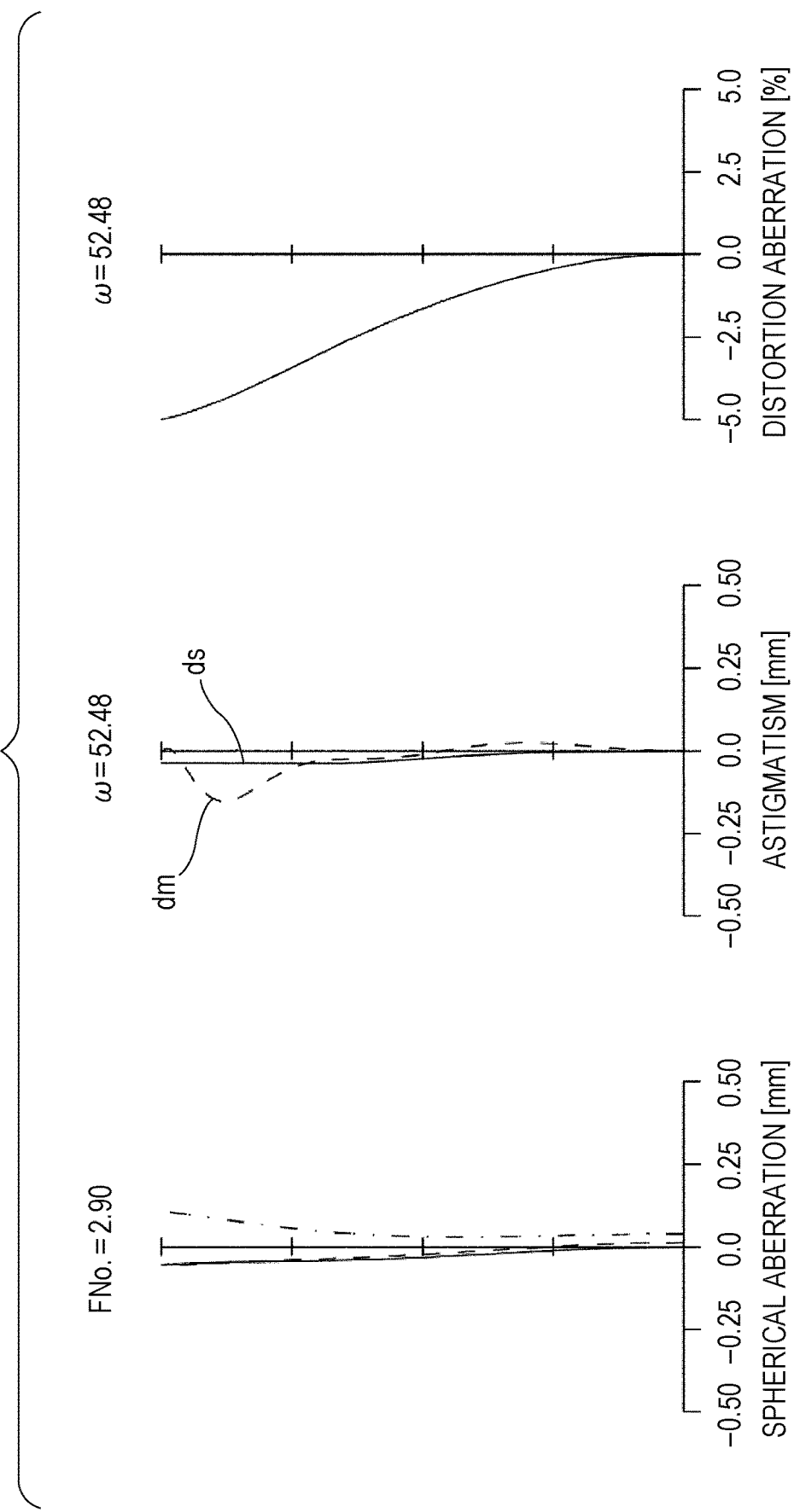
FIG. 34 is a diagram of aberration in the zoom lens according to the ninth embodiment at a wide-angle end.
Figure 35:
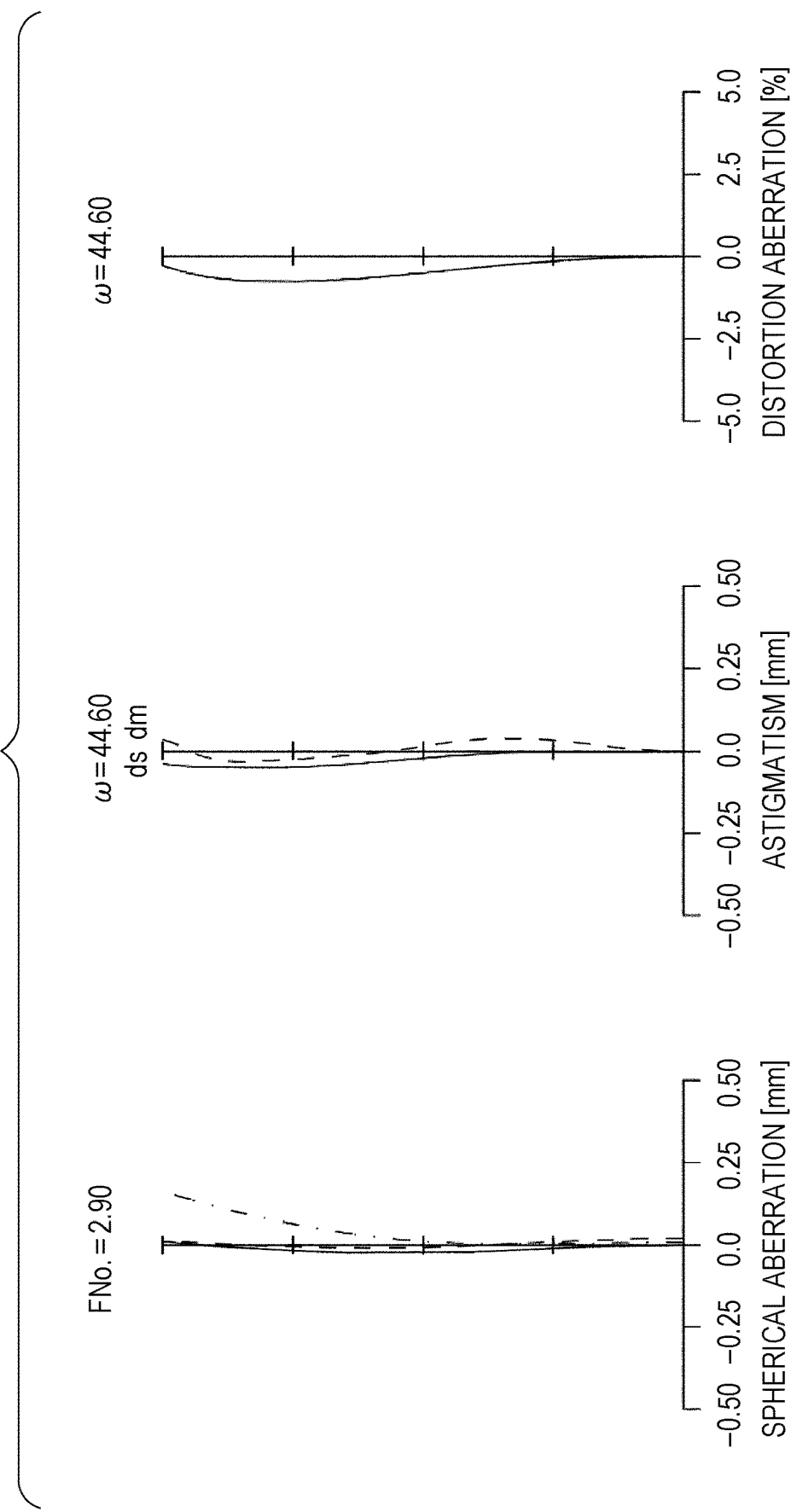
FIG. 35 is a diagram of aberration in the zoom lens according to the ninth embodiment in an intermediate-focal-length position.
Figure 36:
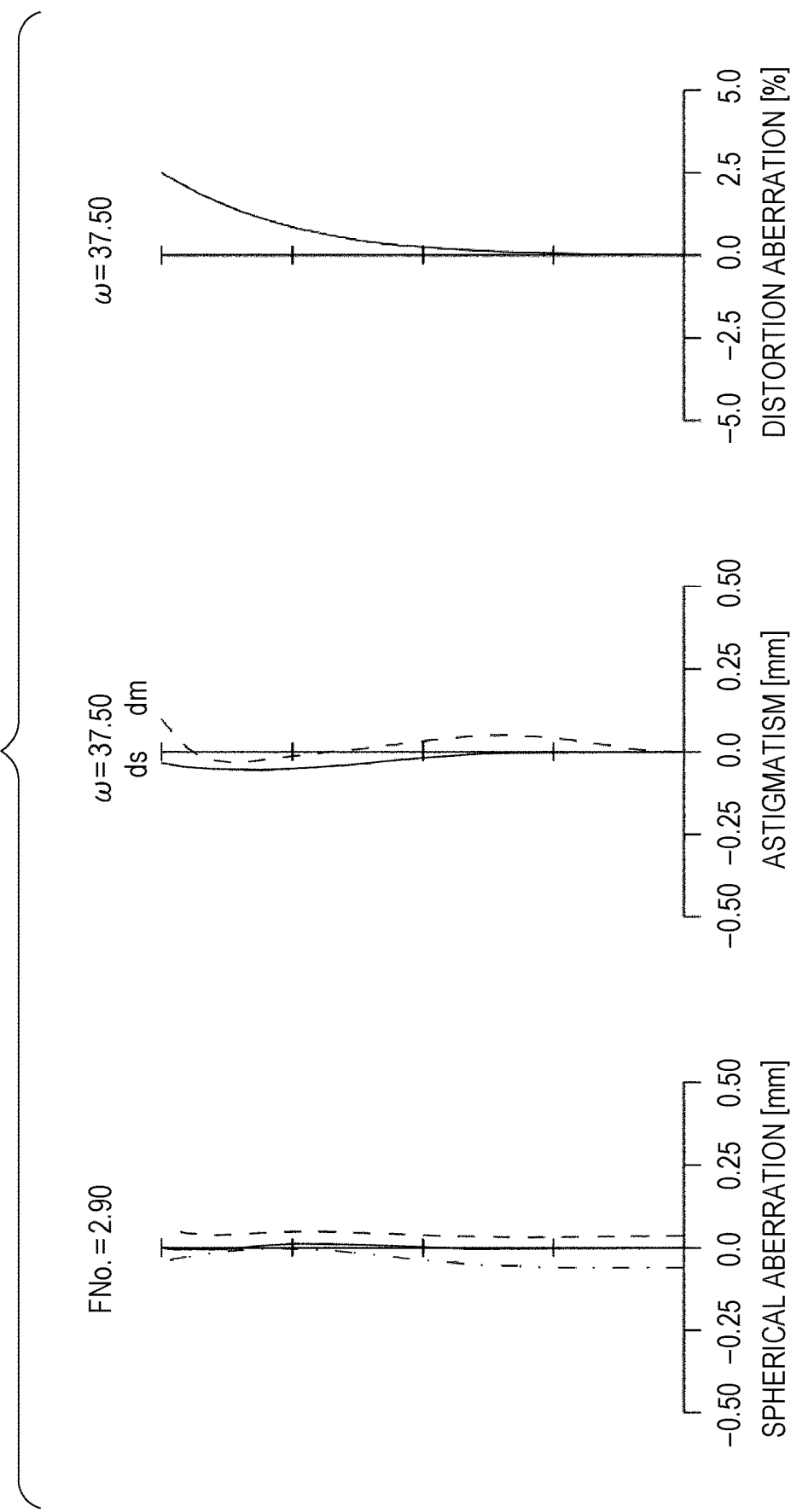
FIG. 36 is a diagram of aberration in the zoom lens according to the ninth embodiment at a telephoto end.

Further, in FIGS. 34 to 36, diagrams of longitudinal aberration in cases where the zoom lens in the ninth embodiment is focused at infinity while being at a wide-angle end, in an intermediate-focal-length position, and at a telephoto end, respectively, are provided.

TABLE 41

| SURFACE NUMBER | r | d | nd | vd |
| --- | --- | --- | --- | --- |
| SURFACE OF OBJECT | ∞ | d(0) | | |
| 1 | 60.0000 | 1.8000 | 1.72916 | 54.67 |
| 2 | 17.6846 | 3.4244 | | |
| 3* | 32.7014 | 1.7000 | 1.69350 | 53.18 |
| 4* | 16.4714 | 9.7187 | | |
| 5 | −39.4214 | 1.0000 | 1.49700 | 81.61 |
| 6 | 70.1772 | 0.1500 | | |
| 7 | 35.7604 | 5.4096 | 1.62004 | 36.26 |
| 8 | −72.8884 | d(8) | | |
| 9* | 40.9225 | 0.8000 | 1.86100 | 37.10 |
| 10 | 17.9883 | 4.3722 | 1.61772 | 49.81 |
| 11 | −123.5638 | 7.9809 | | |
| 12S | ∞ | 1.0000 | | |
| 13 | 24.8970 | 4.7951 | 1.53775 | 74.70 |
| 14 | −64.3209 | 0.1500 | | |
| 15 | 23.9008 | 0.8000 | 1.88300 | 40.80 |
| 16 | 11.4921 | 6.8076 | 1.49700 | 81.61 |
| 17 | −40.4592 | d(17) | | |
| 18 | 351.1231 | 0.7000 | 1.48749 | 70.24 |
| 19 | 15.9630 | d(19) | | |
| 20 | 32.6679 | 5.8277 | 1.51823 | 58.90 |
| 21 | −16.2745 | 0.1500 | | |
| 22 | −21.5991 | 0.8000 | 1.73400 | 51.47 |
| 23 | 157.9588 | 2.8368 | | |
| 24* | −56.5696 | 1.3000 | 1.88202 | 37.22 |
| 25* | −223.9375 | d(25) | | |
| 26 | ∞ | 2.5000 | 1.51680 | 64.20 |
| 27 | ∞ | 1.0000 | | |

TABLE 42

| | WIDE-ANGLE END | INTERMEDIATE | TELEPHOTO END |
| --- | --- | --- | --- |
| f | 17.5000 | 22.0000 | 27.5000 |
| FNo. | 2.9001 | 2.9001 | 2.9001 |
| ω | 52.4786 | 44.6024 | 37.5020 |
| Y | 21.6330 | 21.6330 | 21.6330 |

TABLE 43

| | WIDE-ANGLE END | INTERMEDIATE | TELEPHOTO END | WIDE-ANGLE END | INTERMEDIATE | TELEPHOTO END |
| --- | --- | --- | --- | --- | --- | --- |
| d(0) | ∞ | ∞ | ∞ | 177.1524 | 181.7800 | 184.3366 |
| d(8) | 16.9527 | 8.2625 | 1.2000 | 16.9527 | 8.2625 | 1.2000 |
| d(17) | 1.5000 | 1.9253 | 2.5717 | 2.0988 | 2.7204 | 3.6301 |

TABLE 43-continued

|  | WIDE-ANGLE END | INTERMEDIATE | TELEPHOTO END | WIDE-ANGLE END | INTERMEDIATE | TELEPHOTO END |
|---|---|---|---|---|---|---|
| d(19) | 5.7254 | 6.1609 | 6.1329 | 5.1266 | 5.3658 | 5.0744 |
| d(25) | 13.6467 | 16.8485 | 20.7360 | 13.6467 | 16.8485 | 20.7360 |

TABLE 44

| G1 | −25.7028 |
| G2 | 21.0442 |
| G3 | −34.3283 |
| G4 | −1498.9817 |

TABLE 45

| SURFACE NUMBER | k | A4 | A6 | A8 | A10 | A12 |
|---|---|---|---|---|---|---|
| 3 | 2.3554 | 5.63471E−05 | −3.26682E−07 | 1.00072E−09 | −1.17701E−12 | −1.88438E−15 |
| 4 | 0.1008 | 5.42937E−05 | −3.06529E−07 | −3.63644E−10 | 8.32643E−12 | −3.46288E−14 |
| 9 | 0.0000 | −9.28259E−06 | −1.77863E−08 | 1.08966E−10 | −3.75312E−13 | 0.00000E+00 |
| 24 | 0.0000 | −2.38929E−04 | 1.22551E−06 | −8.20489E−09 | 4.12193E−11 | −1.28092E−13 |
| 25 | 0.0000 | −1.94636E−04 | 1.35828E−06 | −7.50619E−09 | 3.21968E−11 | −6.85586E−14 |

TABLE 46

|  | FIRST EMBODIMENT | SECOND EMBODIMENT | THIRD EMBODIMENT | FOURTH EMBODIMENT | FIFTH EMBODIMENT |
|---|---|---|---|---|---|
| CONDITION EXPRESSION (1) (RNf + RNb)/(RNf − RNb) | 0.311 | 0.765 | 0.866 | 1.204 | 0.504 |
| CONDITION EXPRESSION (2) βFBt/βFBw | 1.568 | 1.370 | 1.589 | 1.852 | 1.288 |
| CONDITION EXPRESSION (3) BFw/Y | 0.786 | 0.886 | 0.786 | 0.786 | 0.867 |
| CONDITION EXPRESSION (4) fP/Y | 1.436 | 1.187 | 1.363 | 1.211 | 1.637 |
| CONDITION EXPRESSION (5) |fN|/Y | 0.973 | 0.782 | 1.032 | 1.349 | 1.473 |
| CONDITION EXPRESSION (6) RP/fw | 1.271 | 1.395 | 1.278 | 1.393 | 1.138 |
| CONDITION EXPRESSION (7) fNf/fNb | 0.846 | 0.474 | 1.419 | 1.466 | 1.002 |
| CONDITION EXPRESSION (8) vP | 32.09 | 33.79 | 38.02 | 26.60 | 43.70 |
| RNf | 40.075 | 120.199 | 340.851 | −352.621 | 80.926 |
| RNb | −21.055 | −16.000 | −24.453 | −32.694 | −26.723 |
| βFBt | 3.061 | 2.478 | 2.991 | 3.817 | 2.689 |
| βFBw | 1.952 | 1.808 | 1.883 | 2.061 | 2.088 |
| BFw | 17.000 | 19.157 | 17.000 | 17.000 | 18.751 |
| Y | 21.633 | 21.633 | 21.633 | 21.633 | 21.633 |
| fP | 31.062 | 25.674 | 29.476 | 26.205 | 35.410 |
| fN | −21.045 | −16.926 | −22.335 | −29.190 | −31.874 |
| RP | 36.602 | 40.174 | 36.802 | 40.131 | 40.986 |
| fNf | −41.530 | −26.547 | −56.585 | −74.113 | −66.501 |
| fNb | −49.078 | −56.038 | −39.864 | −50.559 | −66.395 |

TABLE 47

|  | SIXTH EMBODIMENT | SEVENTH EMBODIMENT | EIGHTH EMBODIMENT | NINTH EMBODIMENT |
|---|---|---|---|---|
| CONDITION EXPRESSION (1) (RNf + RNb)/(RNf − RNb) | 0.337 | 0.509 | −0.321 | 0.473 |
| CONDITION EXPRESSION (2) βFBt/βFBw | 1.320 | — | 1.110 | 1.134 |
| CONDITION EXPRESSION (3) BFw/Y | 0.657 | 1.109 | 1.045 | 0.793 |
| CONDITION EXPRESSION (4) fP/Y | 1.687 | 2.500 | 1.687 | 1.010 |
| CONDITION EXPRESSION (5) |fN|/Y | 1.680 | 1.096 | 1.415 | 0.895 |
| CONDITION EXPRESSION (6) RP/fw | 1.746 | 0.489 | 1.778 | 1.867 |
| CONDITION EXPRESSION (7) fNf/fNb | 1.197 | 0.579 | 0.517 | 0.300 |
| CONDITIO EXPRESSION (8) vP | 42.80 | 32.10 | 81.61 | 58.90 |
| RNf | 45.784 | 53.603 | 37.324 | 157.959 |
| RNb | −22.709 | −17.456 | −72.630 | −56.570 |
| βFBt | 2.227 | — | 1.577 | 2.077 |
| βFBw | 1.687 | — | 1.421 | 1.832 |

TABLE 47-continued

|     | SIXTH EMBODIMENT | SEVENTH EMBODIMENT | EIGHTH EMBODIMENT | NINTH EMBODIMENT |
| --- | --- | --- | --- | --- |
| BFw | 14.000 | 24.000 | 22.609 | 17.147 |
| Y | 21.300 | 21.633 | 21.633 | 21.633 |
| fP | 35.938 | 54.083 | 36.503 | 21.850 |
| fN | −35.778 | −23.713 | −30.622 | −19.356 |
| RP | 43.124 | 35.263 | 31.111 | 32.668 |
| fNf | −82.057 | −39.605 | −47.616 | −25.838 |
| fNb | −68.539 | −68.397 | −92.031 | −86.128 |

According to the present invention, it is possible to provide a zoom lens which is suitable for a digital still camera or the like having a short flange-focal length, is compact as a whole, allows a diameter of a rearmost lens group to be easily reduced, and achieves a high performance, and an imaging apparatus including the foregoing zoom lens.

What is claimed is:

1. A zoom lens comprising:
a front group that has positive refractive power as a whole; and
a lens group GB disposed on an image side of the front group, wherein
the front group and the lens group GB are arranged sequentially in a stated order from an object side,
a magnification is changed by a change of a distance on an optical axis between adjacent lens groups,
the front group includes at least three lens groups,
the lens group GB includes sequentially from the image side, a negative lens component Nb, a negative lens component Nf, and a positive lens component P,
an object-side surface of the negative lens component Nb is a concave surface,
the lens group GB is moved to the object side in zooming from a wide-angle end to a telephoto end,
focusing is obtained by movement of a part of the lens groups included in the front group, along the optical axis,
a following condition expression is satisfied:

$$-0.7 \leq (RNf+RNb)/(RNf-RNb) \leq 2.0 \quad (1)$$

where
RNf represents a radius of curvature of a surface located closest to an image in the negative lens component Nf, and
RNb represents a radius of curvature of a surface located closest to an object in the negative lens component Nb,
the front group includes a negative lens group GF in a position closest to the image, and
a following condition expression is satisfied:

$$1.1 \leq \beta FBt/\beta FBw \leq 2.5 \quad (2)$$

where
βFBt represents a synthetic lateral magnification of the lens group GF and the lens group GB at the telephoto end, and
βFBw represents a synthetic lateral magnification of the lens group GF and the lens group GB at the wide-angle end.

2. The zoom lens according to claim 1, wherein focusing is obtained by movement of a lens group other than a lens group that is disposed closest to the object, out of the lens groups included in the front group, along the optical axis.

3. The zoom lens according to claim 1, wherein the negative lens component Nb has a negative meniscus shape having a surface that is convex toward the image side.

4. The zoom lens according to claim 1, wherein an air lens formed by an image-side surface of the positive lens component P and an object-side surface of the negative lens component Nf has a double concave shape, or a negative meniscus shape having a surface that is concave toward the object side.

5. The zoom lens according to claim 1, wherein a following condition expression is satisfied:

$$0.4 \leq |fN|/Y \leq 2.7 \quad (5)$$

where
fN represents a synthetic focal length of the negative lens component Nf and the negative lens component Nb, and
Y represents the largest image height of the zoom lens.

6. The zoom lens according to claim 1, wherein a lens group that is disposed closest to the object in the front group is moved along the optical axis in zooming.

7. The zoom lens according to claim 1, wherein a lens group that is disposed closest to the object in the front group has positive refractive power.

8. An imaging apparatus comprising:
the zoom lens recited in claim 1; and
an image sensor configured to convert an optical image that is formed on an image side of the zoom lens by the zoom lens, into an electrical signal.

9. A zoom lens comprising:
a front group that has positive refractive power as a whole; and
a lens group GB disposed on an image side of the front group, wherein
the front group and the lens group GB are arranged sequentially in a stated order from an object side,
a magnification is changed by a change of a distance on an optical axis between adjacent lens groups,
the front group includes at least three lens groups,
the lens group GB includes sequentially from the image side, a negative lens component Nb, a negative lens component Nf, and a positive lens component P,
an object-side surface of the negative lens component Nb is a concave surface,
the lens group GB is moved to the object side in zooming from a wide-angle end to a telephoto end,
focusing is obtained by movement of a part of the lens groups included in the front group, along the optical axis,
a following condition expression is satisfied:

$$-0.7 \leq (RNf+RNb)/(RNf-RNb) \leq 2.0 \quad (1)$$

where
- RNf represents a radius of curvature of a surface located closest to an image in the negative lens component Nf, and
- RNb represents a radius of curvature of a surface located closest to an object in the negative lens component Nb, and a following condition expression is satisfied:

$$0.657 \leq BFw/Y \leq 1.5 \quad (3)$$

where
- BFw represents a back focus of the zoom lens at the wide-angle end, and
- Y represents the largest image height of the zoom lens.

10. A zoom lens comprising:
a front group that has positive refractive power as a whole; and
a lens group GB disposed on an image side of the front group, wherein
the front group and the lens group GB are arranged sequentially in a stated order from an object side,
a magnification is changed by a change of a distance on an optical axis between adjacent lens groups,
the front group includes at least three lens groups,
the lens group GB includes sequentially from the image side, a negative lens component Nb, a negative lens component Nf, and a positive lens component P,
an object-side surface of the negative lens component Nb is a concave surface,
the lens group GB is moved to the object side in zooming from a wide-angle end to a telephoto end,
focusing is obtained by movement of a part of the lens groups included in the front group, along the optical axis,
a following condition expression is satisfied:

$$-0.7 \leq (RNf+RNb)/(RNf-RNb) \leq 2.0 \quad (1)$$

where
- RNf represents a radius of curvature of a surface located closest to an image in the negative lens component Nf, and
- RNb represents a radius of curvature of a surface located closest to an object in the negative lens component Nb, and the positive lens component P has a double convex shape.

11. A zoom lens comprising:
a front group that has positive refractive power as a whole; and
a lens group GB disposed on an image side of the front group, wherein
the front group and the lens group GB are arranged sequentially in a stated order from an object side,
a magnification is changed by a change of a distance on an optical axis between adjacent lens groups,
the front group includes at least three lens groups,
the lens group GB includes sequentially from the image side, a negative lens component Nb, a negative lens component Nf, and a positive lens component P,
an object-side surface of the negative lens component Nb is a concave surface,
the lens group GB is moved to the object side in zooming from a wide-angle end to a telephoto end,
focusing is obtained by movement of a part of the lens groups included in the front group, along the optical axis,
a following condition expression is satisfied:

$$-0.7 \leq (RNf+RNb)/(RNf-RNb) \leq 2.0 \quad (1)$$

where
- RNf represents a radius of curvature of a surface located closest to an image in the negative lens component Nf, and
- RNb represents a radius of curvature of a surface located closest to an object in the negative lens component Nb, and a following condition expression is satisfied:

$$0.5 \leq fP/Y \leq 2.7 \quad (4)$$

where
- fP represents a focal length of the positive lens component P, and
- Y represents the largest image height of the zoom lens.

12. A zoom lens comprising:
a front group that has positive refractive power as a whole; and
a lens group GB disposed on an image side of the front group, wherein
the front group and the lens group GB are arranged sequentially in a stated order from an object side,
a magnification is changed by a change of a distance on an optical axis between adjacent lens groups,
the front group includes at least three lens groups,
the lens group GB includes sequentially from the image side, a negative lens component Nb, a negative lens component Nf, and a positive lens component P,
an object-side surface of the negative lens component Nb is a concave surface,
the lens group GB is moved to the object side in zooming from a wide-angle end to a telephoto end,
focusing is obtained by movement of a part of the lens groups included in the front group, along the optical axis,
a following condition expression is satisfied:

$$-0.7 \leq (RNf+RNb)/(RNf-RNb) \leq 2.0 \quad (1)$$

where
- RNf represents a radius of curvature of a surface located closest to an image in the negative lens component Nf, and
- RNb represents a radius of curvature of a surface located closest to an object in the negative lens component Nb, and a following condition expression is satisfied:

$$0.2 \leq RP/fw \leq 2.5 \quad (6)$$

where
- RP represents a radius of curvature of an object-side surface of the positive lens component P, and
- fw represents a focal length of the zoom lens at the wide-angle end.

13. A zoom lens comprising:
a front group that has positive refractive power as a whole; and
a lens group GB disposed on an image side of the front group, wherein
the front group and the lens group GB are arranged sequentially in a stated order from an object side,
a magnification is changed by a change of a distance on an optical axis between adjacent lens groups,
the front group includes at least three lens groups,
the lens group GB includes sequentially from the image side, a negative lens component Nb, a negative lens component Nf, and a positive lens component P,
an object-side surface of the negative lens component Nb is a concave surface, the lens group GB is moved to the object side in zooming from a wide-angle end to a telephoto end, focusing is obtained by movement of a part of the lens groups included in the front group, along the optical axis, a following condition expression is satisfied:

$$-0.7 \leq (RNf+RNb)/(RNf-RNb) \leq 2.0 \quad (1)$$

where

RNf represents a radius of curvature of a surface located closest to an image in the negative lens component Nf, and RNb represents a radius of curvature of a surface located closest to an object in the negative lens component Nb, and a following condition expression is satisfied:

$$23 \leq vP \leq 45 \quad (8)$$

where vP represents an Abbe number of a positive lens for a d line, the positive lens being included in the positive lens component P and having the smallest Abbe number.

\* \* \* \* \*